US011493993B2

(12) United States Patent
Rubin et al.

(10) Patent No.: US 11,493,993 B2
(45) Date of Patent: Nov. 8, 2022

(54) SYSTEMS, METHODS, AND INTERFACES FOR PERFORMING INPUTS BASED ON NEUROMUSCULAR CONTROL

(71) Applicant: META PLATFORMS TECHNOLOGIES, LLC, Menlo Park, CA (US)

(72) Inventors: Ran Rubin, New York, NY (US); Jason Lowell Reisman, Brooklyn, NY (US); Robert Phillips Cochran, New York, NY (US); Naor Brown, New York, NY (US); Nitzan Bartov, Brooklyn, NY (US); Joshua Duyan, Sugar Land, TX (US); Daniel Wetmore, Brooklyn, NY (US); Alexandre Barachant, Brooklyn, NY (US); Adam Berenzweig, Brooklyn, NY (US); Jeffrey Scott Seely, New York, NY (US); Christopher Anderson, New York, NY (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/010,689

(22) Filed: Sep. 2, 2020

(65) Prior Publication Data

US 2021/0064132 A1 Mar. 4, 2021

Related U.S. Application Data

(60) Provisional application No. 62/897,592, filed on Sep. 9, 2019, provisional application No. 62/897,483, filed
(Continued)

(51) Int. Cl.
*G06F 3/0481* (2022.01)
*G06F 3/01* (2006.01)
*G06F 40/274* (2020.01)

(52) U.S. Cl.
CPC .............. *G06F 3/014* (2013.01); *G06F 3/017* (2013.01); *G06F 3/0481* (2013.01); *G06F 40/274* (2020.01)

(58) Field of Classification Search
CPC ........ G06F 3/014; G06F 40/274; G06F 3/017; G06F 3/0481; G06F 3/016; G06F 3/0236;
(Continued)

(56) References Cited

U.S. PATENT DOCUMENTS

| 1,411,995 A | 4/1922 | Dull |
| 3,580,243 A | 5/1971 | Johnson |

(Continued)

FOREIGN PATENT DOCUMENTS

| CA | 2902045 A1 | 8/2014 |
| CA | 2921954 A1 | 2/2015 |

(Continued)

OTHER PUBLICATIONS

International Search Report and Written Opinion received for PCT Application Serial No. PCT/US2020/049274 dated Feb. 1, 2021, 17 pages.
(Continued)

*Primary Examiner* — Carolyn R Edwards
(74) *Attorney, Agent, or Firm* — FisherBroyles, LLP

(57) ABSTRACT

The disclosed computer-implemented method may include presenting, via a user interface, a sensory cue, and receiving, from neuromuscular sensors of a wearable device, various neuromuscular signals generated by a user wearing the wearable device, where the user generates the neuromuscular signals in response to the sensory cue being presented to
(Continued)

the user via the user interface. The method may also include interpreting the received neuromuscular signals as input commands with respect to the sensory cue provided by the user interface, such that the input commands initiate performance of specified tasks within the user interface. The method may also include performing the specified tasks within the user interface according to the interpreted input commands. Various other methods, systems, and computer-readable media are also disclosed.

20 Claims, 28 Drawing Sheets

Related U.S. Application Data on Sep. 9, 2019, provisional application No. 62/895,782, filed on Sep. 4, 2019, provisional application No. 62/895,888, filed on Sep. 4, 2019.

(58) Field of Classification Search
CPC ........ G06F 3/0237; G06F 3/011; G06F 1/163; G06F 3/015
See application file for complete search history.

(56) References Cited

U.S. PATENT DOCUMENTS

| | | |
|---|---|---|
| 3,620,208 A | 11/1971 | Wayne et al. |
| 3,735,425 A | 5/1973 | Hoshall et al. |
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 5,003,978 A | 4/1991 | Dunseath, Jr. |
| D322,227 S | 12/1991 | Warhol |
| 5,081,852 A | 1/1992 | Cox |
| 5,251,189 A | 10/1993 | Thorp |
| D348,660 S | 7/1994 | Parsons |
| 5,445,869 A | 8/1995 | Ishikawa et al. |
| 5,462,065 A | 10/1995 | Cusimano |
| 5,482,051 A | 1/1996 | Reddy et al. |
| 5,605,059 A | 2/1997 | Woodward |
| 5,625,577 A | 4/1997 | Kunii et al. |
| 5,683,404 A | 11/1997 | Johnson |
| 6,005,548 A | 12/1999 | Latypov et al. |
| 6,009,210 A | 12/1999 | Kang |
| 6,032,530 A | 3/2000 | Hock |
| 6,066,794 A | 5/2000 | Longo |
| 6,184,847 B1 | 2/2001 | Fateh et al. |
| 6,238,338 B1 | 5/2001 | DeLuca et al. |
| 6,244,873 B1 | 6/2001 | Hill et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,771,294 B1 | 8/2004 | Pulli et al. |
| 6,774,885 B1 | 8/2004 | Even-Zohar |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,901,286 B1 | 5/2005 | Sinderby et al. |
| 6,927,343 B2 | 8/2005 | Watanabe et al. |
| 6,942,621 B2 | 9/2005 | Avinash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,491,892 B2 | 2/2009 | Wagner et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,761,390 B2 | 7/2010 | Ford |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| 7,870,211 B2 | 1/2011 | Pascal et al. |
| 7,901,368 B2 | 3/2011 | Flaherty et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,311,623 B2 | 11/2012 | Sanger |
| 8,348,538 B2 | 1/2013 | Van Loenen et al. |
| 8,351,651 B2 | 1/2013 | Lee |
| 8,355,671 B2 | 1/2013 | Kramer et al. |
| 8,384,683 B2 | 2/2013 | Luo |
| 8,389,862 B2 | 3/2013 | Arora et al. |
| 8,421,634 B2 | 4/2013 | Tan et al. |
| 8,427,977 B2 | 4/2013 | Workman et al. |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| 8,467,270 B2 | 6/2013 | Gossweiler, III et al. |
| 8,469,741 B2 | 6/2013 | Oster et al. |
| 8,484,022 B1 | 7/2013 | Vanhoucke |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,718,980 B2 | 5/2014 | Garudadri et al. |
| 8,743,052 B1 * | 6/2014 | Keller ............... G06F 3/017 345/156 |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |

(56) References Cited

U.S. PATENT DOCUMENTS

| | | |
|---|---|---|
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| 8,912,094 B2 | 12/2014 | Koo et al. |
| 8,914,472 B1 | 12/2014 | Lee et al. |
| 8,922,481 B1 | 12/2014 | Kauffmann et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 | 7/2015 | Forutanpour et al. |
| D736,664 S | 8/2015 | Paradise et al. |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,329,694 B2 | 5/2016 | Slonneger |
| 9,341,659 B2 | 5/2016 | Poupyrev et al. |
| 9,351,653 B1 | 5/2016 | Harrison |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,402,582 B1 | 8/2016 | Parviz et al. |
| 9,408,316 B2 | 8/2016 | Bailey et al. |
| 9,418,927 B2 | 8/2016 | Axisa et al. |
| 9,439,566 B2 | 9/2016 | Arne et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| 9,483,123 B2 | 11/2016 | Aleem et al. |
| 9,529,434 B2 | 12/2016 | Choi et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 9,921,641 B1 | 3/2018 | Worley, III et al. |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,520,378 B1 | 12/2019 | Brown et al. |
| 10,528,135 B2 | 1/2020 | Bailey et al. |
| 10,558,273 B2 * | 2/2020 | Park .................. G06F 3/042 |
| 10,592,001 B2 | 3/2020 | Berenzweig et al. |
| 10,610,737 B1 | 4/2020 | Crawford |
| 10,676,083 B1 | 6/2020 | De Sapio et al. |
| 10,687,759 B2 | 6/2020 | Guo et al. |
| 10,905,350 B2 | 2/2021 | Berenzweig et al. |
| 10,905,383 B2 | 2/2021 | Barachant |
| 10,937,414 B2 | 3/2021 | Berenzweig et al. |
| 10,990,174 B2 | 4/2021 | Kaifosh et al. |
| 11,009,951 B2 | 5/2021 | Bailey et al. |
| 11,150,730 B1 | 10/2021 | Anderson et al. |
| 2002/0032386 A1 | 3/2002 | Sackner et al. |
| 2002/0077534 A1 | 6/2002 | DuRousseau |
| 2002/0094701 A1 | 7/2002 | Biegelsen et al. |
| 2002/0198472 A1 | 12/2002 | Kramer |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0184544 A1 | 10/2003 | Prudent |
| 2004/0010210 A1 | 1/2004 | Avinash et al. |
| 2004/0054273 A1 | 3/2004 | Finneran et al. |
| 2004/0068409 A1 | 4/2004 | Tanaka et al. |
| 2004/0073104 A1 | 4/2004 | Brun Del Re et al. |
| 2004/0080499 A1 | 4/2004 | Lui |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2004/0254617 A1 | 12/2004 | Hemmerling et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0070791 A1 | 3/2005 | Edney et al. |
| 2005/0115561 A1 | 6/2005 | Stahmann et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0058699 A1 | 3/2006 | Vitiello et al. |
| 2006/0061544 A1 | 3/2006 | Min et al. |
| 2006/0121958 A1 | 6/2006 | Jung et al. |
| 2006/0129057 A1 | 6/2006 | Maekawa et al. |
| 2006/0149338 A1 | 7/2006 | Flaherty et al. |
| 2006/0211956 A1 | 9/2006 | Sankai |
| 2007/0009151 A1 | 1/2007 | Pittman et al. |
| 2007/0016265 A1 | 1/2007 | Davoodi et al. |
| 2007/0023662 A1 | 2/2007 | Brady et al. |
| 2007/0132785 A1 | 6/2007 | Ebersole, Jr. et al. |
| 2007/0148624 A1 | 6/2007 | Nativ |
| 2007/0172797 A1 | 7/2007 | Hada et al. |
| 2007/0177770 A1 | 8/2007 | Derchak et al. |
| 2007/0185697 A1 | 8/2007 | Tan et al. |
| 2007/0256494 A1 | 11/2007 | Nakamura et al. |
| 2007/0285399 A1 | 12/2007 | Lund |
| 2008/0001735 A1 | 1/2008 | Tran |
| 2008/0051673 A1 | 2/2008 | Kong et al. |
| 2008/0052643 A1 | 2/2008 | Ike et al. |
| 2008/0058668 A1 | 3/2008 | Seyed Momen et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0152217 A1 | 6/2008 | Greer |
| 2008/0163130 A1 | 7/2008 | Westerman |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2008/0278497 A1 | 11/2008 | Jammes et al. |

(56) References Cited

U.S. PATENT DOCUMENTS

| | | |
|---|---|---|
| 2008/0285805 A1 | 11/2008 | Luinge et al. |
| 2009/0005700 A1 | 1/2009 | Joshi et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079607 A1 | 3/2009 | Denison et al. |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0102580 A1 | 4/2009 | Uchaykin |
| 2009/0112080 A1 | 4/2009 | Matthews |
| 2009/0124881 A1 | 5/2009 | Rytky |
| 2009/0189864 A1* | 7/2009 | Walker .................. G06F 3/0238 345/169 |
| 2009/0189867 A1 | 7/2009 | Krah et al. |
| 2009/0195497 A1 | 8/2009 | Fitzgerald et al. |
| 2009/0204031 A1 | 8/2009 | McNames et al. |
| 2009/0209878 A1 | 8/2009 | Sanger |
| 2009/0251407 A1 | 10/2009 | Flake et al. |
| 2009/0265671 A1 | 10/2009 | Sachs et al. |
| 2009/0318785 A1 | 12/2009 | Ishikawa et al. |
| 2009/0319230 A1 | 12/2009 | Case, Jr. et al. |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0106044 A1 | 4/2010 | Linderman |
| 2010/0113910 A1 | 5/2010 | Brauers et al. |
| 2010/0228487 A1 | 9/2010 | Leuthardt et al. |
| 2010/0234696 A1 | 9/2010 | Li et al. |
| 2010/0240981 A1 | 9/2010 | Barboutis et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0306713 A1 | 12/2010 | Geisner et al. |
| 2010/0315266 A1 | 12/2010 | Gunawardana et al. |
| 2010/0317958 A1 | 12/2010 | Beck et al. |
| 2011/0007035 A1 | 1/2011 | Shai |
| 2011/0018754 A1 | 1/2011 | Tojima et al. |
| 2011/0066381 A1 | 3/2011 | Garudadri et al. |
| 2011/0077484 A1 | 3/2011 | Van Slyke et al. |
| 2011/0082838 A1 | 4/2011 | Niemela |
| 2011/0092826 A1 | 4/2011 | Lee et al. |
| 2011/0119216 A1 | 5/2011 | Wigdor |
| 2011/0133934 A1 | 6/2011 | Tan et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0205242 A1 | 8/2011 | Friesen |
| 2011/0213278 A1 | 9/2011 | Horak et al. |
| 2011/0221672 A1 | 9/2011 | Osterhout et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0262002 A1 | 10/2011 | Lee |
| 2011/0270135 A1 | 11/2011 | Dooley et al. |
| 2011/0295100 A1 | 12/2011 | Hegde et al. |
| 2011/0313762 A1 | 12/2011 | Ben-David et al. |
| 2012/0007821 A1 | 1/2012 | Zaliva |
| 2012/0029322 A1 | 2/2012 | Marten et al. |
| 2012/0051005 A1 | 3/2012 | Vanfleteren et al. |
| 2012/0066163 A1 | 3/2012 | Balls et al. |
| 2012/0071780 A1 | 3/2012 | Barachant et al. |
| 2012/0101357 A1 | 4/2012 | Hoskuldsson et al. |
| 2012/0117514 A1 | 5/2012 | Kim et al. |
| 2012/0157789 A1 | 6/2012 | Kangas et al. |
| 2012/0165695 A1 | 6/2012 | Kidmose et al. |
| 2012/0184838 A1 | 7/2012 | John |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0265090 A1 | 10/2012 | Fink et al. |
| 2012/0265480 A1 | 10/2012 | Oshima |
| 2012/0283526 A1 | 11/2012 | Gommesen et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0004033 A1 | 1/2013 | Trugenberger |
| 2013/0005303 A1 | 1/2013 | Song et al. |
| 2013/0020948 A1 | 1/2013 | Han et al. |
| 2013/0027341 A1 | 1/2013 | Mastandrea |
| 2013/0038707 A1 | 2/2013 | Cunningham et al. |
| 2013/0077820 A1 | 3/2013 | Marais et al. |
| 2013/0080794 A1 | 3/2013 | Hsieh |
| 2013/0106686 A1 | 5/2013 | Bennett |
| 2013/0123656 A1 | 5/2013 | Heck |
| 2013/0127708 A1 | 5/2013 | Jung et al. |
| 2013/0131538 A1 | 5/2013 | Gaw et al. |
| 2013/0135223 A1 | 5/2013 | Shai |
| 2013/0141375 A1 | 6/2013 | Ludwig et al. |
| 2013/0144629 A1 | 6/2013 | Johnston et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0217998 A1 | 8/2013 | Mahfouz et al. |
| 2013/0221996 A1 | 8/2013 | Poupyrev et al. |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285913 A1* | 10/2013 | Griffin .................. G06F 3/0237 345/168 |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2014/0020945 A1 | 1/2014 | Hurwitz et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0052150 A1 | 2/2014 | Taylor et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0200432 A1 | 7/2014 | Banerji et al. |
| 2014/0201666 A1 | 7/2014 | Bedikian et al. |
| 2014/0223462 A1 | 8/2014 | Aimone et al. |
| 2014/0236031 A1 | 8/2014 | Banet et al. |
| 2014/0240103 A1* | 8/2014 | Lake ...................... G06F 1/163 340/12.5 |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0277622 A1 | 9/2014 | Raniere |
| 2014/0278139 A1 | 9/2014 | Hong et al. |
| 2014/0278441 A1 | 9/2014 | Ton et al. |
| 2014/0279860 A1 | 9/2014 | Pan et al. |

(56) References Cited

U.S. PATENT DOCUMENTS

| | | |
|---|---|---|
| 2014/0282282 A1 | 9/2014 | Holz |
| 2014/0285326 A1 | 9/2014 | Luna et al. |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps et al. |
| 2014/0359540 A1 | 12/2014 | Kelsey et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0368428 A1 | 12/2014 | Pinault |
| 2014/0368474 A1 | 12/2014 | Kim et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0019135 A1 | 1/2015 | Kacyvenski et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0148728 A1 | 5/2015 | Sallum et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0242009 A1 | 8/2015 | Xiao et al. |
| 2015/0242575 A1 | 8/2015 | Abovitz et al. |
| 2015/0261306 A1 | 9/2015 | Lake |
| 2015/0261318 A1 | 9/2015 | Scavezze et al. |
| 2015/0272483 A1 | 10/2015 | Etemad et al. |
| 2015/0277575 A1 | 10/2015 | Ataee et al. |
| 2015/0288944 A1 | 10/2015 | Nistico et al. |
| 2015/0289995 A1 | 10/2015 | Wilkinson et al. |
| 2015/0296553 A1 | 10/2015 | DiFranco et al. |
| 2015/0302168 A1 | 10/2015 | De Sapio et al. |
| 2015/0305672 A1 | 10/2015 | Grey et al. |
| 2015/0309563 A1 | 10/2015 | Connor |
| 2015/0309582 A1 | 10/2015 | Gupta |
| 2015/0312175 A1 | 10/2015 | Langholz |
| 2015/0313496 A1 | 11/2015 | Connor |
| 2015/0323998 A1* | 11/2015 | Kudekar .................. G06F 3/014 345/156 |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0351690 A1 | 12/2015 | Toth et al. |
| 2015/0355716 A1 | 12/2015 | Balasubramanian et al. |
| 2015/0355718 A1 | 12/2015 | Slonneger |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2015/0379770 A1 | 12/2015 | Haley, Jr. et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0049073 A1 | 2/2016 | Lee |
| 2016/0050037 A1 | 2/2016 | Webb |
| 2016/0071319 A1 | 3/2016 | Fallon et al. |
| 2016/0092504 A1 | 3/2016 | Mitri et al. |
| 2016/0099010 A1 | 4/2016 | Sainath et al. |
| 2016/0107309 A1 | 4/2016 | Walsh et al. |
| 2016/0113587 A1 | 4/2016 | Kothe et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xiaoli et al. |
| 2016/0170710 A1 | 6/2016 | Kim et al. |
| 2016/0187992 A1 | 6/2016 | Yamamoto et al. |
| 2016/0195928 A1 | 7/2016 | Wagner et al. |
| 2016/0199699 A1 | 7/2016 | Klassen |
| 2016/0202081 A1 | 7/2016 | Debieuvre et al. |
| 2016/0206206 A1 | 7/2016 | Avila et al. |
| 2016/0207201 A1 | 7/2016 | Herr et al. |
| 2016/0217614 A1 | 7/2016 | Kraver et al. |
| 2016/0235323 A1 | 8/2016 | Tadi et al. |
| 2016/0239080 A1 | 8/2016 | Margolina et al. |
| 2016/0242646 A1 | 8/2016 | Obma |
| 2016/0259407 A1 | 9/2016 | Schick |
| 2016/0262687 A1 | 9/2016 | Vaidyanathan et al. |
| 2016/0263458 A1 | 9/2016 | Mather et al. |
| 2016/0274732 A1 | 9/2016 | Bang et al. |
| 2016/0274758 A1 | 9/2016 | Bailey |
| 2016/0275726 A1 | 9/2016 | Mullins |
| 2016/0282947 A1 | 9/2016 | Schwarz et al. |
| 2016/0291768 A1* | 10/2016 | Cho ........................ G06F 3/017 |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0314623 A1 | 10/2016 | Coleman et al. |
| 2016/0342227 A1 | 11/2016 | Natzke et al. |
| 2016/0350973 A1 | 12/2016 | Shapira et al. |
| 2017/0025026 A1 | 1/2017 | Ortiz Catalan |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068445 A1 | 3/2017 | Lee et al. |
| 2017/0075426 A1 | 3/2017 | Camacho Perez et al. |
| 2017/0079828 A1 | 3/2017 | Pedtke et al. |
| 2017/0080346 A1 | 3/2017 | Abbas |
| 2017/0090604 A1 | 3/2017 | Barbier |
| 2017/0091567 A1 | 3/2017 | Wang et al. |

(56) References Cited

U.S. PATENT DOCUMENTS

| | | |
|---|---|---|
| 2017/0095178 A1 | 4/2017 | Schoen et al. |
| 2017/0119472 A1 | 5/2017 | Herrmann et al. |
| 2017/0123487 A1* | 5/2017 | Hazra .................. G06F 3/013 |
| 2017/0124474 A1 | 5/2017 | Kashyap |
| 2017/0124816 A1 | 5/2017 | Yang et al. |
| 2017/0147077 A1 | 5/2017 | Park et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0209055 A1 | 7/2017 | Pantelopoulos et al. |
| 2017/0220923 A1 | 8/2017 | Bae et al. |
| 2017/0237789 A1 | 8/2017 | Harner et al. |
| 2017/0237901 A1 | 8/2017 | Lee et al. |
| 2017/0259167 A1 | 9/2017 | Cook et al. |
| 2017/0262064 A1 | 9/2017 | Ofir et al. |
| 2017/0277282 A1 | 9/2017 | Go |
| 2017/0285744 A1 | 10/2017 | Juliato |
| 2017/0285756 A1 | 10/2017 | Wang et al. |
| 2017/0285757 A1 | 10/2017 | Robertson et al. |
| 2017/0285848 A1 | 10/2017 | Rosenberg et al. |
| 2017/0296363 A1 | 10/2017 | Yetkin et al. |
| 2017/0301630 A1 | 10/2017 | Nguyen et al. |
| 2017/0308118 A1 | 10/2017 | Ito |
| 2017/0312614 A1 | 11/2017 | Tran et al. |
| 2017/0329392 A1 | 11/2017 | Keskin et al. |
| 2017/0329404 A1 | 11/2017 | Keskin et al. |
| 2017/0340506 A1 | 11/2017 | Zhang et al. |
| 2017/0344706 A1 | 11/2017 | Torres et al. |
| 2017/0347908 A1 | 12/2017 | Watanabe et al. |
| 2017/0371403 A1 | 12/2017 | Wetzler et al. |
| 2018/0000367 A1 | 1/2018 | Longinotti-Buitoni |
| 2018/0018825 A1 | 1/2018 | Kim et al. |
| 2018/0020285 A1 | 1/2018 | Zass |
| 2018/0020951 A1 | 1/2018 | Kaifosh et al. |
| 2018/0020978 A1 | 1/2018 | Kaifosh et al. |
| 2018/0020990 A1 | 1/2018 | Park et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0068489 A1 | 3/2018 | Kim et al. |
| 2018/0074332 A1 | 3/2018 | Li et al. |
| 2018/0081439 A1 | 3/2018 | Daniels |
| 2018/0088675 A1 | 3/2018 | Vogel et al. |
| 2018/0088765 A1 | 3/2018 | Bailey |
| 2018/0092599 A1 | 4/2018 | Kerth et al. |
| 2018/0093181 A1 | 4/2018 | Goslin et al. |
| 2018/0095542 A1 | 4/2018 | Mallinson |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0107275 A1 | 4/2018 | Chen et al. |
| 2018/0120948 A1 | 5/2018 | Aleem et al. |
| 2018/0133551 A1 | 5/2018 | Chang et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0168905 A1 | 6/2018 | Goodall et al. |
| 2018/0178008 A1 | 6/2018 | Bouton et al. |
| 2018/0217249 A1 | 8/2018 | La Salla et al. |
| 2018/0239430 A1 | 8/2018 | Tadi et al. |
| 2018/0240459 A1 | 8/2018 | Weng et al. |
| 2018/0247443 A1 | 8/2018 | Briggs et al. |
| 2018/0279919 A1 | 10/2018 | Bansbach et al. |
| 2018/0301057 A1 | 10/2018 | Hargrove et al. |
| 2018/0307314 A1 | 10/2018 | Connor |
| 2018/0314879 A1 | 11/2018 | Khwaja et al. |
| 2018/0321745 A1 | 11/2018 | Morun et al. |
| 2018/0321746 A1 | 11/2018 | Morun et al. |
| 2018/0330549 A1 | 11/2018 | Brenton |
| 2018/0333575 A1 | 11/2018 | Bouton |
| 2018/0344195 A1 | 12/2018 | Morun et al. |
| 2018/0356890 A1 | 12/2018 | Zhang et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0027141 A1 | 1/2019 | Strong et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0056422 A1 | 2/2019 | Park et al. |
| 2019/0076716 A1 | 3/2019 | Chiou et al. |
| 2019/0089898 A1 | 3/2019 | Kim et al. |
| 2019/0113973 A1 | 4/2019 | Coleman et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0196585 A1 | 6/2019 | Laszlo et al. |
| 2019/0196586 A1 | 6/2019 | Laszlo et al. |
| 2019/0197778 A1 | 6/2019 | Sachdeva et al. |
| 2019/0209034 A1 | 7/2019 | Deno et al. |
| 2019/0212817 A1 | 7/2019 | Kaifosh et al. |
| 2019/0216619 A1 | 7/2019 | McDonnall et al. |
| 2019/0223748 A1 | 7/2019 | Al-Natsheh et al. |
| 2019/0227627 A1* | 7/2019 | Kaifosh .................. G06F 3/017 |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0279407 A1 | 9/2019 | McHugh et al. |
| 2019/0294243 A1 | 9/2019 | Laszlo et al. |
| 2019/0324549 A1 | 10/2019 | Araki et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0042089 A1 | 2/2020 | Ang et al. |
| 2020/0057661 A1 | 2/2020 | Bendfeldt |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0077955 A1 | 3/2020 | Shui et al. |
| 2020/0097081 A1 | 3/2020 | Stone et al. |
| 2020/0111260 A1 | 4/2020 | Osborn et al. |
| 2020/0142490 A1 | 5/2020 | Xiong et al. |
| 2020/0143795 A1 | 5/2020 | Park et al. |
| 2020/0163562 A1 | 5/2020 | Neaves |
| 2020/0205932 A1 | 7/2020 | Zar et al. |
| 2020/0225320 A1* | 7/2020 | Belskikh .................. G06F 3/017 |
| 2020/0245873 A1 | 8/2020 | Frank et al. |
| 2020/0275895 A1* | 9/2020 | Barachant ............ A61B 5/6831 |
| 2020/0301509 A1 | 9/2020 | Liu et al. |
| 2020/0305795 A1 | 10/2020 | Floyd et al. |
| 2020/0320335 A1 | 10/2020 | Shamun et al. |
| 2021/0109598 A1 | 4/2021 | Zhang et al. |
| 2021/0117523 A1 | 4/2021 | Kim et al. |
| 2021/0290159 A1 | 9/2021 | Bruinsma et al. |
| 2022/0256706 A1 | 8/2022 | Xiong et al. |

FOREIGN PATENT DOCUMENTS

| | | |
|---|---|---|
| CA | 2939644 A1 | 8/2015 |
| CN | 1838933 A | 9/2006 |
| CN | 103777752 A | 5/2014 |
| CN | 105009031 A | 10/2015 |
| CN | 105190477 A | 12/2015 |
| CN | 105190578 A | 12/2015 |
| CN | 106102504 A | 11/2016 |
| CN | 110300542 A | 10/2019 |
| CN | 111902077 A | 11/2020 |
| CN | 112074225 A | 12/2020 |
| CN | 112469469 A | 3/2021 |
| CN | 112822992 A | 5/2021 |
| DE | 4412278 A1 | 10/1995 |
| EP | 0301790 A2 | 2/1989 |

(56) References Cited

FOREIGN PATENT DOCUMENTS

| | | |
|---|---|---|
| EP | 1345210 A2 | 9/2003 |
| EP | 2198521 B1 | 6/2012 |
| EP | 2541763 A1 | 1/2013 |
| EP | 2959394 A1 | 12/2015 |
| EP | 3104737 A1 | 12/2016 |
| EP | 3200051 A1 | 8/2017 |
| EP | 3487395 A1 | 5/2019 |
| EP | 2959394 B1 | 5/2021 |
| JP | H05277080 A | 10/1993 |
| JP | 3103427 B2 | 10/2000 |
| JP | 2002287869 A | 10/2002 |
| JP | 2005095561 A | 4/2005 |
| JP | 2009050679 A | 3/2009 |
| JP | 2010520561 A | 6/2010 |
| JP | 2016507851 A | 3/2016 |
| JP | 2017509386 A | 4/2017 |
| JP | 2019023941 A | 2/2019 |
| JP | 2021072136 A | 5/2021 |
| KR | 20120094870 A | 8/2012 |
| KR | 20120097997 A | 9/2012 |
| KR | 20150123254 A | 11/2015 |
| KR | 20160121552 A | 10/2016 |
| KR | 20170067873 A | 6/2017 |
| KR | 20170107283 A | 9/2017 |
| KR | 101790147 B1 | 10/2017 |
| WO | 9527341 A1 | 10/1995 |
| WO | 2006086504 A2 | 8/2006 |
| WO | 2008109248 A2 | 9/2008 |
| WO | 2009042313 A1 | 4/2009 |
| WO | 2010104879 A2 | 9/2010 |
| WO | 2011070554 A2 | 6/2011 |
| WO | 2012155157 A1 | 11/2012 |
| WO | 2014130871 A1 | 8/2014 |
| WO | 2014186370 A1 | 11/2014 |
| WO | 2014194257 A1 | 12/2014 |
| WO | 2014197443 A1 | 12/2014 |
| WO | 2015027089 A1 | 2/2015 |
| WO | 2015073713 A1 | 5/2015 |
| WO | 2015081113 A1 | 6/2015 |
| WO | 2015100172 A1 | 7/2015 |
| WO | 2015123445 A1 | 8/2015 |
| WO | 2015192117 A1 | 12/2015 |
| WO | 2015199747 A1 | 12/2015 |
| WO | WO-2015184760 A1 * 12/2015 ............. G06F 3/005 | |
| WO | 2016041088 A1 | 3/2016 |
| WO | 2017062544 A1 | 4/2017 |
| WO | 2017075611 A1 | 5/2017 |
| WO | 2017092225 A1 | 6/2017 |
| WO | 2017120669 A1 | 7/2017 |
| WO | 2017172185 A1 | 10/2017 |
| WO | 2017208167 A1 | 12/2017 |
| WO | 2018022602 A1 | 2/2018 |
| WO | 2018098046 A2 | 5/2018 |
| WO | 2019099758 A1 | 5/2019 |
| WO | 2019147953 A1 | 8/2019 |
| WO | 2019147958 A1 | 8/2019 |
| WO | 2019147996 A1 | 8/2019 |
| WO | 2019217419 A2 | 11/2019 |
| WO | 2019226259 A1 | 11/2019 |
| WO | 2019231911 A1 | 12/2019 |
| WO | 2020047429 A1 | 3/2020 |
| WO | 2020061440 A1 | 3/2020 |
| WO | 2020061451 A1 | 3/2020 |
| WO | 2020072915 A1 | 4/2020 |

OTHER PUBLICATIONS

International Preliminary Report on Patentability for International Application No. PCT/US2020/049274, dated Mar. 17, 2022, 14 pages.
International Preliminary Report on Patentability for International Application No. PCT/US2019/015183, dated Aug. 6, 2020, 7 pages.
International Preliminary Report on Patentability for International Application No. PCT/US2019/015238, dated Aug. 6, 2020, 7 pages.
International Preliminary Report on Patentability for International Application No. PCT/US2019/028299, dated Dec. 10, 2020, 11 pages.
International Preliminary Report on Patentability for International Application No. PCT/US2019/034173, dated Dec. 10, 2020, 9 pages.
International Preliminary Report on Patentability for International Application No. PCT/US2019/046351, dated Feb. 25, 2021, 8 pages.
International Preliminary Report on Patentability for International Application No. PCT/US2019/052131, dated Apr. 1, 2021, 8 pages.
International Preliminary Report on Patentability for International Application No. PCT/US2019/054716, dated Apr. 15, 2021, 10 pages.
International Preliminary Report on Patentability for International Application No. PCT/US2019/061759, dated May 27, 2021, 12 pages.
International Preliminary Report on Patentability for International Application No. PCT/US2019/063587, dated Jun. 10, 2021, 13 pages.
International Search Report and Written Opinion for International Application No. PCT/US2014/052143, dated Nov. 21, 2014, 8 Pages.
International Search Report and Written Opinion for International Application No. PCT/US2014/067443, dated Feb. 27, 2015, 8 pages.
International Search Report and Written Opinion for International Application No. PCT/US2015/015675, dated May 27, 2015, 9 Pages.
International Search Report and Written Opinion for International Application No. PCT/US2017/043686, dated Oct. 6, 2017, 9 Pages.
International Search Report and Written Opinion for International Application No. PCT/US2017/043693, dated Oct. 6, 2017, 7 Pages.
International Search Report and Written Opinion for International Application No. PCT/US2017/043791, dated Oct. 5, 2017, 10 Pages.
International Search Report and Written Opinion for International Application No. PCT/US2018/056768, dated Jan. 15, 2019, 8 pages.
International Search Report and Written Opinion for International Application No. PCT/US2018/061409, dated Mar. 12, 2019, 11 pages.
International Search Report and Written Opinion for International Application No. PCT/US2018/063215, dated Mar. 21, 2019, 17 Pages.
International Search Report and Written Opinion for International Application No. PCT/US2019/015167, dated May 21, 2019, 7 Pages.
International Search Report and Written Opinion for International Application No. PCT/US2019/015174, dated May 21, 2019, 8 pages.
International Search Report and Written Opinion for International Application No. PCT/US2019/015244, dated May 16, 2019, 8 Pages.
International Search Report and Written Opinion for International Application No. PCT/US2019/020065, dated May 16, 2019, 10 Pages.
International Search Report and Written Opinion for International Application No. PCT/US2019/028299, dated Aug. 9, 2019, 12 pages.
International Search Report and Written Opinion for International Application No. PCT/US2019/031114, dated Dec. 20, 2019, 18 Pages.
International Search Report and Written Opinion for International Application No. PCT/US2019/034173, dated Sep. 18, 2019, 10 Pages.
International Search Report and Written Opinion for International Application No. PCT/US2019/037302, dated Oct. 11, 2019, 13 Pages.
International Search Report and Written Opinion for International Application No. PCT/US2019/042579, dated Oct. 31, 2019, 8 Pages.
International Search Report and Written Opinion for International Application No. PCT/US2019/046351, dated Nov. 7, 2019, 9 pages.

(56) References Cited

OTHER PUBLICATIONS

International Search Report and Written Opinion for International Application No. PCT/US2019/049094, dated Jan. 9, 2020, 27 Pages.
International Search Report and Written Opinion for International Application No. PCT/US2019/052131, dated Dec. 6, 2019, 8 pages.
International Search Report and Written Opinion for International Application No. PCT/US2019/052151, dated Jan. 15, 2020, 10 pages.
International Search Report and Written Opinion for International Application No. PCT/US2019/054716, dated Dec. 20, 2019, 11 Pages.
International Search Report and Written Opinion for International Application No. PCT/US2019/061759, dated Jan. 29, 2020, 12 pages.
International Search Report and Written Opinion for International Application No. PCT/US2019/063587, dated Mar. 25, 2020, 16 pages.
International Search Report and Written Opinion for International Application No. PCT/US2020/025735, dated Jun. 22, 2020, 10 pages.
International Search Report and Written Opinion for International Application No. PCT/US2020/025772, dated Aug. 3, 2020, 11 pages.
International Search Report and Written Opinion for International Application No. PCT/US2020/025797, dated Jul. 9, 2020, 10 pages.
International Search Report and Written Opinion for International Application No. PCT/US2020/061392, dated Mar. 12, 2021, 12 pages.
International Search Report and Written Opinion for International Application No. PCT/US2017/043792, dated Oct. 5, 2017, 9 Pages.
International Search Report and Written Opinion for International Application No. PCT/US2019/015134, dated May 15, 2019, 11 Pages.
International Search Report and Written Opinion for International Application No. PCT/US2019/015180, dated May 28, 2019, 10 Pages.
International Search Report and Written Opinion for International Application No. PCT/US2019/015183, dated May 3, 2019, 8 Pages.
International Search Report and Written Opinion for International Application No. PCT/US2019/015238, dated May 16, 2019, 8 Pages.
Invitation to Pay Additional Fees for International Application No. PCT/US2019/031114, dated Aug. 6, 2019, 7 pages.
Invitation to Pay Additional Fees for International Application No. PCT/US2019/049094, dated Oct. 24, 2019, 2 Pages.
Jiang H., "Effective and Interactive Interpretation of Gestures by Individuals with Mobility Impairments," Thesis/Dissertation Acceptance, Purdue University Graduate School, Graduate School Form 30, Updated on Jan. 15, 2015, 24 pages.
Kainz et al., "Approach to Hand Tracking and Gesture Recognition Based on Depth-Sensing Cameras and EMG Monitoring," Acta Informatica Pragensia, vol. 3, Jan. 1, 2014, pp. 104-112, Retrieved from the Internet: URL: https://aip.vse.cz/pdfs/aip/2014/01/08.pdf.
Kawaguchi J., et al., "Estimation of Finger Joint Angles Based on Electromechanical Sensing of Wrist Shape," IEEE Transactions on Neural Systems and Rehabilitation Engineering, Sep. 2017, vol. 25 (9), pp. 1409-1418.
Kim H., et al., "Real-Time Human Pose Estimation and Gesture Recognition from Depth Images Using Superpixels and SVM Classifier," Sensors, 2015, vol. 15, pp. 12410-12427.
Kipke D.R., et al., "Silicon-Substrate Intracortical Microelectrode Arrays for Long-Term Recording of Neuronal Spike Activity in Cerebral Cortex," IEEE Transactions on Neural Systems and Rehabilitation Engineering, Jun. 2003, vol. 11(2), 5 pages. Retrieved on Oct. 7, 2019 [Oct. 7, 2019] Retrieved from the Internet: URL: https://www.ece.uvic.ca/-octill/papers/neurimp/Kipke_etal_2003_01214707.pdf.
Extended European Search Report for European Application No. 18869441.8, dated Nov. 17, 2020, 20 Pages.
Extended European Search Report for European Application No. 19806723.3, dated Jul. 7, 2021, 13 pages.
Extended European Search Report for European Application No. 19810524.9, dated Mar. 17, 2021, 11 pages.
Extended European Search Report for European Application No. 19850130.6, dated Sep. 1, 2021, 14 Pages.
Extended European Search Report for European Application No. 19855191.3, dated Dec. 6, 2021, 11 pages.
Extended European Search Report for European Application No. 19883839.3, dated Dec. 15, 2021, 7 pages.
Farina D., et al., "Man/Machine Interface Based on the Discharge Timings of Spinal Motor Neurons After Targeted Muscle Reinnervation," Nature Biomedical Engineering, Feb. 6, 2017, vol. 1, Article No. 0025, pp. 1-12.
Favorskaya M., et al., "Localization and Recognition of Dynamic Hand Gestures Based on Hierarchy of Manifold Classifiers," International Archives of the Photogrammetry, Remote Sensing and Spatial Information Sciences, May 25-27, 2015, vol. XL-5/W6, pp. 1-8.
Final Office Action dated Jun. 2, 2020 for U.S. Appl. No. 15/882,858, filed Jan. 29, 2018, 127 Pages.
Final Office Action dated Jun. 2, 2020 for U.S. Appl. No. 16/557,383, filed Aug. 30, 2019, 66 Pages.
Final Office Action dated Nov. 3, 2020 for U.S. Appl. No. 15/974,430, filed May 8, 2018, 27 Pages.
Final Office Action dated Feb. 4, 2020 for U.S. Appl. No. 16/577,207, filed Sep. 20, 2019, 76 Pages.
Final Office Action dated Feb. 4, 2021 for U.S. Appl. No. 15/882,858, filed Jan. 29, 2018, 42 Pages.
Final Office Action dated Jun. 5, 2020 for U.S. Appl. No. 16/557,427, filed Aug. 30, 2019, 95 Pages.
Final Office Action dated Oct. 8, 2020 for U.S. Appl. No. 16/557,342, filed Aug. 30, 2019, 73 Pages.
Final Office Action dated Apr. 9, 2020 for U.S. Appl. No. 15/974,454, filed May 8, 2018, 19 Pages.
Final Office Action dated Dec. 11, 2019 for U.S. Appl. No. 15/974,430, filed May 8, 2018, 30 Pages.
Final Office Action dated Jan. 13, 2021 for U.S. Appl. No. 16/577,207, filed Sep. 20, 2019, 91 Pages.
Final Office Action dated Dec. 18, 2019 for U.S. Appl. No. 16/258,279, filed Jan. 25, 2019, 45 Pages.
Final Office Action dated Feb. 19, 2021 for U.S. Appl. No. 16/258,279, filed Jan. 25, 2019, 58 Pages.
Final Office Action dated Sep. 23, 2020 for U.S. Appl. No. 15/816,435, filed Nov. 17, 2017, 70 Pages.
Final Office Action dated Jan. 28, 2020 for U.S. Appl. No. 16/557,342, filed Aug. 30, 2019, 15 Pages.
Final Office Action dated Jul. 28, 2017 for U.S. Appl. No. 14/505,836, filed Oct. 3, 2014, 52 Pages.
Final Office Action dated Jun. 28, 2021 for U.S. Appl. No. 16/557,342, filed Aug. 30, 2019, 11 Pages.
Final Office Action dated Nov. 29, 2019 for U.S. Appl. No. 15/659,072, filed Jul. 25, 2017, 36 Pages.
Final Office Action dated Nov. 29, 2019 for U.S. Appl. No. 16/353,998, filed Mar. 14, 2019, 33 Pages.
Fong H.C., et al., "PepperGram With Interactive Control," 22nd International Conference Onvirtual System & Multimedia (VSMM), Oct. 17, 2016, 5 pages.
Gallina A., et al., "Surface EMG Biofeedback," Surface Electromyography: Physiology, Engineering, and Applications, 2016, pp. 485-500.
Ghasemzadeh H., et al., "A Body Sensor Network With Electromyogram and Inertial Sensors: Multimodal Interpretation of Muscular Activities," IEEE Transactions on Information Technology in Biomedicine, Mar. 2010, vol. 14 (2), pp. 198-206.
Gopura R.A.R.C., et al., "A Human Forearm and Wrist Motion Assist Exoskeleton Robot With EMG-Based Fuzzy-Neuro Control," Proceedings of the 2nd Biennial IEEE/RAS-EMBS International Conference on Biomedical Robotics and Biomechatronics, Oct. 19-22, 2008, 6 pages.

(56) References Cited

OTHER PUBLICATIONS

Gourmelon L., et al., "Contactless Sensors for Surface Electromyography," Proceedings of the 28th IEEE EMBS Annual International Conference, New York City, NY, Aug. 30-Sep. 3, 2006, pp. 2514-2517.
Hauschild M., et al., "A Virtual Reality Environment for Designing and Fitting Neural Prosthetic Limbs," IEEE Transactions on Neural Systems and Rehabilitation Engineering, Mar. 2007, vol. 15 (1), pp. 9-15.
International Search Report and Written Opinion for International Application No. PCT/US2014/017799, dated May 16, 2014, 9 pages.
International Search Report and Written Opinion for International Application No. PCT/US2014/037863, dated Aug. 21, 2014, 10 pages.
International Preliminary Report on Patentability for International Application No. PCT/US2017/043693, dated Feb. 7, 2019, 7 Pages.
International Preliminary Report on Patentability for International Application No. PCT/US2017/043791, dated Feb. 7, 2019, 9 Pages.
International Preliminary Report on Patentability for International Application No. PCT/US2019/031114, dated Nov. 19, 2020, 16 pages.
International Preliminary Report on Patentability for International Application No. PCT/US2019/049094, dated Mar. 11, 2021, 24 Pages.
International Preliminary Report on Patentability for International Application No. PCT/US2019/052151, dated Apr. 1, 2021, 9 pages.
International Preliminary Report on Patentability for International Application No. PCT/US2014/017799, dated Sep. 3, 2015, 8 Pages.
International Preliminary Report on Patentability for International Application No. PCT/US2014/037863, dated Nov. 26, 2015, 8 pages.
International Preliminary Report on Patentability for International Application No. PCT/US2014/052143, dated Mar. 3, 2016, 7 pages.
International Preliminary Report on Patentability for International Application No. PCT/US2014/067443, dated Jun. 9, 2016, 7 pages.
International Preliminary Report on Patentability for International Application No. PCT/US2015/015675, dated Aug. 25, 2016, 8 Pages.
International Preliminary Report on Patentability for International Application No. PCT/US2017/043686, dated Feb. 7, 2019, 8 pages.
International Preliminary Report on Patentability for International Application No. PCT/US2017/043792, dated Feb. 7, 2019, 8 Pages.
International Preliminary Report on Patentability for International Application No. PCT/US2018/056768, dated Apr. 30, 2020, 7 pages.
International Preliminary Report on Patentability for International Application No. PCT/US2018/061409, dated May 28, 2020, 10 pages.
International Preliminary Report on Patentability for International Application No. PCT/US2019/015174, dated Aug. 6, 2020, 7 pages.
Al-Jumaily A., et al., "Electromyogram(EMG) Driven System based Virtual Reality for Prosthetic and Rehabilitation Devices," Proceedings of the 11th Internationalconference on Information Integration Andweb-Based Applications & SERVICES, Jan. 1, 2009, pp. 582-586.
Al-Mashhadany Y.I., "Inverse Kinematics Problem (IKP) of 6-DOF Manipulator by Locally Recurrent Neural Networks (LRNNs)," Management and Service Science (MASS), International Conference on Management and Service Science., IEEE, Aug. 24, 2010, 5 pages.
Al-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.
Arkenbout E.A., et al., "Robust Hand Motion Tracking through Data Fusion of 5DT Data Glove and Nimble VR Kinect Camera Measurements," Sensors, 2015, vol. 15, pp. 31644-31671.
Benko H., et al., "Enhancing Input On and Above the Interactive Surface with Muscle Sensing," The ACM International Conference on Interactive Tabletops and Surfaces (ITS), Nov. 23-25, 2009, pp. 93-100.
Berenzweig A., et al., "Wearable Devices and Methods for Improved Speech Recognition," U.S. Appl. No. 16/785,680, filed Feb. 10, 2020, 67 pages.
Boyali A., et al., "Spectral Collaborative Representation based Classification for Hand Gestures Recognition on Electromyography Signals," Biomedical Signal Processing and Control, 2016, vol. 24, pp. 11-18.
Brownlee J., "Finite State Machines (FSM): Finite State Machines as a Control Technique in Artificial Intelligence (AI)," FSM, Jun. 2002, 12 pages.
Cannan J., et al., "A Wearable Sensor Fusion Armband for Simple Motion Control and Selection for Disabled and Non-Disabled Users," Computer Science and Electronic Engineering Conference, IEEE, Sep. 12, 2012, pp. 216-219, XP032276745.
Cheng J., et al., "A Novel Phonology- and Radical-Coded Chinese Sign Language Recognition Framework Using Accelerometer and Surface Electromyography Sensors," Sensors, 2015, vol. 15, pp. 23303-23324.
Communication Pursuant to Article 94(3) for European Patent Application No. 17835112.8, dated Dec. 14, 2020, 6 Pages.
Communication Pursuant to Rule 164(1) EPC, Partial Supplementary European Search Report for European Application No. 14753949.8, dated Sep. 30, 2016, 7 pages.
Co-pending U.S. Appl. No. 15/659,072, inventors Patrick; Kaifosh et al., filed Jul. 25, 2017.
Co-pending U.S. Appl. No. 15/816,435, inventors Ning; Guo et al., filed Nov. 17, 2017.
Co-pending U.S. Appl. No. 15/882,858, inventors Stephen; Lake et al., filed Jan. 29, 2018.
Co-pending U.S. Appl. No. 15/974,430, inventors Adam; Berenzweig et al., filed May 8, 2018.
Co-pending U.S. Appl. No. 16/353,998, inventors Patrick; Kaifosh et al., filed Mar. 14, 2019.
Co-pending U.S. Appl. No. 16/557,383, inventors Adam; Berenzweig et al., filed Aug. 30, 2019.
Co-pending U.S. Appl. No. 16/557,427, inventors Adam; Berenzweig et al., filed Aug. 30, 2019.
Co-Pending U.S. Appl. No. 15/974,430, filed May 8, 2018, 44 Pages.
Co-Pending U.S. Appl. No. 16/353,998, filed Mar. 14, 2019, 43 pages.
Co-Pending U.S. Appl. No. 16/557,383, filed Aug. 30, 2019, 94 Pages.
Co-Pending U.S. Appl. No. 16/557,427, filed Aug. 30, 2019, 93 Pages.
Co-Pending U.S. Appl. No. 16/577,207, filed Sep. 20, 2019, 67 Pages.
Co-Pending U.S. Appl. No. 14/505,836, filed Oct. 3, 2014, 59 Pages.
Co-Pending U.S. Appl. No. 15/816,435, filed Nov. 17, 2017, 24 Pages.
Co-Pending U.S. Appl. No. 15/882,858, filed Jan. 29, 2018, 54 Pages.
Co-Pending U.S. Appl. No. 15/974,384, filed May 8, 2018, 44 Pages.
Co-Pending U.S. Appl. No. 15/974,454, filed May 8, 2018, 45 Pages.
Co-Pending U.S. Appl. No. 16/557,342, filed Aug. 30, 2019, 93 Pages.
Corazza S., et al., "A Markerless Motion Capture System to Study Musculoskeletal Biomechanics: Visual Hull and Simulated Annealing Approach," Annals of Biomedical Engineering, Jul. 2006, vol. 34 (6), pp. 1019-1029, [Retrieved an Dec. 11, 2019], 11 pages, Retrieved from the Internet: URL: https://www.researchgate.net/publication/6999610_A_Markerless_Motion_Capture_System_to_Study_Musculoskeletal_Biomechanics_Visual_Hull_and_Simulated_Annealing_Approach.
Costanza E., et al., "EMG as a Subtle Input Interface for Mobile Computing," Mobile HCI, LNCS 3160, 2004, pp. 426-430.

(56) References Cited

OTHER PUBLICATIONS

Costanza E., et al., "Toward Subtle Intimate Interfaces for Mobile Devices Using an EMG Controller," CHI, Proceedings of the SIGCHI Conference on Human Factors in Computing Systems, Apr. 2-7, 2005, pp. 481-489.
Cote-Allard U., et al., "Deep Learning for Electromyographic Hand Gesture Signal Classification Using Transfer Learning," IEEE Transactions on Neural Systems and Rehabilitation Engineering, Jan. 26, 2019, vol. 27 (4), 11 Pages.
Csapo A.B., et al., "Evaluation of Human-Myo Gesture Control Capabilities in Continuous Search and Select Operations," 7th IEEE International Conference on Cognitive Infocommunications, Oct. 16-18, 2016, pp. 000415-000420.
Davoodi R., et al., "Development of a Physics-Based Target Shooting Game to Train Amputee Users of Multi joint Upper Limb Prostheses," Presence, Massachusetts Institute of Technology, 2012, vol. 21 (1), pp. 85-95.
Delis A.L., et al., "Development of a Myoelectric Controller Based on Knee Angle Estimation," Biodevices, International Conference on Biomedical Electronics and Devices, Jan. 17, 2009, 7 pages.
Diener L., et al., "Direct Conversion From Facial Myoelectric Signals to Speech Using Deep Neural Networks," International Joint Conference on Neural Networks (IJCNN), Oct. 1, 2015, 7 pages.
Ding I-J., et al., "HMM with Improved Feature Extraction-Based Feature Parameters for Identity Recognition of Gesture Command Operators by Using a Sensed Kinect-Data Stream," Neurocomputing, 2017, vol. 262, pp. 108-119.
European Search Report for European Application No. 19861903.3, dated Oct. 12, 2021, 2 pages.
European Search Report for European Application No. 19863248.1, dated Oct. 19, 2021, 2 pages.
European Search Report for European Application No. 19868789.9, dated May 9, 2022, 9 pages.
European Search Report for European Application No. 19890394.0, dated Apr. 29, 2022, 9 pages.
Extended European Search Report for European Application No. 18879156.0, dated Mar. 12, 2021, 11 pages.
Extended European Search Report for European Application No. 19743717.1, dated Mar. 3, 2021, 12 pages.
Extended European Search Report for European Application No. 19744404.5, dated Mar. 29, 2021, 11 pages.
Extended European Search Report for European Application No. 19799947.7, dated May 26, 2021, 10 pages.
Extended European Search Report for European Application No. 17835111.0, dated Nov. 21, 2019, 6 pages.
Extended European Search Report for European Application No. 17835112.8, dated Feb. 5, 2020, 17 pages.
Extended European Search Report for European Application No. 17835140.9, dated Nov. 26, 2019, 10 Pages.
Koerner M.D., "Design and Characterization of the Exo-Skin Haptic Device: A Novel Tendon Actuated Textile Hand Exoskeleton," Abstract of thesis for Drexel University Masters Degree [online], Nov. 2, 2017, 5 pages, Retrieved from the Internet: URL: https://dialog.proquest.com/professional/docview/1931047627?accountid=153692.
Lee D.C., et al., "Motion and Force Estimation System of Human Fingers," Journal of Institute of Control, Robotics and Systems, 2011, vol. 17 (10), pp. 1014-1020.
Li Y., et al., "Motor Function Evaluation of Hemiplegic Upper-Extremities Using Data Fusion from Wearable Inertial and Surface EMG Sensors," Sensors, MDPI, 2017, vol. 17 (582), pp. 1-17.
Lopes J., et al., "Hand/Arm Gesture Segmentation by Motion Using IMU and EMG Sensing," ScienceDirect, Jun. 27-30, 2017, vol. 11, pp. 107-113.
Marcard T.V., et al., "Sparse Inertial Poser: Automatic 3D Human Pose Estimation from Sparse IMUs," arxiv.org, Computer Graphics Forum, 2017, vol. 36 (2), 12 pages, XP080759137.
Martin H., et al., "A Novel Approach of Prosthetic Arm Control using Computer Vision, Biosignals, and Motion Capture," IEEE Symposium on Computational Intelligence in Robotic Rehabilitation and Assistive Technologies (CIR2AT), 2014, 5 pages.
McIntee S.S., "A Task Model of Free-Space Movement-Based Geastures," Dissertation, Graduate Faculty of North Carolina State University, Computer Science, 2016, 129 pages.
Mendes Jr.J.J.A., et al., "Sensor Fusion and Smart Sensor in Sports and Biomedical Applications," Sensors, 2016, vol. 16 (1569), pp. 1-31.
Mohamed O.H., "Homogeneous Cognitive Based Biometrics for Static Authentication," Dissertation submitted to University of Victoria, Canada, 2010, [last accessed Oct. 11, 2019], 149 pages, Retrieved from the Internet: URL: http://hdl.handle.net/1828/321.
Morris D., et al., "Emerging Input Technologies for Always-Available Mobile Interaction," Foundations and Trends in Human-Computer Interaction, 2010, vol. 4 (4), pp. 245-316.
Naik G.R., et al., "Source Separation and Identification issues in Bio Signals: A Solution using Blind Source Separation," Chapter 4 of Recent Advances in Biomedical Engineering, Intech, 2009, 23 pages.
Naik G.R., et al., "Real-Time Hand Gesture Identification for Human Computer Interaction Based on ICA of Surface Electromyogram," IADIS International Conference Interfaces and Human Computer Interaction, 2007, pp. 83-90.
Naik G.R., et al., "Subtle Hand Gesture Identification for HCI Using Temporal Decorrelation Source Separation BSS of Surface EMG," Digital Image Computing Techniques and Applications, IEEE Computer Society, 2007, pp. 30-37.
Negro F., et al., "Multi-Channel Intramuscular and Surface EMG Decomposition by Convolutive Blind Source Separation," Journal of Neural Engineering, Feb. 29, 2016, vol. 13, 18 Pages.
Non-Final Office Action dated Mar. 2, 2021 for U.S. Appl. No. 15/974,430, filed May 8, 2018, 32 Pages.
Non-Final Office Action dated Sep. 2, 2020 for U.S. Appl. No. 15/882,858, filed Jan. 29, 2018, 66 Pages.
Non-Final Office Action dated Aug. 3, 2020 for U.S. Appl. No. 16/593,446, filed Oct. 4, 2019, 44 pages.
Non-Final Office Action dated Jun. 3, 2021 for U.S. Appl. No. 15/816,435, filed Nov. 17, 2017, 32 Pages.
Non-Final Office Action dated Jun. 5, 2020 for U.S. Appl. No. 15/659,072, filed Jul. 25, 2017, 59 Pages.
Non-Final Office Action dated Sep. 6, 2019 for U.S. Appl. No. 16/424,144, filed May 28, 2019, 11 Pages.
Non-Final Office Action dated Feb. 8, 2021 for U.S. Appl. No. 16/557,342, filed Aug. 30, 2019, 11 Pages.
Non-Final Office Action dated Oct. 8, 2020 for U.S. Appl. No. 16/577,207, filed Sep. 20, 2019, 51 Pages.
Non-Final Office Action dated Apr. 9, 2019 for U.S. Appl. No. 16/258,409, filed Jan. 25, 2019, 71 Pages.
Non-Final Office Action dated Aug. 11, 2021 for U.S. Appl. No. 16/577,207, filed Sep. 20, 2019, 35 Pages.
Non-Final Office Action dated Jun. 13, 2019 for U.S. Appl. No. 16/258,279, filed Jan. 25, 2019, 38 Pages.
Non-Final Office Action dated Jun. 15, 2020 for U.S. Appl. No. 16/557,342, filed Aug. 30, 2019, 46 Pages.
Non-Final Office Action dated Jan. 16, 2020 for U.S. Appl. No. 16/389,419, filed Apr. 19, 2019, 26 Pages.
Non-Final Office Action dated May 16, 2019 for U.S. Appl. No. 15/974,384, filed May 8, 2018, 13 Pages.
Non-Final Office Action dated May 16, 2019 for U.S. Appl. No. 15/974,430, filed May 8, 2018, 12 Pages.
Non-Final Office Action dated Nov. 19, 2019 for U.S. Appl. No. 16/577,207, filed Sep. 20, 2019, 32 Pages.
Non-Final Office Action dated Aug. 20, 2020 for U.S. Appl. No. 15/974,454, filed May 8, 2018, 59 Pages.
Non-Final Office Action dated Dec. 20, 2019 for U.S. Appl. No. 15/974,454, filed May 8, 2018, 41 Pages.
Non-Final Office Action dated Jan. 22, 2020 for U.S. Appl. No. 15/816,435, filed Nov. 17, 2017, 35 Pages.
Non-Final Office Action dated Oct. 22, 2019 for U.S. Appl. No. 16/557,342, filed Aug. 30, 2019, 16 Pages.
Non-Final Office Action dated Dec. 23, 2019 for U.S. Appl. No. 16/557,383, filed Aug. 30, 2019, 53 Pages.

(56) References Cited

OTHER PUBLICATIONS

Non-Final Office Action dated Dec. 23, 2019 for U.S. Appl. No. 16/557,427, filed Aug. 30, 2019, 52 Pages.
Non-Final Office Action dated Feb. 23, 2017 for U.S. Appl. No. 14/505,836, filed Oct. 3, 2014, 54 Pages.
Non-Final Office Action dated Jul. 23, 2020 for U.S. Appl. No. 16/593,446, filed Oct. 4, 2019, 28 pages.
Non-Final Office Action dated May 24, 2019 for U.S. Appl. No. 16/353,998, filed Mar. 14, 2019, 20 Pages.
Non-Final Office Action dated May 26, 2020 for U.S. Appl. No. 16/353,998, filed Mar. 14, 2019, 60 Pages.
Non-Final Office Action dated Nov. 27, 2020 for U.S. Appl. No. 16/258,279, filed Jan. 25, 2019, 44 Pages.
Non-Final Office Action dated Apr. 29, 2019 for U.S. Appl. No. 16/257,979, filed Jan. 25, 2019, 63 Pages.
Non-Final Office Action dated Apr. 30, 2019 for U.S. Appl. No. 15/659,072, filed Jul. 25, 2017, 99 Pages.
Non-Final Office Action dated Apr. 30, 2020 for U.S. Appl. No. 15/974,430, filed May 8, 2018, 57 Pages.
Non-Final Office Action dated Dec. 30, 2019 for U.S. Appl. No. 16/593,446, filed Oct. 4, 2019, 43 pages.
Non-Final Office Action dated Jun. 30, 2016 for U.S. Appl. No. 14/505,836, filed Oct. 3, 2014, 37 Pages.
Non-Final Office Action dated Oct. 30, 2019 for U.S. Appl. No. 15/882,858, filed Jan. 29, 2018, 22 Pages.
Notice of Allowance dated Nov. 2, 2020 for U.S. Appl. No. 15/974,454, filed May 8, 2018, 24 Pages.
Notice of Allowance dated Nov. 4, 2019 for U.S. Appl. No. 15/974,384, filed May 8, 2018, 39 Pages.
Notice of Allowance dated Feb. 6, 2020 for U.S. Appl. No. 16/424,144, filed May 28, 2019, 28 Pages.
Notice of Allowance dated Feb. 9, 2022 for U.S. Appl. No. 15/882,858, filed Jan. 29, 2018, 9 pages.
Notice of Allowance dated Nov. 10, 2021 for U.S. Appl. No. 15/882,858, filed Jan. 29, 2018, 6 pages.
Notice of Allowance dated Jul. 15, 2021 for U.S. Appl. No. 15/882,858, filed Jan. 29, 2018, 2 pages.
Notice of Allowance dated Dec. 16, 2020 for U.S. Appl. No. 16/593,446, filed Oct. 4, 2019, 44 pages.
Notice of Allowance dated May 18, 2020 for U.S. Appl. No. 16/258,279, filed Jan. 25, 2019, 42 Pages.
Notice of Allowance dated May 18, 2022 for U.S. Appl. No. 15/882,858, filed Jan. 29, 2018, 10 pages.
Notice of Allowance dated Aug. 19, 2020 for U.S. Appl. No. 16/557,427, filed Aug. 30, 2019, 22 Pages.
Notice of Allowance dated Jul. 19, 2019 for U.S. Appl. No. 16/258,409, filed Jan. 25, 2019, 36 Pages.
Notice of Allowance dated May 20, 2020 for U.S. Appl. No. 16/389,419, filed Apr. 19, 2019, 28 Pages.
Notice of Allowance dated Oct. 22, 2021 for U.S. Appl. No. 15/882,858, filed Jan. 29, 2018, 8 pages.
Notice of Allowance dated Aug. 23, 2021 for U.S. Appl. No. 15/974,430, filed May 8, 2018, 12 pages.
Notice of Allowance dated Dec. 23, 2020 for U.S. Appl. No. 15/659,072, filed Jul. 25, 2017, 26 Pages.
Notice of Allowance dated Jun. 28, 2021 for U.S. Appl. No. 15/882,858, filed Jan. 29, 2018, 18 pages.
Notice of Allowance dated Jul. 31, 2019 for U.S. Appl. No. 16/257,979, filed Jan. 25, 2019, 22 Pages.
Office action for European Application No. 17835112.8, dated Feb. 11, 2022, 11 Pages.
Office Action for European Patent Application No. 19743717.1, dated Apr. 11, 2022, 10 pages.
Partial Supplementary European Search Report for European Application No. 18879156.0, dated Dec. 7, 2020, 9 pages.
Picard R.W., et al., "Affective Wearables," Proceedings of the IEEE 1st International Symposium on Wearable Computers, ISWC, Cambridge, MA, USA, Oct. 13-14, 1997, pp. 90-97.
Preinterview First Office Action dated Jun. 24, 2020 for U.S. Appl. No. 16/785,680, filed Feb. 10, 2020, 90 Pages.
Rekimoto J., "GestureWrist and GesturePad: Unobtrusive Wearable Interaction Devices," ISWC Proceedings of the 5th IEEE International Symposium on Wearable Computers, 2001, 7 pages.
Saponas T.S., et al., "Demonstrating the Feasibility of Using Forearm Electromyography for Muscle-Computer Interfaces," CHI Proceedings, Physiological Sensing for Input, Apr. 5-10, 2008, pp. 515-524.
Saponas T.S., et al., "Enabling Always-Available Input with Muscle-Computer Interfaces," Conference: Proceedings of the 22nd Annual ACM Symposium on User Interface Software and Technology, Oct. 7, 2009, pp. 167-176.
Saponas T.S., et al., "Making Muscle-Computer Interfaces More Practical," CHI, Atlanta, Georgia, USA, Apr. 10-15, 2010, 4 pages.
Sartori M., et al., "Neural Data-Driven Musculoskeletal Modeling for Personalized Neurorehabilitation Technologies," IEEE Transactions on Biomedical Engineering, May 5, 2016, vol. 63 (5), pp. 879-893.
Sato M., et al., "Touche: Enhancing Touch Interaction on Humans, Screens, Liquids, and Everyday Objects," CHI, Austin, Texas, May 5-10, 2012, 10 pages.
Sauras-Perez P., et al., "A Voice and Pointing Gesture Interaction System for Supporting Human Spontaneous Decisions in Autonomous Cars," Clemson University, All Dissertations, May 2017, 174 pages.
Shen S., et al., "I Am a Smartwatch and I Can Track My User's Arm," University of Illinois at Urbana-Champaign, MobiSys, Jun. 25-30, 2016, 12 pages.
Son M., et al., "Evaluating the Utility of Two Gestural Discomfort Evaluation Methods," PLOS One, Apr. 19, 2017, 21 pages.
Strbac M., et al., "Microsoft Kinect-Based Artificial Perception System for Control of Functional Electrical Stimulation Assisted Grasping," Hindawi Publishing Corporation, BioMed Research International [online], 2014, Article No. 740469, 13 pages, Retrieved from the Internet: URL: https://dx.doi.org/10.1155/2014/740469.
Torres T., "Myo Gesture Control Armband," PCMag, Jun. 8, 2015, 9 pages, Retrieved from the Internet: URL: https://www.pcmag.com/article2/0,2817,2485462,00.asp.
Ueno A., et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007, pp. 5731-5734.
Ueno A., et al., "Feasibility of Capacitive Sensing of Surface Electromyographic Potential through Cloth," Sensors and Materials, 2012, vol. 24 (6), pp. 335-346.
Valero-Cuevas F.J., et al., "Computational Models for Neuromuscular Function," IEEE Reviews in Biomedical Engineering, 2009, vol. 2, NIH Public Access Author Manuscript [online], Jun. 16, 2011 [Retrieved on Jul. 29, 2019], 52 pages. Retrieved from the Internet: URL: https://www.ncbi.nlm.nih.gov/pmc/articles/PMC3116649/.
Wittevrongel B., et al., "Spatiotemporal Beamforming: A Transparent and Unified Decoding Approach to Synchronous Visual Brain-Computer Interfacing," Frontiers in Neuroscience, Nov. 15, 2017, vol. 11, Article No. 630, 13 Pages.
Wodzinski M., et al., "Sequential Classification of Palm Gestures Based on A* Algorithm and MLP Neural Network tor Quadrocopter Control," Metrology and Measurement Systems, 2017, vol. 24 (2), pp. 265-276.
Xiong A., et al., "A Novel HCI based on EMG and IMU," Proceedings of the 2011 IEEE International Conference on Robotics and Biomimetics, Phuket, Thailand, Dec. 7-11, 2011, pp. 2653-2657.
Xu Z., et al., "Hand Gesture Recognition and Virtual Game Control Based on 3D Accelerometer and EMG Sensors," Proceedings of the 14th International Conference on Intelligent User Interfaces, D211 Sanibel Island, Florida, Feb. 8-11, 2009, pp. 401-406.
Xue Y., et al., "Multiple Sensors Based Hand Motion Recognition Using Adaptive Directed Acyclic Graph," Applied Sciences, MDPI, 2017, vol. 7 (358), pp. 1-14.
Yang Z., et al., "Surface EMG Based Handgrip Force Predictions Using Gene Expression Programming," Neurocomputing, 2016, vol. 207, pp. 568-579.

(56) References Cited

OTHER PUBLICATIONS

Zacharaki E.I., et al., "Spike Pattern Recognition by Supervised Classification in Low Dimensional Embedding Space," Brain Informatics, 2016, vol. 3, pp. 73-83.

Zhang X., et al., "A Framework for Hand Gesture Recognition Based on Accelerometer and EMG Sensors," IEEE Transactions on Systems, Man, and Cybernetics—Part A: Systems and Humans, Nov. 2011, vol. 41 (6), pp. 1064-1076.

Notice of Allowance dated Aug. 22, 2022 for U.S. Appl. No. 15/882,858, filed Jan. 29, 2018, 9 pages.

\* cited by examiner

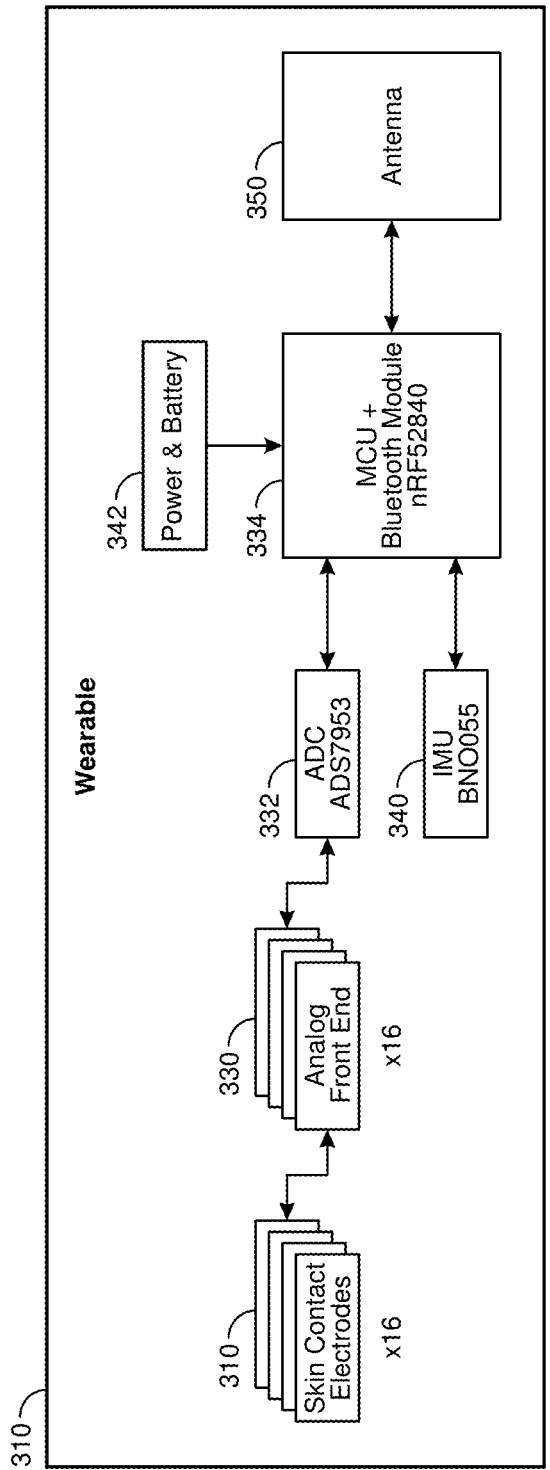
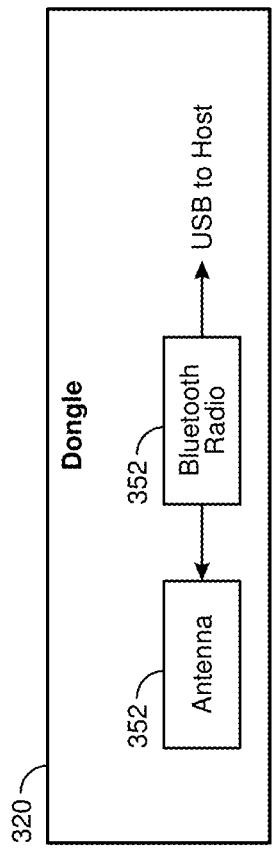
FIG. 3A
FIG. 3B

SYSTEMS, METHODS, AND INTERFACES FOR PERFORMING INPUTS BASED ON NEUROMUSCULAR CONTROL

CROSS REFERENCE TO RELATED APPLICATION

This application claims priority to and the benefit of U.S. Provisional Patent Application No. 62/895,888, filed Sep. 4, 2019, U.S. Provisional Patent Application No. 62/895,782, filed Sep. 4, 2019, U.S. Provisional Patent Application No. 62/897,483, filed Sep. 9, 2019, and U.S. Provisional Patent Application No. 62/897,592, filed Sep. 9, 2019, the disclosures of each of which are incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 3A and 3B illustrate schematic diagrams with internal components of a wearable system with multiple EMG sensors.

Figure 1:
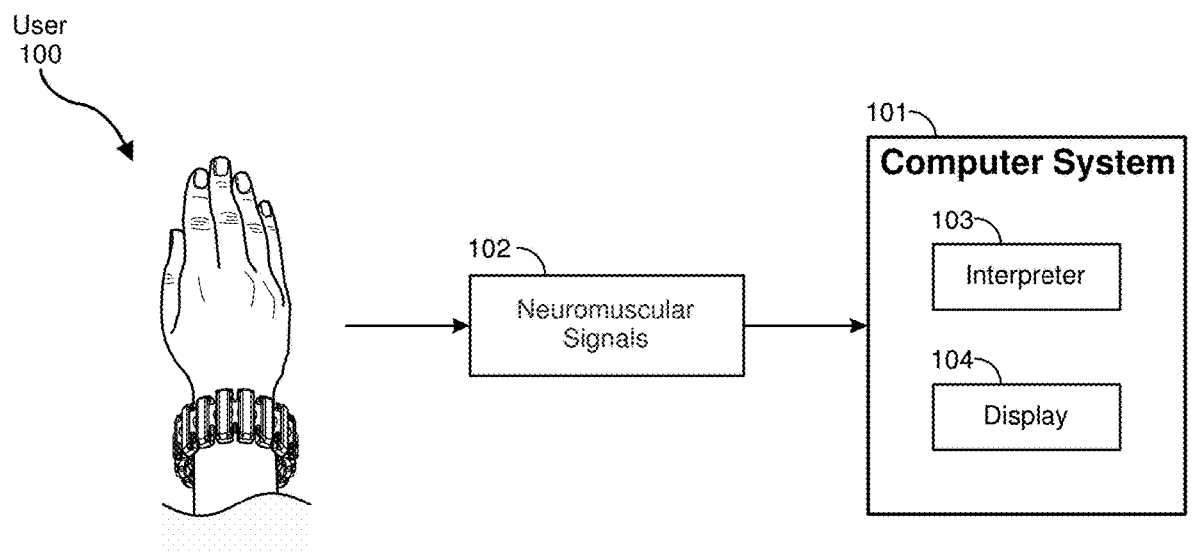
FIG. 1 illustrates an embodiment in which neuromuscular signals are measured from a user using neuromuscular sensors arranged around a band or other type of device worn by the user.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

While computing devices have evolved over time from large machines that sit on desktops to portable devices that fit in pockets, devices and interfaces used to provide text input to computing devices remain largely unchanged. The keyboard (and the QWERTY keyboard in particular) remains the most widely used device for providing text input to a computing device. Due to the proliferation of computing devices in society, typing on a keyboard has therefore become an important skill to interact with such devices. Typing on a keyboard, however, can be cumbersome to learn, and remains a relatively slow method of inputting text.

Still further, in some forms of text entry, the number of characters that can be input by a user may exceed the number of buttons or other input mechanisms. For example, numerical keypads on a phone may associate a set of characters with each number and may enable a user to select a character among the several present on each number sequentially (e.g., "A", "B," or "C" can be associated with the number "2"). However, mechanical, electrical, or other input mechanisms for machine control may be cumbersome and imprecise. Moreover, interactions with other types of devices that do not have traditional text input user interfaces may also be difficult to work with. For example, the number of Internet of Things (IoT) devices is growing rapidly, with many different types of devices and appliances being connected to (and controlled through) the internet. Interaction with these IoT devices may also be cumbersome in at least some instances.

The embodiments described herein may include methods, systems, and apparatuses to provide different ways of interacting with devices and different methods of inputting text to a computing device. These methods may leverage users' skilled knowledge of how to type on a keyboard, but without requiring a physical keyboard to do so. To this extent, some embodiments described herein are directed to a human-computer interface (HCI) system that maps neuromuscular signal recordings to text input for a computing device to enable a user to type without requiring the user to press keys on a physical keyboard or interact with a touchscreen displayed on a computing device. These alternative forms of text input may be beneficial for users having physical disabilities or injury. Still further, other embodiments may provide new forms of machine control based on inferring intent from a user's neuromuscular activity. In various embodiments, interpreting neuromuscular signals may be used in place of, or in addition to, conventional computer-based input methods and devices.

In some embodiments described herein, computers systems and methods are provided for detecting neuromuscular signals (e.g., as detected from a user) and interpreting these signals as text inputs. In some instances, interfaces may be provided using visual, haptic, audible, and/or other sensory means (or any combination thereof) to indicate which characters are being input by the user, so as to provide feedback to the user. Such user interfaces may be displayed to the user in a 2D plane or other arrangement (e.g., in a computer-based interface such as computer display provided in various computer systems, such as, for example, a standard computer monitor, smartphone, watch, heads-up-display (HUD), automotive display, projected interface, display such as those provided in an extended reality (XR), mixed reality (MR), augmented reality (AR) or virtual reality (VR) environment (e.g., XR, MR, AR, VR, headset etc.) or any other suitable graphical user interface, and indications of characters that are input may be displayed or presented to the user.

The user may use such feedback to adjust their neuromuscular activity in order to more accurately control their input within the 2D display (e.g., using neuromuscular activity that causes movement, forces, and selection gestures and combining that with feedback to control inputs). In some embodiments, the systems described herein receive neuromuscular signals from the user and translate those signals into movement control in a 2D plane. The systems then use selection control to input text into a computer system. In general herein, the visual interface is described as a 2D plane and may also be referred to as displayed on a 2D display, but one skilled in the art will recognize that the interface may employ other arrangements than a 2D plane (e.g., in a three-dimensional display) and immersive three-dimensional displays such as those made possible in AR or VR systems. For example, such movement control and selection control methods may be used along a defined surface in 3D space, such as a surface projected in 3D space (e.g., a curved display, a 3D rectangular surface, along an object surface in 3D space, etc.

In some embodiments, the systems described herein display characters that are capable of being input to the system within regions of a computer interface (e.g., any type of a computer-based display), with characters associated with the regions. In some cases, for example, a user may navigate to a region of the 2D display (or other display type) associated with a character they intend to input to the system. For example, a cursor can be shown on the display to indicate user navigation. In another example, a region to which a user has navigated can be indicated by changing the visual representation of that region of the display (e.g. by changing the color, shape, border width, etc.) and/or by providing other sensory feedback to a user (e.g., haptic or auditory). In some embodiments, navigation is based on an inference model that takes as input a plurality of neuromuscular signals from a device placed on a portion of the user's body (e.g., the forearm or wrist to record muscles that control movements of the fingers, hand, and wrist) and outputs a velocity, direction, and/or position of a cursor. Two-dimensional control generally corresponds to a movement or force, though in some cases may be based on muscle activations that do not cause a movement, force, or perceived proprioceptive signal (e.g., activation of a single motor unit or a small number of motor units).

In some embodiments, a user may select a letter in the region to which they have navigated the cursor, generally by performing a dynamic or static gesture, where the gesture can be determined based on the output of one or more inference models that take(s) as input(s) a plurality of neuromuscular signals from a device placed on a portion of the user's body (e.g., the forearm or wrist to record muscles that control movements of the fingers, hand, and wrist) and outputs a likelihood (and, optionally, a force) associated with a set of gestures. For example, a gesture may be a tap of a finger or a pinch of two fingers together. Multiple gestures may enable selection among a plurality of options (e.g., if several characters are present in a region to disambiguate among the group of characters). For example, a particular character may be selected among four options in a particular region by tapping one of the four fingers on a surface or by pinching one of the four fingers to the thumb).

The description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

The terms "computer", "processor", "computer processor", "computing device" or the like should be expansively construed to cover any kind of electronic device with data processing capabilities including, by way of non-limiting examples, a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as", "for instance" and variants thereof describe non-limiting embodiments of the presently disclosed subject matter. Reference in the specification to "one case", "some cases", "other cases", or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

FIG. 1 shows an exemplary implementation in which neuromuscular signals are measured from a user 100 using, for example, one or more neuromuscular sensors arranged around a band or other type of device worn by the user. For example, a band may include EMG sensors (or other types of neuromuscular sensors) arranged circumferentially around an elastic band as discussed further below. It should be appreciated that any suitable number of neuromuscular sensors may be used, and the number and arrangement of neuromuscular sensors used may depend on the particular application for which the wearable device is used.

The neuromuscular signals (e.g., signals 102) received by the neuromuscular sensors may be provided as an input to a computer system 101. It should be appreciated that the signals may be provided in raw form to the computer system, may be preprocessed, or may otherwise be analyzed and/or made into an interpreted or processed form as determined by one or more computer-based systems residing on the band or in any other location. Computer system 101 may include a display 104, which may be used to display, in some embodiments, a 2D representation to visually indicate which characters are being input by the user, so as to provide feedback to the user. Computer system 101 may also include an interpreter 103 that is capable of receiving neuromuscular signals (in any form) and determining one or more text-based inputs. It should be appreciated that a computer system for the disclosed technology may include one or more of the components shown in FIG. 1, or the components may be located in one or more systems, including a distributed network, on a system worn or used by a user (e.g., in a band, watch, mobile phone, or any other system), or the components may comprise any combination of the foregoing. Further, the system may comprise various hardware, firmware, and/or software components and accessories.

Figure 2A:
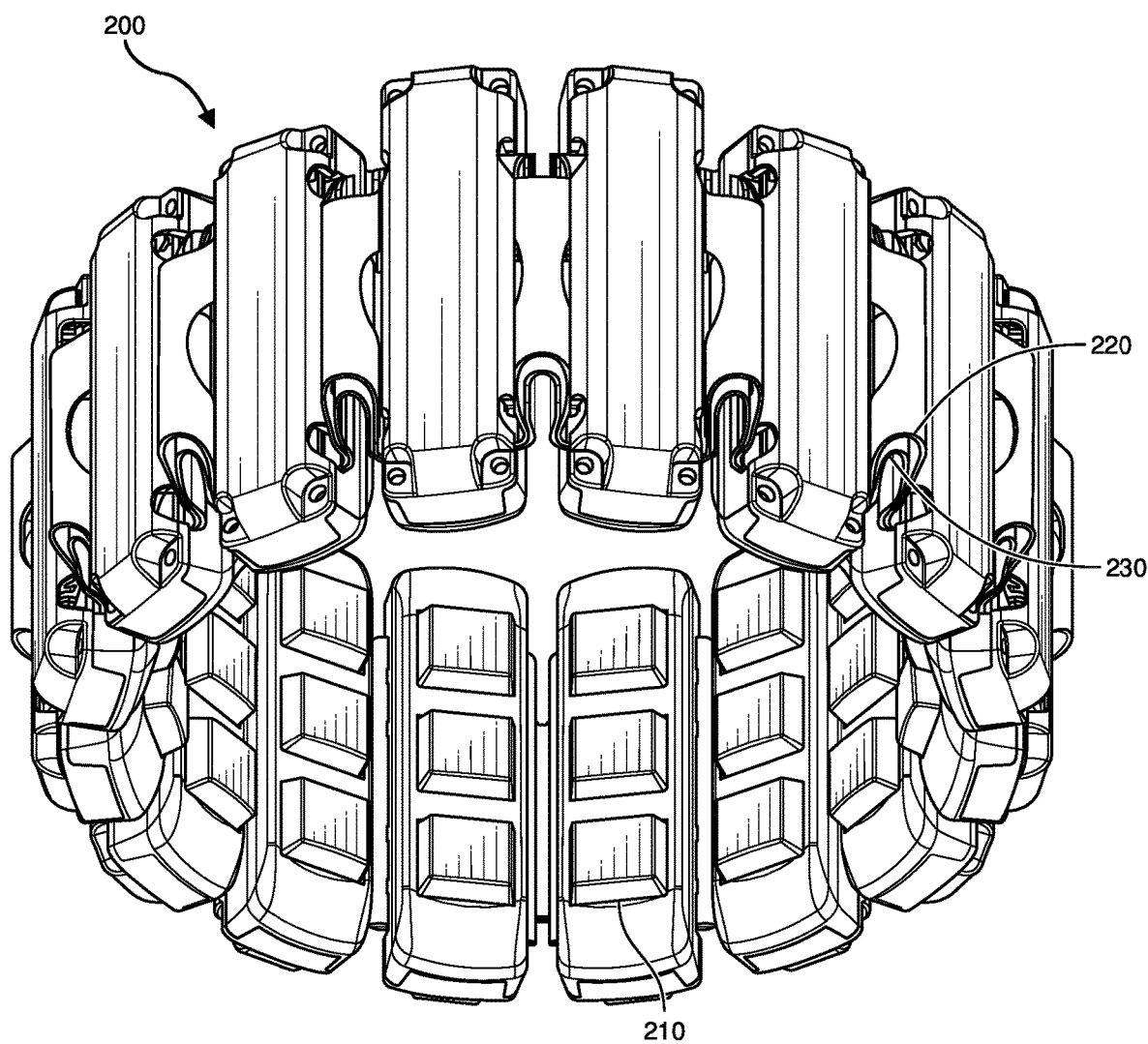
FIG. 2A illustrates a wearable system with multiple neuromuscular sensors arranged circumferentially around a band configured to be worn around a user's lower arm or wrist.

An example wearable system will now be described with reference to FIGS. 2A-3B. The wearable device 200 may be configured to sense neuromuscular signals. FIGS. 2A-2B and 3A-3B show several embodiments of a wearable system in which various embodiments may be practiced. In particular, FIG. 2A illustrates a wearable system with sixteen neuromuscular sensors 210 (e.g., EMG sensors) arranged circumferentially around an elastic band 220 configured to be worn around a user's lower arm or wrist. As shown, neuromuscular sensors 210 (e.g., EMG sensors) are arranged circumferentially around elastic band 220. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, controlling a robot, controlling a vehicle, scrolling through text, controlling a virtual avatar, or any other suitable control task.

Figure 2B:
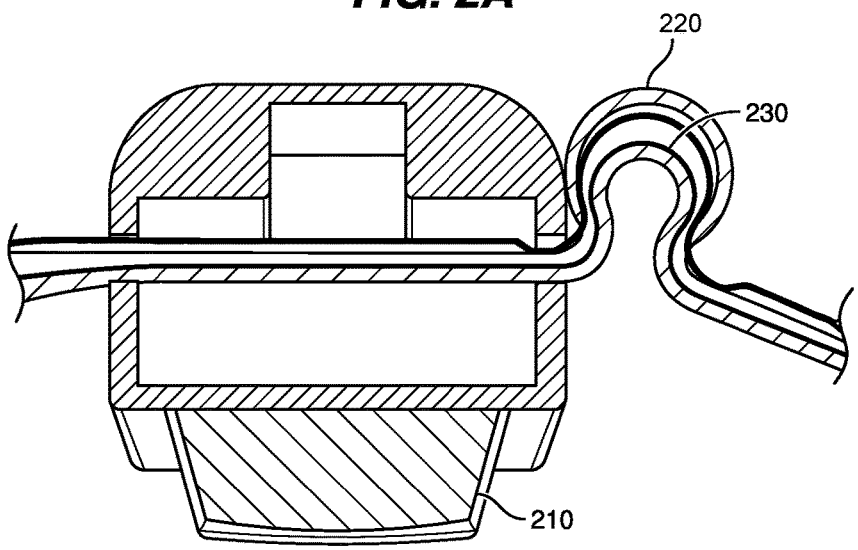
FIG. 2B illustrates a cross-sectional view through one of the sensors of the wearable device shown in FIG. 2A.

In some embodiments, sensors 210 include a set of neuromuscular sensors (e.g., EMG sensors). In other embodiments, sensors 210 can include a set of neuromuscular sensors and at least one "auxiliary" sensor configured to continuously record auxiliary signals. Examples of auxiliary sensors include, but are not limited to, other sensors such as IMU sensors, microphones, imaging sensors (e.g., a camera), radiation based sensors for use with a radiation-generation device (e.g., a laser-scanning device), or other types of sensors such as a heart-rate monitor. As shown the sensors 210 may be coupled together using flexible electronics 230 incorporated into the wearable device. FIG. 2B illustrates a cross-sectional view through one of the sensors 210 of the wearable device shown in FIG. 2A.

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 210 are discussed in more detail below in connection with FIGS. 3A and 3B.

FIGS. 3A and 3B illustrate a schematic diagram with internal components of a wearable system with sixteen EMG sensors, in accordance with some embodiments of the technology described herein. As shown, the wearable system includes a wearable portion 310 (FIG. 3A) and a dongle portion 320 (FIG. 3B) in communication with the wearable portion 310 (e.g., via Bluetooth or another suitable short-range wireless communication technology). As shown in FIG. 3A, the wearable portion 310 includes the sensors 210, examples of which are described in connection with FIGS. 2A and 2B. The output of the sensors 210 is provided to analog front end 330 configured to perform analog processing (e.g., noise reduction, filtering, etc.) on the recorded signals. The processed analog signals are then provided to analog-to-digital converter 332, which converts the analog signals to digital signals that can be processed by one or more computer processors. An example of a computer processor that may be used in accordance with some embodiments is microcontroller (MCU) 334 illustrated in FIG. 3A. As shown, MCU 334 may also include inputs from other sensors (e.g., IMU sensor 340), and power and battery module 342. The output of the processing performed by MCU may be provided to antenna 350 for transmission to dongle portion 320 shown in FIG. 3B.

Dongle portion 320 includes antenna 352 configured to communicate with antenna 350 included as part of wearable portion 310. Communication between antenna 350 and 352 may occur using any suitable wireless technology and protocol, non-limiting examples of which include radiofrequency signaling and Bluetooth. As shown, the signals received by antenna 352 of dongle portion 320 may be provided to a host computer for further processing, display, and/or for effecting control of a particular physical or virtual object or objects.

Although the examples provided with reference to FIGS. 2A, 2B and FIGS. 3A, 3B are discussed in the context of interfaces with EMG sensors, it is understood that the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors.

In some embodiments, the trained statistical models may be a neural network and, for example, may be a recurrent neural network. In some embodiments, the recurrent neural network may be a long short-term memory (LSTM) neural network. It should be appreciated, however, that the recurrent neural network is not limited to be an LSTM neural network and may have any other suitable architecture. For example, in some embodiments, the recurrent neural network may be a fully recurrent neural network, a gated recurrent neural network, a recursive neural network, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used. In some implementations, the statistical model can be an unsupervised machine learning model, e.g., users are not required to perform a predetermined set of gestures for which the statistical model was previously trained to predict or identify.

Processor-executable instructions can be in many forms, such as program modules, executed by one or more compute devices, and can include routines, programs, objects, components, data structures, etc. that perform particular tasks or implement particular data types, and the functionality can be combined and/or distributed as appropriate for various embodiments. Data structures can be stored in processor-readable media in a number of suitable forms. For simplicity of illustration, data structures may be shown to have fields that are related through location in the data structure. Such relationships may likewise be achieved by assigning storage for the fields with locations in a processor-readable medium that conveys relationship(s) between the fields. However, any suitable mechanism/tool can be used to establish a relationship between information in fields of a data structure, including through the use of pointers, tags or other mechanisms/tools that establish relationship between data elements.

All or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints that regulate how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using at least one of a trained statistical model, a trained machine learning model, or a combination thereof, as described in more detail below.

The portion of the human body approximated by a musculoskeletal representation as described herein as one non-limiting example, is a hand or a combination of a hand with one or more arm segments and the information used to describe a current state of the positional relationships between segments and force relationships for individual segments or combinations of segments in the musculoskeletal representation is referred to herein as the handstate of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

As discussed above, interfaces may be provided that visually indicate which characters are being input by the user. Such interfaces may be displayed to the user in a 2D plane such as in a display 401 shown in FIG. 4. Display 401 can include one or more graphical elements, including one or more defined regions (e.g., region 402) including one or more characters (e.g., characters 403). The interfaces described herein may also comprise other means of presenting feedback, including but not limited to auditory means, haptic means, and/or other sensory means, or any combination of the foregoing.

Display 401 may also show a location of a pointer or cursor within the display (e.g., pointer 404), and the system may be adapted to translate movement control in a 2D plane responsive to the received neuromuscular signals. In some embodiments, navigation is based on one or more inference model(s) that take(s) as input a plurality of neuromuscular signals from a device placed on a portion of the user's body (e.g., the forearm or wrist to record muscles that control movements of the fingers, hand, and wrist) and outputs a velocity, direction, and/or position of a pointer or cursor. The user may use such visual feedback to adjust their neuromuscular activity in order to more accurately control their input (e.g., movement and selection activities) within the 2D display. For instance, the user may move the cursor or pointer 404 to a particular region (e.g., the center region shown in FIG. 4, the region having text inputs "abcd"). When the pointer is located within the desired region, the user may perform some action, such as a discrete or continuous gesture to select a particular character displayed within the selected region (e.g., character "c" of the group of characters "abcd"). Once the gesture is detected, the selected character may be provided as input (e.g., such as an entry within an application, for example a chat window, email, word processing, or other application type). In some embodiments, other selection mechanisms may be used, such as a rotating selection among the options (e.g., an automated highlight of an option of "abcd" as it rotates within the display between other options), a time spent within the region (e.g., a selection of a character "a" after the cursor or pointer is located for a predetermined time within the region), a selection option to scroll or pan through different sets of characters, or other selection mechanisms.

Figure 5:
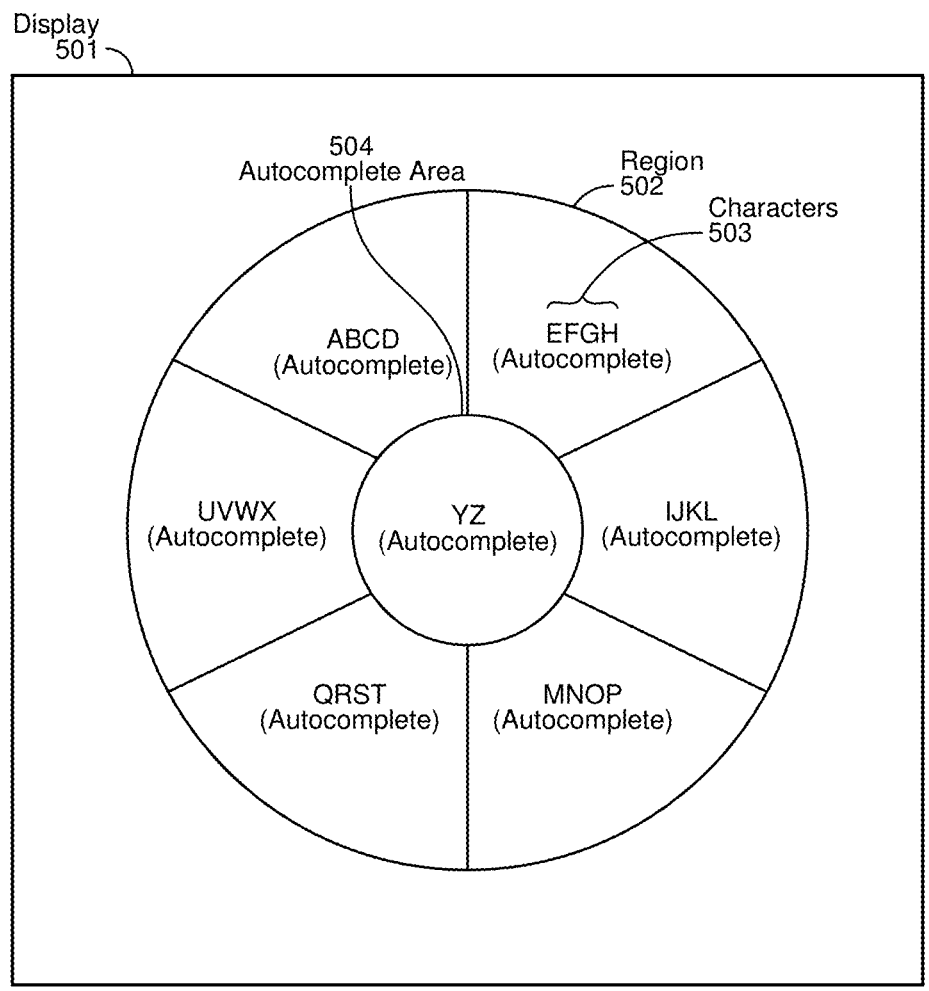
FIG. 5 illustrates an alternative embodiment of a user interface that is displayed to the user in a 2D plane.

As discussed, alternative interfaces having different display and control schemes may be used. For instance, as shown in FIG. 5, an interface may be provided which includes one or more "autocomplete" or "autosuggest" areas within the display (e.g., autocomplete area 504). In some embodiments, an autocomplete area may be displayed within a region, and a user may select among a number of autocomplete options by, for example, providing an appropriate neuromuscular input. For instance, in some embodiments, one or more autocomplete (or autocorrect) options may be selected by performing an appropriate discrete gesture. For example, as shown in FIG. 5, a user may have positioned a cursor within region 502, permitting the user to select characters "E", "F", "G" or "H" within that region. Based on the user's input and/or previous text selection, the system may display an appropriate autocomplete option. For instance, if the user navigates to region 502, the display may show, in an autocomplete area, four options, each associated with a particular gesture or series of gestures (e.g., number of finger taps or flick of one of the fingers). In some embodiments, autocomplete options may be based upon a natural language model that determines one or more probable characters based upon current and/or previous inputs. The user can select from one of the options by either using a specific gesture alone or a gesture in combination with the user controlling a pointer (not shown).

Figure 6:
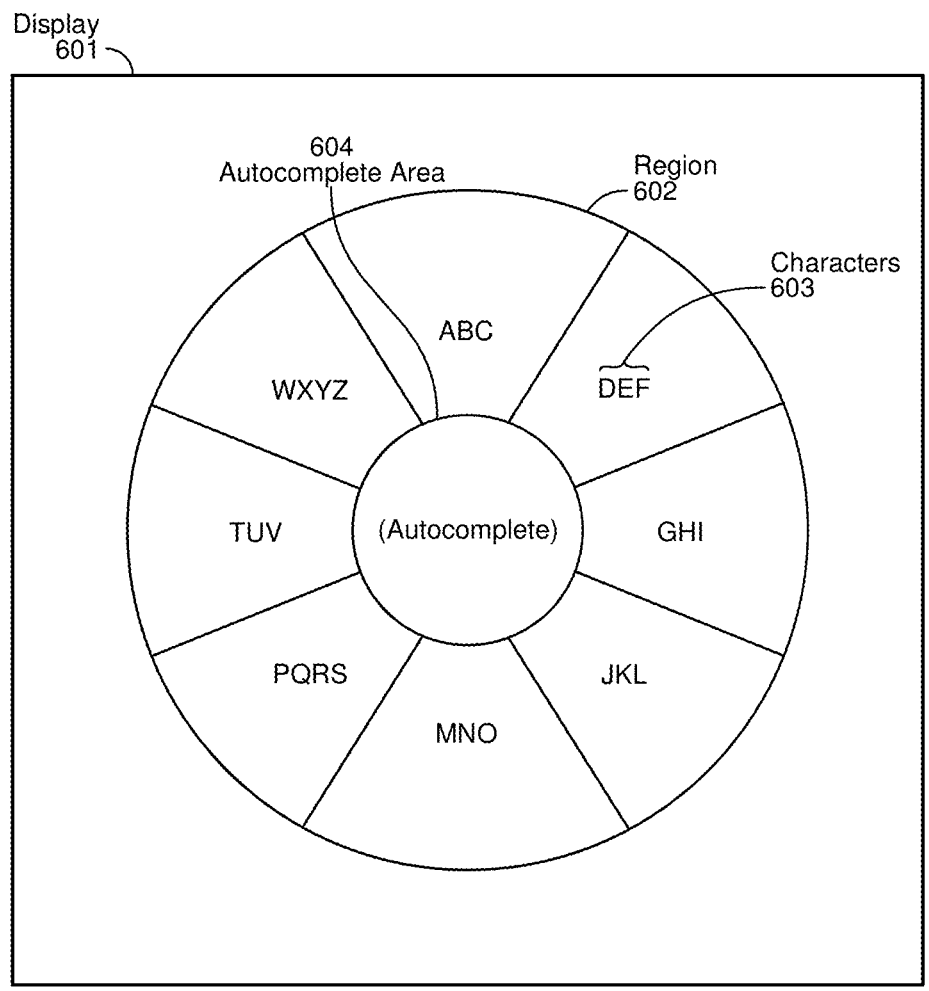
FIG. 6 illustrates an alternative embodiment of a user interface having a different type of control scheme.

FIG. 6 shows another implementation of an alternate interface having a different type of control scheme according to various embodiments. In particular, display 601 includes a circular type arrangement of regions (e.g., region 602), each of the regions having associated groups of text (e.g., character group 603 of text characters "D", "E", and "F") with a center region being an autocomplete area (e.g., autocomplete area 604). Either single characters can be displayed within this autocomplete area and/or probable words, numbers, or special characters (e.g., as computed using a language model). The user can select from one of the options by either using a specific gesture alone or a gesture in combination with the user controlling a pointer (not shown).

Figure 7:
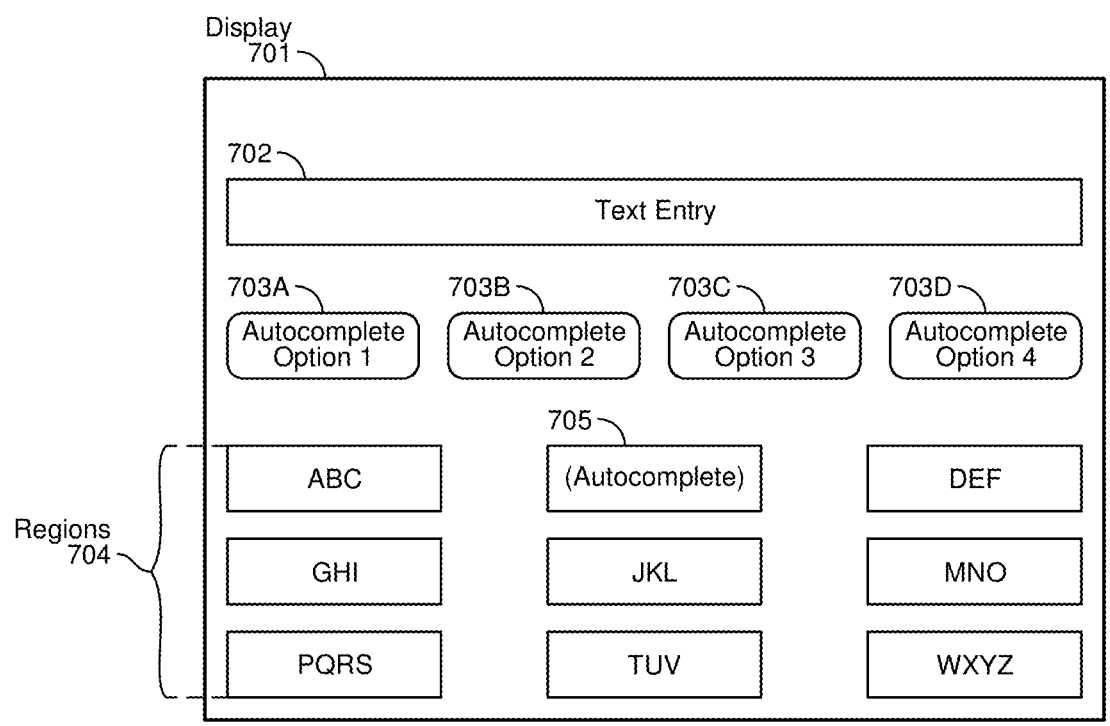
FIG. 7 illustrates an alternative embodiment of a user interface having another different type of control scheme.

FIG. 7 shows yet another example interface having a different type of control scheme according to various embodiments. In particular, display 701 includes a matrix type arrangement of regions (e.g. regions 704) in which possible text and/or autocomplete regions may be displayed. Further, display 701 may have one or more autocomplete options 1-4 (items 703A-703D) which include possible words associated with text entry area 702. As different characters are input, they may be displayed in area 702, and autocomplete option items 703A-703D may be adjusted as text that is entered to permit the user to autocomplete possible words formed with the text entered in area 702. Similarly, autocomplete area 705 may be associated with characters only within regions 704, permitting the user to more easily select the next character for input within area 702. The user can select from one of the options by either using a specific gesture alone or a gesture in combination with the user controlling a pointer (not shown).

Other arrangements and configurations of displays and control schemes may be provided. As discussed, in some embodiments, variations in the control scheme and 2D display options may be provided, depending on the application, user-type, user preferences, or computing environment, among other considerations.

For example, such variations may include, without limitation, the following variations, either alone or in combination with any other variation(s) A first example is text input based on 2D navigation and character selection by user time in region or single click. For example, the user controls movement within a 2D plane (or other shape onto which 2D movements can be effectively mapped such as in a virtual reality or augmented reality environment), and that movement is translated to different regions of the 2D plane, permitting the user to perform a selection activity. The selection activity may be performed by the user performing a dynamic or static gesture (e.g., a tap, pinch, pose, etc.). The selection activity may also be performed without an additional gesture (e.g., responsive to the user controlling the cursor to a selected region and remaining within the region for a predetermined amount of time, without leaving the region).

Another example is text input based on 2D navigation and character selection with multi-click. In some embodiments, it is appreciated that 2D movement control using neuromuscular activity may be more easily performed by a user if they are provided larger 2D regions within or over which to navigate, and "multi-click" operations may be performed by the user within a selected region using different dynamic or static gestures. In one example, multiple characters are grouped within a same region, and in response to a movement into or within that region by the user, the user is permitted to perform a selection activity of a particular character within the group by performing a particular dynamic or static gesture, thereby selecting the particular character.

A third example involves different shapes of regions for 2D navigation. In some embodiments, the regions containing characters can be shaped and/or arranged in a number of alternate ways, depending on system requirements and capabilities, user preferences and skill level for using a system or method of this type, and display platform (e.g., a laptop screen, computer screen, smartphone screen, tablet screen, smartwatch screen, VR, AR, or mixed reality system, etc.). In some embodiments, a user can specify a number of regions. For example, regions containing characters to which a user can navigate can be arranged as: a) a circle with slices and/or center region, b) a grid of squares or rectangles, c) other shapes or layouts in a layout or display amenable to navigation with two-dimensional control A fourth example involves characters assigned to each region. In some embodiments, the regions containing characters can contain an equal number of characters per region or a variable number of characters per region (e.g., based on the frequency of use of a particular character or likelihood that a character is often used after another). In some embodiments, the character composition of a region of the display can be dynamic and change based on previous or current text input. In some embodiments, the identity or order of characters assigned to each region can take different forms. For example, the system can use an alphabetical order assignment, a qwerty-based assignment, or another assignment protocol (e.g., by associating likelihood of using a letter with regions that are easier to access and, in embodiments with more than one character per region (e.g., requiring multiple discrete events to select among the several characters present in the region), associating more commonly used letters with gestures or poses (e.g., discrete events controls) that are more comfortable, convenient, and/or reliable.

A fifth example involves autocomplete functionality. In some embodiments, multiple autocomplete, autocorrect, and/or autosuggest options may be displayed and may be based on, for example, based on a natural language model. The user can navigate a cursor to a specified 'autocomplete' region in the display and then can select among several autocomplete, autocorrect, and/or autosuggest options by completing an appropriate discrete gesture. For example, up to four autocomplete, autocorrect, and/or autosuggest options can be displayed in a horizontal fashion to indicate to a user which of the four "mitten" fingers to tap or pinch (e.g., pinch the fingertip to the thumb) in order to select the displayed option. In some cases, fewer than four autocomplete, autocorrect, and/or autosuggest options can be displayed, causing one or more certain regions to be empty and thus causing no action to be performed upon a user's completion of a tap or pinch of a finger corresponding to an empty field. Multiple autocomplete, autocorrect, and/or autosuggest options may be displayed based on a natural language model. For example, a user may navigate the cursor to a region associated with an autocomplete, autocorrect, and/or autosuggest option and select an option with a specified gesture.

In general, selection for text entry can occur when a particular gesture is recognized based on one or more inference models for gestures that take(s) as input(s) a plurality of neuromuscular signals measured from a part of a user's body (e.g. measured on the user's wrist or forearm). In various embodiments, a selection for character input can occur upon detection of a specific gesture (among several enabled gestures) and/or upon detection of a repeated gesture (e.g., one could tap an index finger once for selecting a first item and twice (within a particular time window) for selecting a second item).

Particular gestures can be used for additional functionality. For example, a fist pose may be used to delete characters, an open hand pose can be used as a space bar, and a tap of the thumb can be used as a punctuation pose to change the displayed characters in the regions of the character display region from letters to punctuation characters.

Figure 8:
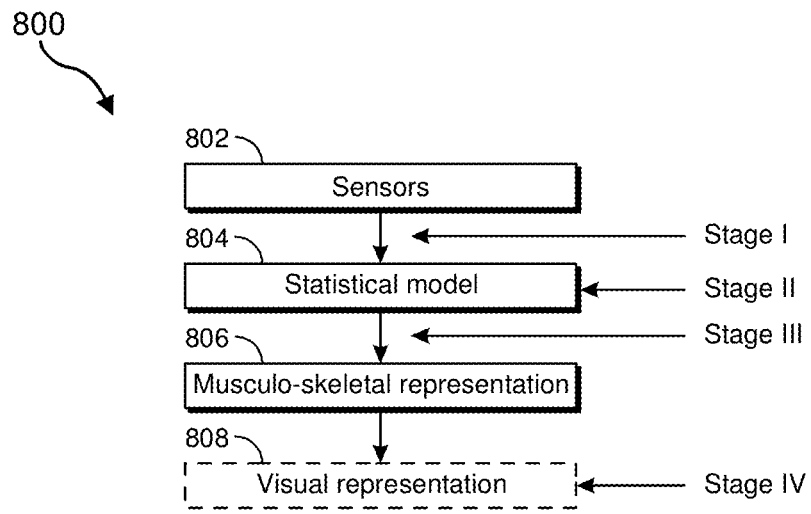
FIG. 8 illustrates a system having multiple sensors configured to record signals resulting from the movement of portions of a human body.

FIG. 8 illustrates a system 800 in accordance with some embodiments. The system includes a plurality of sensors 802 configured to record signals resulting from the movement of portions of a human body. Sensors 802 may include autonomous sensors. In some embodiments, the term "autonomous sensors" may generally refer to sensors configured to measure the movement of body segments without requiring the use of external devices. In some embodiments, sensors 802 may also include non-autonomous sensors in combination with autonomous sensors. In some examples, the term "non-autonomous sensors" may generally refer to sensors configured to measure the movement of body segments using external devices. Examples of external devices used in non-autonomous sensors include, but are not limited to, wearable (e.g. body-mounted) cameras, global positioning systems, or laser scanning systems.

Autonomous sensors may include a plurality of neuromuscular sensors configured to record signals arising from neuromuscular activity in skeletal muscle of a human body. The term "neuromuscular activity" as used herein may generally to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time.

Autonomous sensors may include one or more Inertial Measurement Units (IMUs), which may measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that autonomous sensors may be arranged in any suitable way, and embodiments of the technology described herein are not limited based on the particular sensor arrangement.

Figure 9:
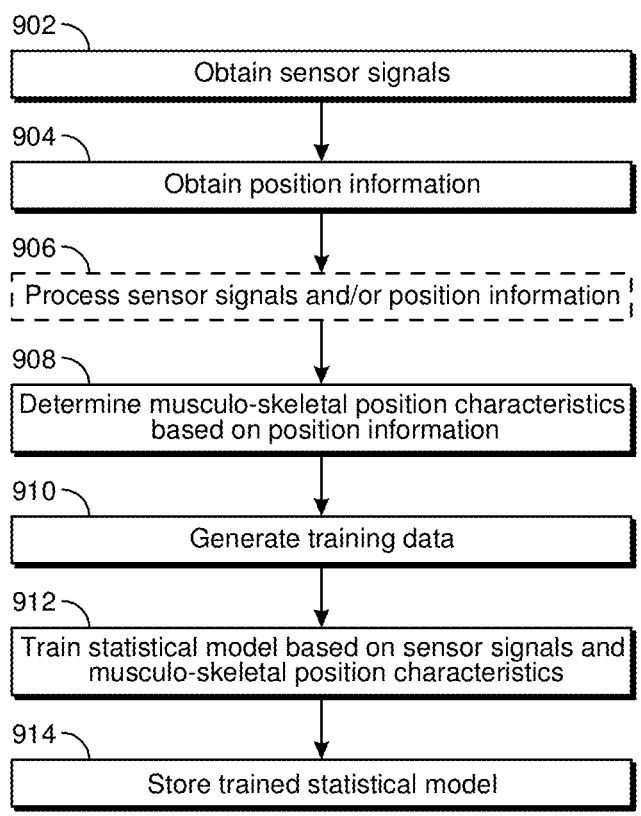
FIG. 9 is a flow diagram of a method for generating or training a statistical model using signals recorded from sensors.

FIG. 9 describes a method 900 for generating (sometimes termed "training" herein) a statistical model using signals recorded from sensors 802. Method 900 may be executed by any suitable computing device(s), as aspects of the technology described herein are not limited in this respect. For example, method 900 may be executed by one or more computer processors described with reference to FIG. 8 or other computer processors, among other types and configurations of processors. As another example, one or more acts of method 900 may be executed using one or more servers (e.g., servers included as a part of a cloud computing environment). For example, at least a portion of act 910 relating to training of a statistical model (e.g., a neural network) may be performed using a cloud computing environment.

The sensors 802 of FIG. 8 may detect movements and may send sensors signals to a specified device or location (at step 902 of method 900). For example, in some embodiments, at least one IMU and a plurality of neuromuscular sensors may be co-located on a body segment to track movements of the body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration. Thus, at 904 of method 900, the system may obtain position and/or orientation information of the user wearing the wearable device.

Each of the autonomous sensors may include one or more sensing components configured to sense information about a user. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification) at step 906 of method 900. In other embodiments, at least some signal processing of the output of the sensing components may be performed in software. Thus, signal processing of autonomous signals recorded by the autonomous sensors may be performed in hardware, software, or by any suitable combination of hardware and software, as aspects of the technology described herein are not limited in this respect.

In some embodiments, the recorded sensor data may be processed to compute additional derived measurements that are then provided as input to a statistical model and/or a machine learning model, as described in more detail below. For example, recorded signals from an IMU sensor may be processed to derive an orientation signal that specifies the orientation of a rigid body segment over time. Autonomous sensors may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors are arranged as a portion of a wearable device configured to be worn on or around part of a user's body. For example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body. In some embodiments, multiple wearable devices, each having one or more IMUs and/or neuromuscular sensors included thereon, may be used to predict musculoskeletal position information for movements that involve multiple parts of the body (e.g., at step 908 of method 900).

In some embodiments, sensors 802 only include a plurality of neuromuscular sensors (e.g., EMG sensors). In other embodiments, sensors 802 include a plurality of neuromuscular sensors and at least one "auxiliary" sensor configured to continuously record a plurality of auxiliary signals. Examples of auxiliary sensors include, but are not limited to, other autonomous sensors such as IMU sensors, and non-autonomous sensors such as an imaging device (e.g., a camera), a radiation-based sensor for use with a radiation-generation device (e.g., a laser-scanning device), or other types of sensors such as a heart-rate monitor.

System 800 may also include one or more computer processors (not shown in FIG. 8) programmed to communicate with sensors 802. For example, signals recorded by one or more of the sensors may be provided to the processor(s), which may be programmed to execute one or more machine learning techniques that process signals output by the sensors 802 to generate training data (e.g., at act 910 of method 900) and train one or more statistical models 804 and/or machine learning models (not shown in FIG. 8) (e.g., at step 912 of method 900). The trained (or retrained) inferential models (e.g., statistical model(s) 804) may then be stored (e.g., at step 914 of method 900) for later use in generating a musculoskeletal representation 806, as described in more detail below. As used herein, the term inferential model includes, but is not limited to, pure statistical models, pure machine learning models, or any combination thereof. Non-limiting examples of statistical models that may be used in accordance with some embodiments to predict handstate information based on recorded signals from sensors 802 are discussed in detail below.

System 800 also optionally includes a display controller configured to display a visual representation 808 (e.g., of a hand). As discussed in more detail below, one or more computer processors may implement one or more trained statistical models configured to predict handstate information based, at least in part, on signals recorded by sensors 802. The predicted handstate information is used to update the musculoskeletal representation 806, which is then optionally used to render a visual representation 808 based on the updated musculoskeletal representation incorporating the current handstate information. Real-time reconstruction of the current handstate and subsequent rendering of the visual representation reflecting the current handstate information in the musculoskeletal model may provide visual feedback to the user about the effectiveness of the trained statistical model to accurately represent an intended handstate. Not all embodiments of system 800 include components configured to render a visual representation. For example, in some embodiments, handstate estimates output from the trained statistical model and a corresponding updated musculoskeletal representation are used to determine a state of a user's hand (e.g., in a virtual reality environment) even though a visual representation based on the updated musculoskeletal representation is not rendered (e.g., for interacting with virtual objects in a virtual or augmented reality environment in the absence of a virtually-rendered hand).

In some embodiments, a computer application configured to simulate a virtual reality environment may be instructed to display or render a visual representation of the user's hand within a user interface (e.g., a graphical user interface). Positioning, movement, and/or forces applied by portions of the hand within the virtual reality environment may be displayed based on the output of the trained statistical model(s). The visual representation may be dynamically updated based on current reconstructed handstate information as continuous signals are recorded by the sensors 802 and processed by the trained statistical model(s) 804 to provide an updated computer-generated representation of the user's position, movement, and/or exerted force.

In some embodiments, the term "gestures" generally refers to a static or dynamic configuration of one or more body parts including the position of the one or more body parts and forces associated with the configuration. For example, gestures may include discrete gestures, such as pressing the palm of a hand down on a solid surface or grasping a ball or pinching one or more fingers, continuous gestures, such as a waving a finger back and forth or throwing a ball or snapping or tapping one or more fingers, or making a fist or rolling a wrist, or a combination of discrete and continuous gestures such as grasping and throwing a ball. Gestures may be defined by an application configured to prompt a user to perform the gestures or, alternatively, gestures may be arbitrarily defined by a user. In some cases, hand and arm gestures may be symbolic and used to communicate according to cultural standards. A user may want to have a particular personalization for a particular task. In some implementations, the one or more computer processors may be further programmed to re-personalize the musculoskeletal representation by re-applying a particular desired personal characteristic to a musculoskeletal representation that has been anonymized using one or more of the techniques described herein.

Figure 10:
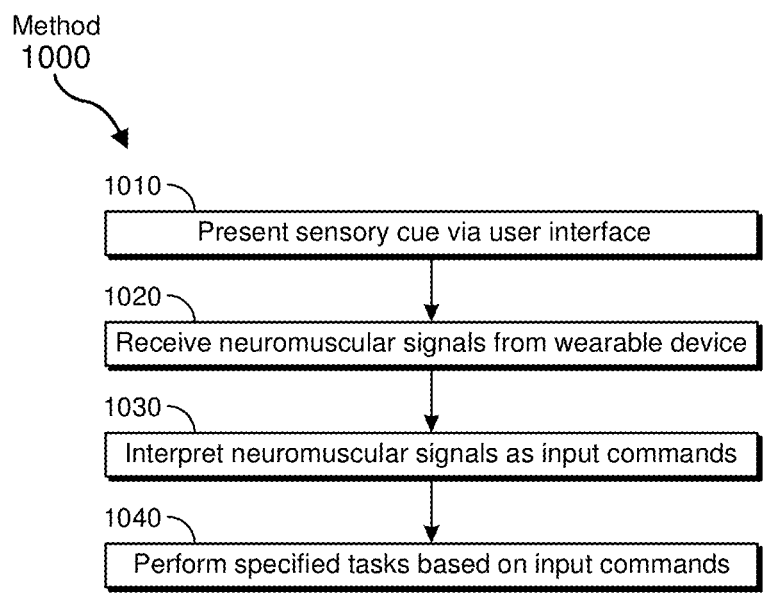
FIG. 10 is a flow diagram of a method for facilitating interactions with a user interface via neuromuscular signals.

FIG. 10 illustrates an example method 1000 for interpreting input commands received through neuromuscular signals sensed at a wearable device (e.g., wearable device 200 of FIG. 2). In some embodiments, the method 1000 may include presenting, via a user interface, at least one sensory cue (step 1010). For instance, the computer system 101 may instantiate a user interface such as that shown in FIG. 4, 5, or 6. The UI may be configured to provide a sensory cue such as an auditory cue, a haptic cue, an olfactory cue, an environmental cue, a visual cue, or other type of cue. The computer system 101 may then receive, from one or more neuromuscular sensors of a wearable device, one or more neuromuscular signals generated by a user wearing the wearable device (step 1020). In such cases, the user (e.g., user 100) may generate the neuromuscular signals in response to the at least one sensory cue being presented to the user via the user interface (step 1020). The wearable device 200 may include one or more neuromuscular sensors 210 configured to detect neuromuscular signals. The computer system 101 may interpret the one or more received neuromuscular signals as input commands with respect to the sensory cue provided by the user interface, such that the input commands initiate performance of one or more specified tasks within the user interface (step 1030). The computer system 101 may then perform the one or more specified tasks within the user interface according to the interpreted input commands (step 1040).

In some cases, carrying out the specified task includes navigating to a specified display region in the user interface that corresponds to a text input that is available for selection, and selecting the text input located at the specified display region within the user interface. For instance, in FIG. 4, carrying out the specified task may include navigating to region 402 (and potentially moving the pointer 404 to that region) and selecting one or more of the characters in that region (in this case, "y" or "z"). Other regions may also be selected, or may be selected in sequence on after another to provide inputs spelling out a word. Thus, in this manner, a user 100 may wear a wearable device 200, have that device interpret their neuromuscular signals as commands, and carry out those commands by moving the pointer within the display 401 and selecting text including words, letters, pictures, or other selectable items. In some cases, as noted above, users may perform gestures with their fingers or hand. The wearable device 200 may detect these gestures and select specified words or characters as inputs within the user interface.

Figure 4:
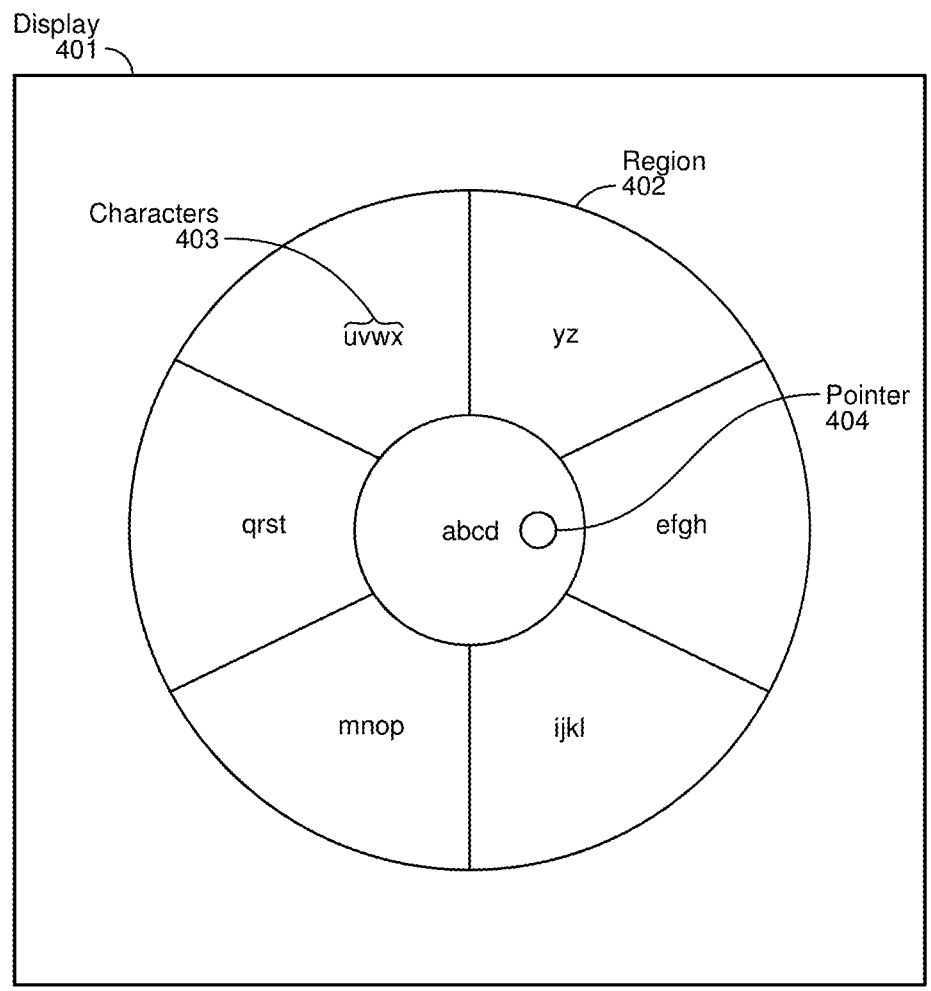
FIG. 4 illustrates an embodiment of a user interface that is displayed to the user in a 2D plane.

For instance, as shown in FIG. 4, a user interface shown in display 401 may include multiple display regions (e.g., 402). Within each display region, various potential text inputs may be mapped to each display region in a mapping. For instance, characters "mnop" may be mapped to one region, while characters "qrst" are mapped to another location. Selection of a particular text input in the specified display region may be based, at least in part, on a recognized gesture determined from the received neuromuscular signals. The gesture may include a user moving their hand or wrist in a manner that navigates the pointer 404 to a particular region. Lingering in that region or performing a finger tap or finger pinch gesture may select one or more of the characters in that region. In some cases, the mapping of characters to regions may include a mapping of specified text inputs to specified gestures. Thus, in some embodiments, numbers may be mapped to finger tap gestures, while lower-case letters may be mapped to pointer finger taps, and upper-case letters may be mapped to middle finger taps or to finger-thumb pinches, etc.

In some cases, interpreting the neuromuscular signals received from the wearable device sensors as input commands with respect to the sensory cue provided by the user interface may include interpreting the received neuromuscular signals from the user as a velocity control, a directional control, and/or positional control of a cursor used to select particular text inputs within the user interface. The system may thus track how gestures are provided, including the velocity, direction, and/or position of the wearable device as the user moves their hand or other body parts. This velocity, direction, and/or position may then be used when interpreting the gesture and mapping it to an input command.

In some embodiments, interpreting the received neuromuscular signals as input commands with respect to the sensory cue provided by the user interface may include recognizing a user gesture based on the received neuromuscular signals. This recognized user gesture may then control a selection of a particular text input. If the user's intent on selecting a particular portion of text is unclear, the systems described herein may disambiguate the text input displayed within the user interface based on which user gesture was recognized. Users may not only provide a single selection, but may provide a series of inputs. The systems herein may be configured to automatically determine, based on the received neuromuscular signals, which series of likely text inputs were provided by the user.

In other cases, carrying out the specified command includes predicting, from a language model, various characters that are to be selected as typed inputs based on the input commands and providing the predicted characters as typed inputs within the user interface. As will be explained further below, the inputs provided by the user 100 through neuromuscular signals detected by the wearable device 200 may be indicative of typed letters that were "typed" by the user, whether at a physical keyboard or typed elsewhere. The language model may be used to predict which characters were typed by the user and then input those characters into the user interface.

In some embodiments, interpreting the received neuromuscular signals as input commands with respect to the at least one sensory cue provided by the user interface may include recognizing at least one user gesture based on the received neuromuscular signals. This recognized user gesture is then used to control selection of a particular typed input. In some cases, this typed input may be provided via a surface-agnostic gesture performed by the user. Such surface-agnostic gestures may be performed on substantially any surface, including in the air or on the user's leg, etc. These embodiments will be described in greater detail with regard to FIGS. 11-20B.

Figure 11:
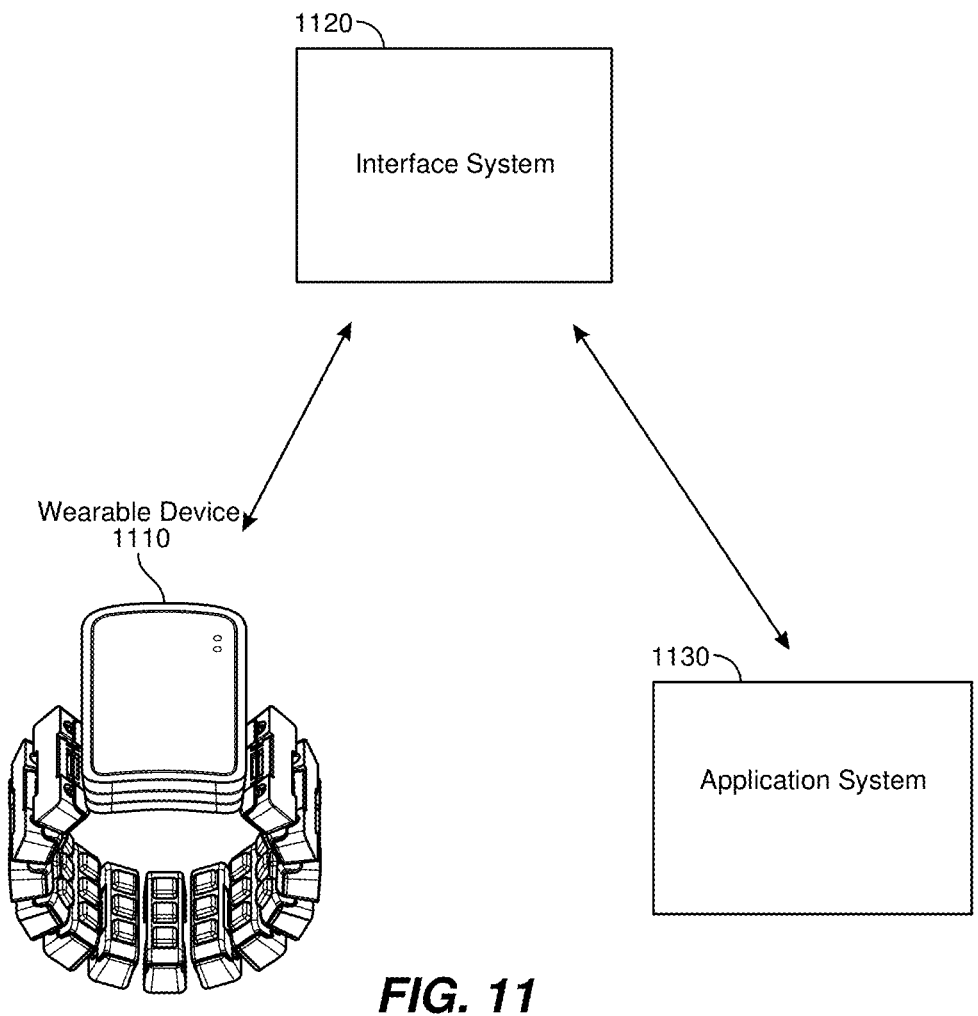
FIG. 11 illustrates a human computer interface system including a wearable device, an interface system, and an application system.

FIG. 11 depicts a human computer interface system 1100 comprising wearable device 1110, interface system 1120, and application system 1130. As described herein, wearable device 1110 includes one or more sensors and can communicate with interface system 1120 and/or application system 1130. Wearable device 1110 may be configured to enable recording of signals using the one or more sensors when worn on the body of a user. The recorded signals may include neuromuscular signals such as electromyography (EMG) signals, mechanomyography (MMG) signals, and/or sonomyography (SMG) signals. In some implementations, the recorded signals can further include position, velocity, and/or acceleration information acquired from one or more inertial measurement unit (IMU) sensors, or other position-tracking sensors. In some implementations, wearable device 1110 can be configured to perform analog processing (e.g., noise reduction, filtering, etc.) and analog to digital conversion of the recorded signals. Wearable device 1110 can communicate with interface system 1120 using any suitable wireless technology and protocol, non-limiting examples of which include radiofrequency signaling, Bluetooth, Zigbee, WiFi, or the like. For example, wearable device 1110 can provide the recorded signals, or features extracted from the recorded signal, to interface system 1120.

Interface system 1120 can be configured to receive the recorded signals from wearable device 1110 and generate data and/or instructions for use by application system 1130. In some implementations, interface system 1120 can be configured to identify a state of a part of the body of the user using one or more inference models and the received signals or features extracted from the received signals can be provided as input to the inference model(s). Interface system 1120 can be configured to communicate identified states of a part of the user's body to application system 1130. For example, interface system 1120 can provide predicted position, orientation, joint angle, force, movement, pose, or gesture information to application system 1130. Interface system 1120 can be configured to communicate with application system 1130 using any suitable wireless technology and protocol, non-limiting examples of which include radiofrequency signaling, Bluetooth, Zigbee, WiFi, or the like.

A state of a part of the user's body can include position, orientation, joint angle, force, movement, pose, or gesture information associated with the body part of the user. A state can describe a configuration of one or more segments in a musculoskeletal representation of the part of the body of a user. Such a musculoskeletal representation can model the body part of the user as a multi-segment articulated rigid body system, with joints forming the interfaces between the different segments and joint angles defining the spatial relationships between connected segments in the model. The spatial relationships between the connected segments in the model can be subject to anatomical constraints. The segments can be modeled as rigid bodies, or can be modeled as rigid bodies subject to inter-segment movements (e.g., a model for a forearm segment can be semi-rigid to account for the motion of the ulna and radius bones of the forearm). Position, orientation, and/or joint angle information for the segments, and time derivatives thereof (e.g., linear or angular velocity or acceleration), can be described with respect to one or more fixed coordinate systems, and/or with respect to the positions and orientations of other segments or body parts of the user.

A force can include a linear force and/or a rotational (torque) force exerted by one or more segments of the musculoskeletal representation. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the indicated body state information can include one or more of pinching force information, grasping force information, or information about co-contraction forces between muscles represented by the musculoskeletal representation.

Body state information may comprise or relate to a pose and can indicate a static configuration of one or more body parts. The static configuration can describe the position of one or more body parts. For example, a pose can include a fist, an open hand, statically pressing the index finger against the thumb, pressing the palm of a hand down on a solid surface, or grasping a ball. A pose can indicate the static configuration by providing positional information (e.g., segment coordinates, joint angles, or similar information) for the pose, or by providing an identifier corresponding to a pose (e.g., a parameter, function argument, or variable value). Body state information may comprise or relate to a gesture and can indicate a dynamic configuration of one or more body parts. The dynamic configuration can describe the position of the one or more body parts, the movement of the one or more body parts, and forces associated with the dynamic configuration. For example, a gesture can include waving a finger back and forth, throwing a ball, or grasping and throwing a ball.

In some embodiments, body state information can describe a hand of the user (e.g., hand state information), which may be modeled as a multi-segment articulated body. The joints in the wrist and each finger can form the interfaces between the multiple segments in the model. In various embodiments, a body state can describe a combination of a hand with one or more arm segments. It should be appreciated, however, that the techniques described herein are also applicable to musculoskeletal representations of portions of the body other than the hand including, but not limited to, an arm, a leg, a foot, a torso, a neck, or any combination of the foregoing.

In some implementations, as described herein, the recorded signals can exhibit spatio-temporal (e.g., spatio-frequential) patterns that depend on the manner or way a user wears the wearable device. For example, a state can be associated with a first spatio-temporal pattern when a user is wearing the wearable system in a first manner (e.g., in a manner in which the electrodes are in contact with certain areas of the user's skin) and a second spatio-temporal pattern when the user rotates the wearable system on the body or when the user moves the wearable system to a different part of the body (e.g., from a lower arm position to an upper arm position). Thus the inference model can be trained to identify one or more body states using the exhibited spatio-temporal patterns.

In some implementations, the wearable system may be configured to determine a rotation and/or position of the wearable system and to select a corresponding inference model trained or adapted for identifying body state in the determined position and/or rotation. Differently stated, the wearable system may be configured to auto-calibrate, such that the device adapts to any rotation and/or arm position offset without interfering with the user experience, also referred to herein as auto-calibration to account for the way the system is worn by the user in relation to their underlying musculature and other anatomy that affects the neuromuscular signals recorded by the wearable system. In some implementations, the wearable system can be configured to adapt to users that may have injured or missing muscles, different adipose tissue or fat, and other anatomic variables. Although discussed with regards to multiple inference models, it is appreciated that the embodiments discussed herein can, in some instances, be implemented as a single inference model. It is also appreciated that the one or more inference models may be trained from data collected from multiple users.

An inference model that classifies neuromuscular signal patterns for auto-calibration may be built by performing one or more of the following steps: 1) build a new statistical model or experiment class that takes as input a set of preprocessed neuromuscular signals, 2) generate a batch of training data by randomly applying a rotation offset to the preprocessed signals, 3) produce positive labels when the augmented offset is 0, and null otherwise, 4) take the batch of training data and calibrate it to have calibrated data at offset=0, and 5) train an inference model and evaluate its performance by testing different rotation offsets.

Application system 1130 may be configured to receive body state information from interface system 1120. In response to the received indications, application system 1130 may be configured to perform actions on one or more applications executing on application system 1130. The actions can include changing an execution state of an application (e.g., starting, stopping, suspending, or resuming the application) or communicating with the application (e.g., providing commands and/or data to the application). As described herein, application system 1130 may be configured to provide a user interface. The user interface can be configured to provide visual, auditory, haptic, and/or other sensory feedback to commands and/or data received from application system 1130. For example, a user can interact with graphical controls and indicators displayed by the user interface on a display associated with application system 1130. As an additional example, the user interface can provide auditory prompts and/or feedback using speakers associated with the computing system. As a further example, the user interface can provide haptic prompts or feedback using controllers that apply forces to the user (e.g., vibrations using a linear resonant actuator or eccentric rotating mass actuator).

It should be appreciated that the functionality described above with regards to wearable device 1110, interface system 1120, and application system 1130 may be combined or divided between one or more computing devices. In an exemplary embodiment, wearable device 1110 can be configured with one or more trained inference models. Wearable device 1110 can record signals, use the one or more trained inference models to identify one or more states of a part of the user's body, and provide an indication of the identified body state to a separate computing device implementing application system 1130. In an additional exemplary embodiment, wearable device 1110 can be configured to provide the recorded signals, and/or features extracted from the recorded signals, to a separate computing device implementing interface system 1120 and application system 1130. The separate computing device, which can be configured to implement interface system 1120 using a device driver, application, emulator, or the like, can identify the one or more states of a part of the user's body using one or more trained inference models and the received recorded signals, and/or extracted features. The identified states can be mapped to data or instructions and at least some of the data or instructions may be provided to one or more applications running on a separate computing device (e.g., one or more computing devices in the cloud). In an additional embodiment, wearable device 1110 can implement the functionality of interface system 1120 and application system 1130.

Figure 12:
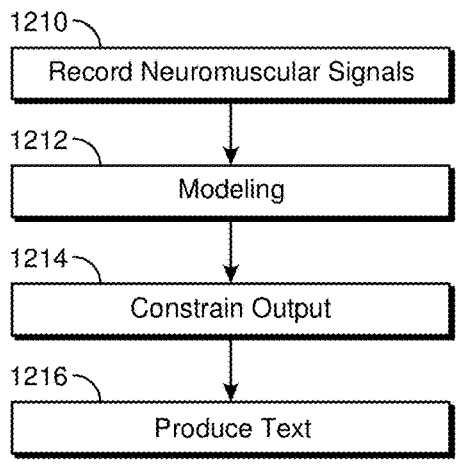
FIG. 12 is a flow diagram of a method for using a neuromuscular-based system trained to interpret typing gestures or other user activity.

At least some of the systems and methods described herein relate to generating text based on neuromuscular signals recorded using one or more neuromuscular sensors arranged on one or more wearable devices while a user wearing the wearable device(s) performs typing movements. FIG. 12 schematically illustrates a process for using a neuromuscular-based system trained to interpret typing gestures, or other user activity in accordance with some embodiments. The typing gesture may be single-key gestures (e.g., pressing the key for the letter "x") or multiple-key gestures performed concurrently (e.g., pressing the "Shift" key and the key for the letter "x" at the same time to output a capital "X") or at least partially in succession within a certain time duration (e.g., pressing the "Ctrl"+"Alt" and "Delete" keys at least partially in succession to perform a command, bring up a menu, or perform some other keyboard shortcut). The embodiments described herein relate to processing neuromuscular data as a user performs conventional typing gestures (e.g., as one would use with a keyboard)

without requiring the use of a physical keyboard. However, it should be appreciated that one or more of the techniques described herein may also be used to interpret other types of neuromuscular data associated with a user's intent to type including, but not limited to, sub-muscular activations in which the user is trained to activate individual or small groups of motor units without performing movements.

In act 1210, neuromuscular signals are recorded from a plurality of neuromuscular sensors arranged on a wearable device. In act 1212, the recorded signals (or information (e.g., features) derived from the signals) are provided as input to one or more inference models, which interpret the signals (or information derived from the signals) to generate one or more fig. In act 1214, the predictions output from the inference model(s) may be constrained using, for example, a language model, as discussed in more detail below. In act 1216, a final predicted character or characters are provided as text. Various aspects for training and using inference models to output one or more characters based on recorded neuromuscular signals are provided in the sections that follow. In the disclosed system and methods described herein that comprise labeling one or more data sets, the accuracy of the labeling can be confirmed by the user or the system. For example, after one or more neuromuscular inputs, the user can be prompted to confirm the accuracy of the inputted text prior to the system labeling the character data for incorporation into the inferential mode(s). Alternatively, the system can automatically detect the accuracy of the recorded neuromuscular signals and associated text inputs based on the frequency of user-initiated "backspace" key presses during typing of the data set(s).

Figure 13:
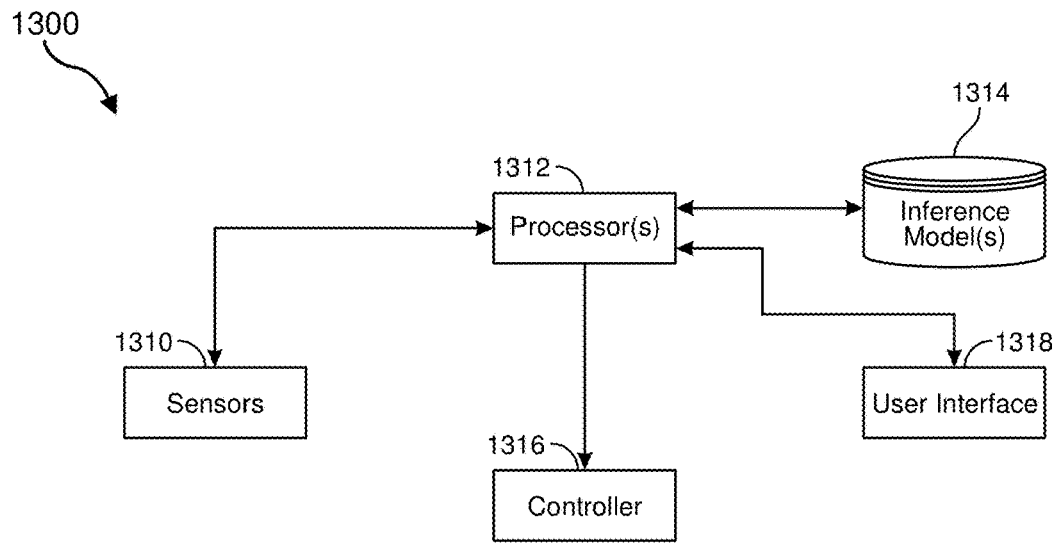
FIG. 13 illustrates an embodiment of a neuromuscular activity sensing system.

FIG. 13 schematically illustrates a system 1300, for example, a neuromuscular activity sensing system, in accordance with some embodiments of the technology described herein. The system 1300 includes a plurality of sensors 1310 (e.g., neuromuscular sensors) configured to sense and record signals arising from neuromuscular activity in skeletal muscle of a human body. The sensors 1310 may include any or all of the sensors identified above in conjunction with sensors 802 of FIG. 8. In some embodiments, the plurality of neuromuscular sensors may be arranged relative to the human body and used to sense muscular activity related to a movement of the part of the body controlled by muscles from which the muscular activity is sensed by the neuromuscular sensors. Spatial information (e.g., position and/or orientation information) and force information describing the movement may be predicted based on the sensed neuromuscular signals as the user moves over time.

In some embodiments, sensor data recorded by the sensors 1310 may be optionally processed by processor(s) 1312 to compute additional derived measurements, which may then be provided as input to one or more inference models, as described in more detail below. For example, recorded signals from an IMU may be processed to derive an orientation signal that specifies the orientation of a segment of a rigid body over time. The sensors 1310 may implement signal processing using components integrated with the sensing components of the sensors 1310, or at least a portion of the signal processing may be performed by one or more components in communication with, but not directly integrated with, the sensing components of the sensors 1310.

The system 1300 also includes one or more computer processors 1312 programmed for one-way or two-way communication with sensors 1310. For example, signals recorded by one or more of the sensors 1310 may be output from the sensor(s) 1310 and provided to the processor(s) 1312, which may be programmed to execute one or more machine-learning algorithms to process the signals output by the sensor(s) 1310. The algorithm(s) may process the signals to train (or retrain) one or more inference models 1314, and the resulting trained (or retrained) inference model(s) 1314 may be stored for later use in generating control signals. The processor(s) 1312 may be in one-way or two-way communication with the inference model(s) 1314.

In some embodiments, the inference model(s) 1314 may produce discrete outputs. Discrete outputs (e.g., discrete classifications) may be used, for example, when a desired output is to know whether a particular pattern of activation (including individual neural spiking events) is currently being performed by a user. For example, the inference model(s) 1314 may be trained to estimate whether the user is activating a particular motor unit, activating a particular motor unit with a particular timing, activating a particular motor unit with a particular firing pattern, or activating a particular combination of motor units. On a shorter time scale, a discrete classification may be used in some embodiments to estimate whether a particular motor unit fired an action potential within a given amount of time. In such a scenario, these estimates may then be accumulated to obtain an estimated firing rate for that motor unit.

In embodiments in which an inference model is implemented as a neural network configured to output a discrete output, the neural network may include an output layer that is a softmax layer, such that outputs of the inference model add up to one and may be interpreted as probabilities. For instance, the outputs of the softmax layer may be a set of values corresponding to a respective set of control signals, with each value indicating a probability that the user wants to perform a particular control action. As one non-limiting example, the outputs of the softmax layer may be a set of three probabilities (e.g., 0.92, 0.05, and 0.03) indicating the respective probabilities that a detected pattern of activity is one of three known patterns.

It should be appreciated that when an inference model is a neural network configured to output a discrete output (e.g., a discrete signal), the neural network is not required to produce outputs that add up to one. For example, for some embodiments, instead of a softmax layer, the output layer of the neural network may be a sigmoid layer, which does not restrict the outputs to probabilities that add up to one. In such embodiments, the neural network may be trained with a sigmoid cross-entropy cost. Such an implementation may be advantageous in cases where multiple different control actions may occur within a threshold amount of time and it is not important to distinguish an order in which these control actions occur (e.g., a user may activate two patterns of neural activity within the threshold amount of time). In some embodiments, any other suitable non-probabilistic multi-class classifier may be used, as aspects of the technology described herein are not limited in this respect. In some embodiments, an output of the inference model(s) 1314 may be a continuous signal rather than a discrete signal. For example, the inference model(s) 1314 may output an estimate of a firing rate of each motor unit, or the inference model(s) 1314 may output a time-series electrical signal corresponding to each motor unit or sub-muscular structure.

It should be appreciated that aspects of the technology described herein are not limited to using neural networks, as other types of inference models may be employed in some embodiments. For example, in some embodiments, the inference model(s) 1314 may comprise a hidden Markov model (HMM), a switching HMM in which switching allows for toggling among different dynamic systems, dynamic Bayesian networks, and/or any other suitable graphical model having a temporal component. Any such inference model may be trained using recorded sensor signals.

As another example, in some embodiments, the inference model(s) 1314 may be a classifier that takes, as input, features derived from the recorded sensor signals. In such embodiments, the classifier may be trained using features extracted from the sensor signals. The classifier may be, e.g., a support vector machine, a Gaussian mixture model, a regression-based classifier, a decision tree classifier, a Bayesian classifier, and/or any other suitable classifier, as aspects of the technology described herein are not limited in this respect. Input features to be provided to the classifier may be derived from the sensor signals in any suitable way. For example, the sensor signals may be analyzed as time-series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor signals may be transformed using a wavelet transform and the resulting wavelet coefficients may be provided as inputs to the classifier.

In some embodiments, values for parameters of the inference model(s) 1314 may be estimated from training data. For example, when the inference model(s) 1314 is a neural network, parameters of the neural network (e.g., weights) may be estimated from the training data. In some embodiments, parameters of the inference model(s) 1314 may be estimated using gradient descent, stochastic gradient descent, and/or any other suitable iterative optimization technique. In embodiments where the inference model(s) 1314 is a recurrent neural network (e.g., an LSTM), the inference model(s) 1314 may be trained using stochastic gradient descent and backpropagation through time. The training may employ a squared error or cross-entropy loss function and/or any other suitable loss function, as aspects of the technology described herein are not limited in this respect.

The system 1300 also may optionally include one or more controller(s) 1316. For example, the controller(s) 1316 may include a display controller configured to display a visual representation (e.g., a representation of a hand). As discussed in more detail below, the one or more computer processors 1312 may implement one or more trained inference models that receive, as input, signals sensed and recorded by the sensors 1310 and that provide, as output, information (e.g., predicted hand state information) that may be used to generate control signals and control an augmented reality system.

The system 1300 also may optionally include a user interface 1318. Feedback determined based on the signals recorded by the sensors 1310 and processed by the processor(s) 1312 may be provided via the user interface 1318 to facilitate a user's understanding of how the system 1300 is interpreting the user's intended activation. The user interface 1318 may be implemented in any suitable way, including, but not limited to, an audio interface, a video interface, a tactile interface, and electrical stimulation interface, or any combination of the foregoing.

In some cases, the embodiments described herein may train an inference model for predicting typing movements based on neuromuscular signals using bootstrapping. In some cases, collecting a large amount of labeled training data to train an inference model to map neuromuscular signals to characters (e.g., letters) may be cumbersome. At least some of the embodiments described herein may be directed to using a bootstrapping technique to generate a personalized inference model for a user without requiring the user to provide large amounts of labeled training data used to train and therefore personalize the inference model. As described in more detail below, some embodiments are directed to using a generalized model trained on data collected from a group of users, and then supplementing the generalized model with additional training data collected from a user for which a personalized inference model is to be created.

Figure 14:
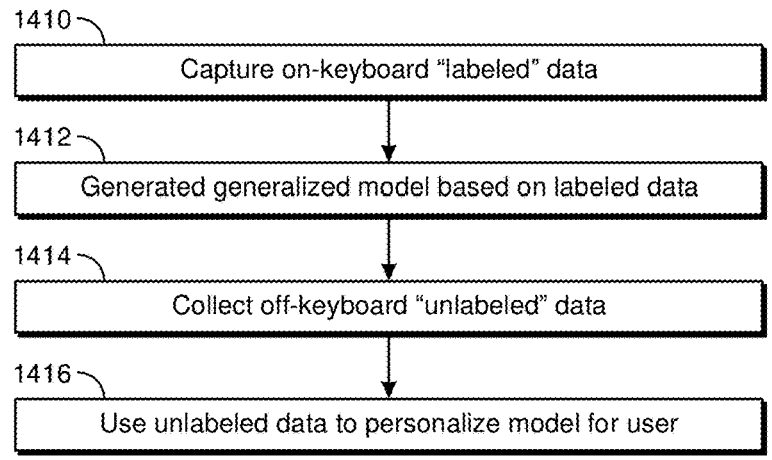
FIG. 14 is a flow diagram of a method for generating a personalized inference model trained to output characters based on neuromuscular data provided as input to the model.

FIG. 14 shows a process for generating a personalized inference model trained to output characters based on neuromuscular data provided as input to the model in accordance with some embodiments. In act 1410, neuromuscular data is recorded as a user is typing using an input device. In some instances, the input device may be a physical keyboard coupled to a computing system configured to determine the identity of keys pressed by the user. In other instances, the input device may be a representation of a keyboard without requiring use of a physical keyboard. In such instances, an external device (e.g., a camera) may be used to determine which key the user pressed. Regardless of the type of input device used, the output of act 1410 includes recorded neuromuscular data and an identity of keys (or representations of keys) that the user pressed during recording of the neuromuscular data. The ground truth data (identity of the keys) enables the neuromuscular data to be labeled, and the labeled neuromuscular data may be used to train an inference model to predict the identity of keys based on the neuromuscular data. In some embodiments, the neuromuscular data and ground truth data collected in act 1410 may be collected from a plurality of users to create a training dataset of labeled data that may be used to train a generalized (e.g., user-independent) model. In other embodiments, a small amount of neuromuscular data and ground truth data may be collected from a user for which the personalized inference model is to be created, and the small amount of labeled data may be used to create a "lightly trained" model that may further be trained using unlabeled "off-keyboard" data, examples of which are described in more detail below.

The process of FIG. 14 then proceeds to act 1412, where the labeled neuromuscular data recorded in act 1410 is used to train an inference model to produce a generalized (or lightly trained) inference model that maps neuromuscular data to the identity of particular keys on a keyboard. The generalized inference model may be trained, for example, by applying each exemplar in the labeled training data set to the inference model such that the model more accurately represents the mapping between the recorded neuromuscular signals and the ground truth data (i.e., identity of keys).

The process of FIG. 14 then proceeds to act 1414, where surface-agnostic (e.g., without a physical keyboard or "off-keyboard") unlabeled training data is recorded from a user for whom a personalized inference model is to be generated. The "off-keyboard" data comprises neuromuscular data for which ground truth data is not known. For example, the neuromuscular data may be recorded while the user is typing on a surface (e.g., a table) or midair and without using a physical keyboard to record the keystrokes. The data recorded in act 1414 is considered to be "unlabeled" because the ground truth data is not known. The process of FIG. 14 then proceeds to act 1416, where the unlabeled data collected in act 1414 is used to retrain the generalized (or lightly trained) model generated in act 1412. Exemplary techniques for training an inference model using off-keyboard data are discussed in more detail below.

One of the challenges with assigning key (e.g., character) labels to continuously recorded neuromuscular data while a user performs typing movements is that neuromuscular data corresponding to multiple instances of the same key presses (e.g., multiple presses of the "s" key) may have slightly different alignments. Accordingly, some embodiments employ connectionist temporal classification (CTC) to train the inference model when implemented as a neural network (e.g., an LSTM network). A CTC network has a continuous output (e.g., a softmax output), which is fitted through training to model the probability of a label (e.g., that the user has pressed a certain key). Labeled sequences (e.g., for the key "s") are considered equivalent if they differ only in alignment.

CTC is a technique that helps resolve alignment issues often observed in data collection, but further enables collection of data where exact alignments are not available. In particular, in a CTC architecture, the loss function is invariant to the exact timing of the labels in that the objective function is marginalized over all alignments. In this instance, a CTC architecture may be used to allow for collection of "off-keyboard" data for use in training a typing inference model.

Systems and methods for surface-agnostic (e.g., without a physical keyboard or "off-keyboard") text entry based on neuromuscular signal data inputs to an inference model generally involve each user generating training data so that a personalized inference model can be trained. However, traditional generalized models for surface-agnostic text entry can exhibit sub-par performance in at least some instances. As described herein, aspects of a training data set for training a personalized inference model for surface-agnostic text entry may include the following: 1) neuromuscular signal data measured by a plurality of neuromuscular sensors (e.g., a radial array of surface electromyography (sEMG) electrodes worn on each of a user's two forearms or wrists to measure neuromuscular signals corresponding to the muscles of the forearm that control most movements and forces of the fingers, hand, and wrist), and 2) character label data that represents the intended key press by the user (i.e., ground truth data for training a model to infer an intended key press based on neuromuscular signal inputs).

In an exemplary embodiment, each of the two data types above (neuromuscular signal data and character label data) may contain timestamps and may be co-registered in time, so that a particular time segment of neuromuscular signal data may be aligned with character label data.

The embodiments described herein include various systems and methods for generating training data for training an inference model for surface-agnostic text input that takes as input neuromuscular signal data from a plurality of neuromuscular sensors worn on a user's forearm or wrist. The embodiments described herein may also include systems and methods for generating neuromuscular signal data and co-registered character label data (comprising all or part of the user training data) without having to type on a physical keyboard and/or use a keylogger to generate character label data. In some embodiments, these systems and methods for generating training data may not require the use of a physical keyboard (which may be mechanical, touchscreen based, etc.) and/or a keystroke logger or keylogger.

Figure 15:
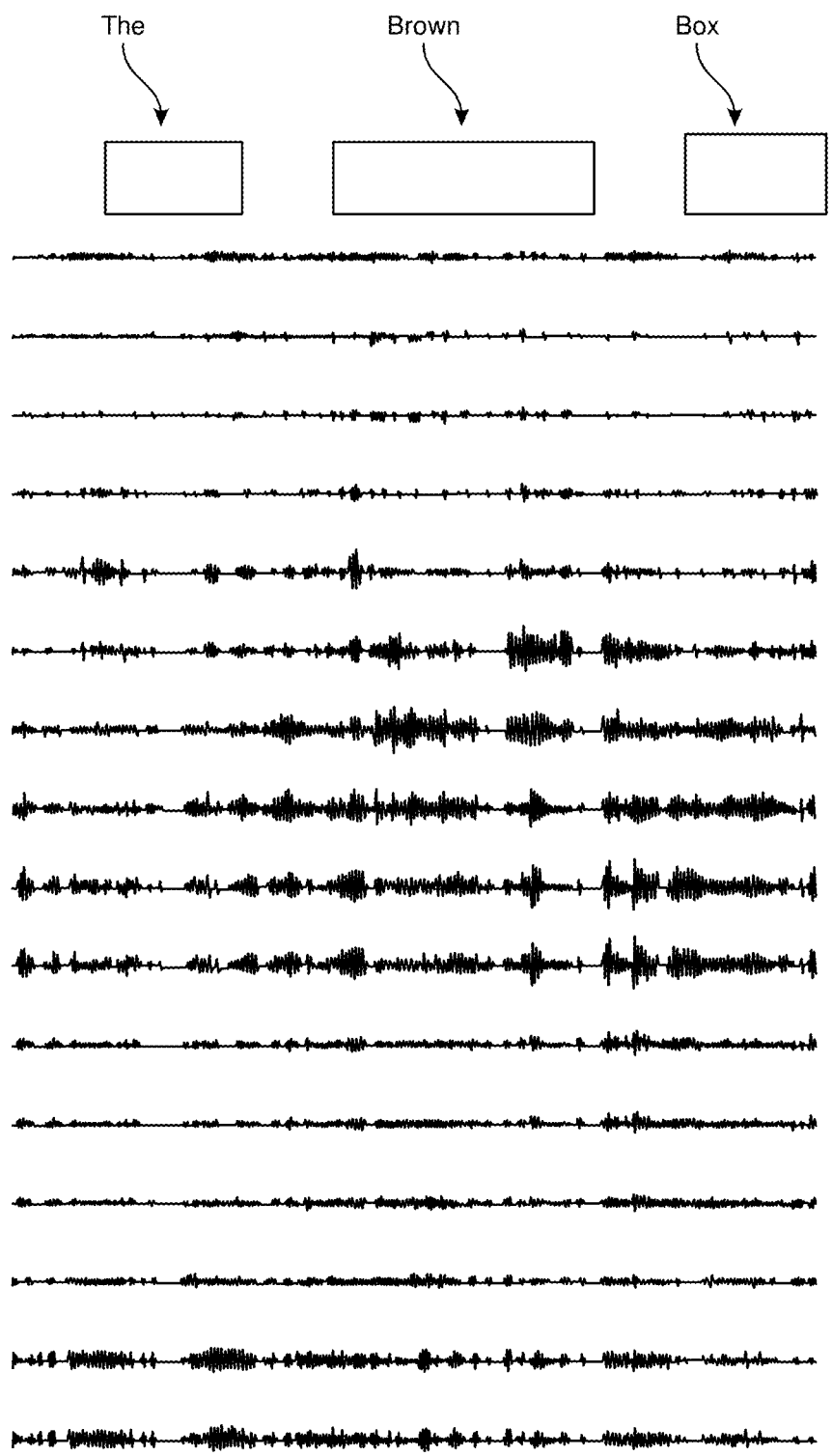
FIG. 15 schematically illustrates how chunking of multi-channel neuromuscular signal data may be performed for character data.

In an exemplary embodiment, there may be two or more characteristics of character label data sets used for training surface-agnostic text entry inference models. First, the composition of the character label data can be known (i.e., the user intends to type "The brown fox jumps over the fence."). Second, the character label data can be temporally aligned to the neuromuscular signal data. FIG. 15 shows schematically how chunking of multi-channel neuromuscular signal data (16 channels of surface EMG data in the example of FIG. 15) may be performed for character data. In the example shown in FIG. 15, three words ("The," "Brown," and "Fox") are aligned to the appropriate portion of sEMG data (e.g., 'chunked') with gaps representing periods between typing of each of the words.

In some cases, the embodiments described herein may include various techniques (which may be implemented as systems or methods) that sufficiently detect and collect character label data and do not require a physical keyboard or keylogger. These various embodiments may be used individually or in combination (either concurrently or sequentially).

For example, the embodiments described herein may generate off-keyboard training data by providing text of increasing complexity. In one embodiment, a user puts on neuromuscular sensors which can be worn on a user's forearm(s) or wrist(s). In this embodiment, character label data can be generated by providing a user with increasingly complex verbal or written prompts while they are typing on a surface, in midair, on their lap, etc. Text prompts provided to the user early in the process can comprise one or more simple or complex characters, which may enable reliable registration of neuromuscular signal data with the character label data. The epochs associated with neuromuscular data obtained during typing can be used to build a first, relatively less accurate, inference model for surface-agnostic text input. This inference model can be used to chunk (register) sEMG data in subsequent phases of training data generation that can use more complex text prompts. In this embodiment, the composition of the character training data may be provided according to user prompts, and the registration of the data (timing relative to neuromuscular data, i.e., chunking) may be performed according to the output of simple inference models for surface agnostic text input. These simple inference models can be made more accurate and able to parse and infer text entry as more training data is acquired, e.g., in an iterative process.

Figure 16:
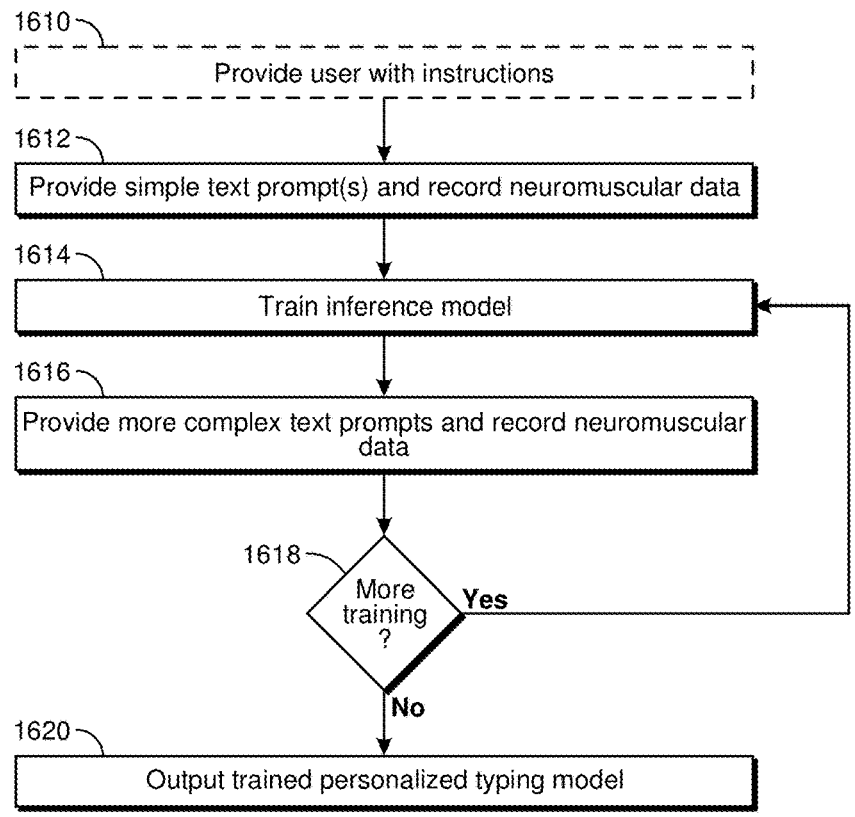
FIG. 16 is a flow diagram of a method for iteratively training an inference model.

In this exemplary embodiment, the following process may be employed after the user has put on the neuromuscular sensors on their forearm(s) or wrist(s) as shown in FIG. 16. In act 1610, a user optionally can be provided with instructions to enter text on a surface (e.g., a table or desk that is not an electrical or mechanical keyboard) with their hands in a traditional keyboard 'home position' and further guided to maintain a relaxed pose in the home position unless otherwise prompted to enter text. By maintaining a relaxed position between text prompts, the user can facilitate chunking and registration of their neuromuscular data to character label data, because the neuromuscular signal level is low between text prompts and high while the user types on the surface according to the text prompt.

In act 1612, the user can be provided with a first text prompt to type without a physical keyboard (e.g., by typing on a desk surface, in midair, or on their lap). The first text prompt can be simple (e.g., a single letter or short word), so that the registration (i.e. chunking) of neuromuscular data to this character label data can be performed reliably. For example, an algorithm for chunking a simple text prompt may include identifying the epoch of neuromuscular data (e.g., average rectified sEMG signals or root mean squared sEMG) that exceeds a threshold and is the first such event that follows the time when the text prompt was delivered. In some embodiments, act 1612 may include providing a plurality of text prompts before proceeding to act 1614.

For this and at least some other embodiments described herein, any of the text prompts provided to the user can be delivered visually via a screen, booklet, AR/VR headset, or using another suitable technique, audibly via a set of headphones, smart speaker, other speaker, or verbally by a technician, or by another technique appropriate for the user (e.g., braille if the user is blind).

In act 1614, the neuromuscular signal data and temporally registered character label data may be provided as input to train an inference model (e.g., a neural network that includes an LSTM architecture). The inference model can be trained to infer which key (i.e., character) the user intends to press and provide that inference (e.g., likelihood estimate) as a control signal for the system disclosed herein. In act 1616, the user may be provided with additional text prompts that can be more complicated (e.g., words with more characters, phrases, etc.), and the user can 'type' them on a virtual keyboard of the surface that may or may not have any visual contours.

In act 1618, the system determines whether the inference model requires additional training. Any suitable metric may be used to determine whether the model requires additional training. For example, it may be determined whether the inference model has achieved a threshold level of performance as set by the user, and the performance level can be determined subjectively by the user or objectively by the system, including, but not limited to, the system analyzing neuromuscular data associated with keystroke errors (e.g., the frequency of backspace commands initiated by the user). When it is determined in act 1618 that additional training is required, the process returns to act 1614, where additional training may be performed and the acts 1614 and 1616 continued to be performed iteratively, with increasingly complex text prompts and inference models being employed that can both more reliably register (i.e. chunk) neuromuscular data associated with the more complex text prompts and more accurately infer the intended character input by the user. This iterative process can continue until the inference model achieves a threshold level of performance as set by the user or the system as determined in act 1618, after which the trained inference model is output in act 1620. This exemplary embodiment for generating training data may be repeated as needed, depending on the level of system performance desired.

In some cases, the embodiments described herein may generate off-keyboard training data by leveraging a generalized model for a chunking key and a user-defined control signal. In another exemplary embodiment of a system and method as disclosed herein, an action gesture, verbalization, button press (e.g., via a traditional physical keyboard, mouse, touchscreen, or similar), or (virtual) keystroke can be used to indicate the beginning and/or end of a user's entry of prompted text. By relying on the user to provide a marker for the onset and offset of an epoch of entry of prompted text onto a surface according to the positions of a keyboard layout (but without an actual keyboard present), neuromuscular data may be more easily chunked, registered in time with prompted text, and used as input for training an inference model for surface-agnostic text entry.

Figure 17:
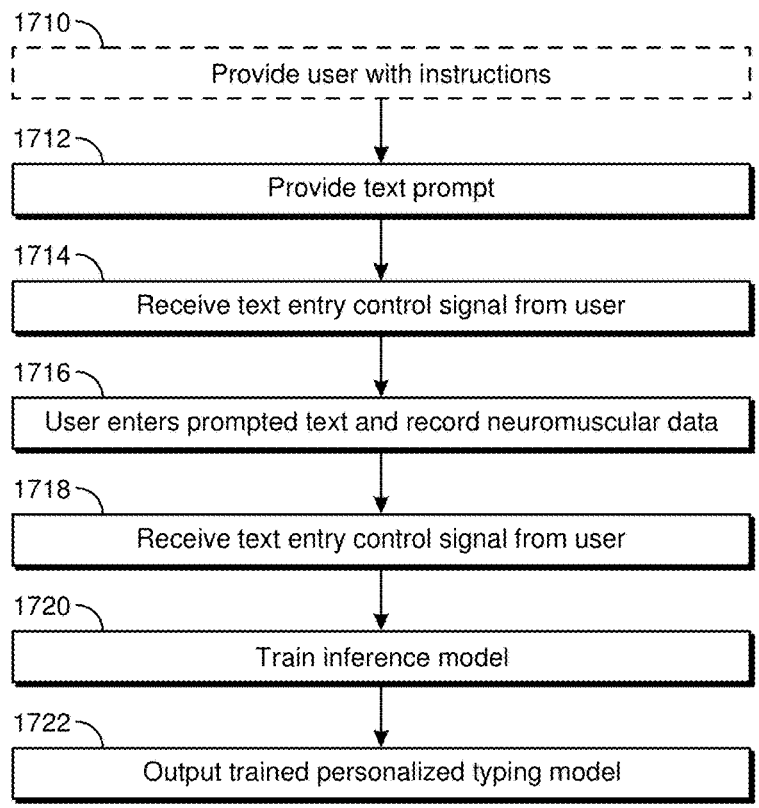
FIG. 17 is a flow diagram of a method for iteratively training a personalized typing model.

This embodiment can comprise the following process, which may be employed after the user has put on the neuromuscular sensors on their forearm(s) or wrist(s) as shown in FIG. 17. In act 1710, a user optionally can be provided instructions to enter text on a surface (i.e. a table or desk that is not an electrical or mechanical keyboard), or in midair with their hands starting in a traditional keyboard 'home position' and further guided to maintain a relaxed pose in the home position unless otherwise prompted to enter text. By maintaining a relaxed position between text prompts, the user can facilitate chunking and registration of their neuromuscular data to character label data, because the neuromuscular signal level is low between text prompts and high while the user types on the surface according to the text prompt. In act 1712, the user can be provided a text prompt which may be a word, phrase, or sentence.

In act 1714, a 'text entry' control signal provided by a user to a computing machine coordinating the training data process can be received. The text entry control signal indicates that the user will commence executing the motor commands to enter the prompted text. In various embodiments, the 'text entry' control signal may comprise one or more of the following: (i) a physical or electrical button, switch, or other similar control (e.g., one on a traditional physical keyboard, implemented via a touchscreen display (e.g., an app), foot pedal, or other controller or joystick, etc.), (ii) a gesture (e.g., a snap, finger pinch, finger flick, fist, etc.) provided as a control signal via the output of a previously trained inference model that takes as input a plurality of neuromuscular signals and provides as output a likelihood about a specific gesture or other neuromuscular control signal generated by the user, (iii) a verbalization (e.g., the user performs an audible utterance, a microphone detects the sound, and a speech recognition algorithm identifies that the appropriate 'text entry' control signal has been received, (iv) activation of a single motor unit or a plurality of single motor units either one or a plurality of times within a specified duration, wherein the motor unit activity is detected by a neuromuscular sensor (or plurality of neuromuscular sensors), or (v) by implementing a generalized model for detecting based on a plurality of neuromuscular signals that a user has pressed the spacebar, enter key, or other large key on the-surface agnostic keyboard.

In act 1716, the user can enter the prompted text by performing the appropriate movements (e.g., taps, etc.) on a surface-agnostic keyboard. In act 1718, the user can provide another 'text entry' control signal, indicating they have completed entering the prompted text.

It should be understood that acts 1714-1718 can be repeated to collect sufficient data for training an inference model for surface-agnostic text input according to a specified schedule. In some instances, a user may specify a preferred level of accuracy for an inference model for surface-agnostic text input, which can determine the number of times steps three through five are repeated. It should be appreciated that the larger the training data set (e.g., due to repeating acts 1714-1718), the better the expected accuracy of a subsequently trained inference model for surface-agnostic text input. In other instances, the system can be programmed with a preferred level of accuracy including, but not limited to, determining the amount of errors associated with text input based on the frequency of the user pressing the backspace key.

In act 1720, the neuromuscular signal data and temporally registered character label data can be provided as input to train an inference model (e.g., a neural network that includes an LSTM architecture). The inference model can be trained to infer which key (i.e. character) the user intends to press. The trained personalized inference model is output in act 1722.

In some embodiments, the embodiments described herein may generate off-keyboard training data with the user speaking while typing. In some cases, no text prompts are provided to the user. Rather, the user can speak the words they type as they type them, and the spoken words can be recorded by a microphone. The recorded sounds can be provided as input to a speech recognition process, and the output of the speech recognition process can be used to identify the identity and timing of the characters the user has entered into the surface-agnostic virtual keyboard.

Figure 18:
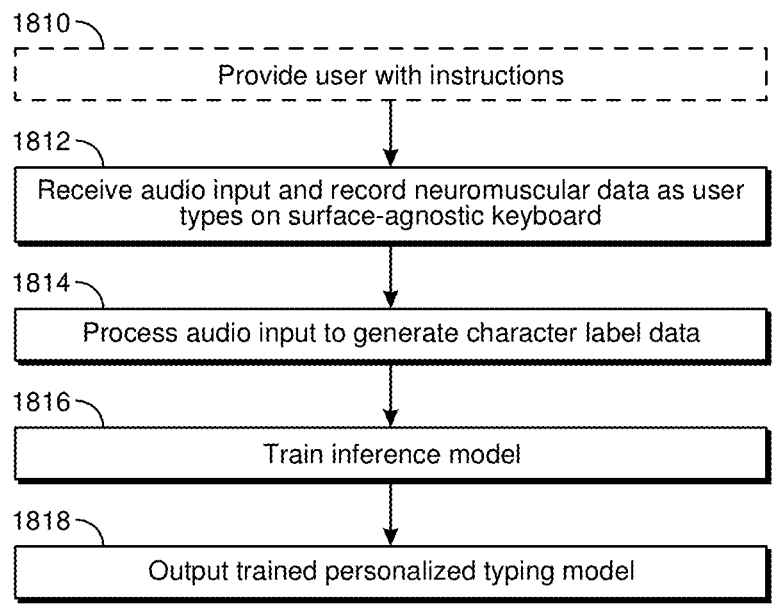
FIG. 18 is a flow diagram of an alternative method for iteratively training a personalized typing model.

This embodiment may comprise the following process after the user has put on the neuromuscular sensors on their forearm(s) or wrist(s) as shown in FIG. 18. In act 1810, a user optionally can be provided with instructions to enter text on a surface (i.e. a table or desk that is not an electrical or mechanical keyboard), or in midair with their hands in a traditional keyboard 'home position' and further guided to maintain a relaxed pose in the home position unless otherwise prompted to enter text. By maintaining a relaxed position between text prompts, the user facilitates chunking and registration of their neuromuscular data to character label data, because the neuromuscular signal level is low between text prompts and high while the user types on the surface according to the text prompt.

In act 1812, the user can audibly speak words and type them concurrently (or approximately concurrently or at a defined interval). In act 1814, a microphone can record the user's speech, provide it as input to a speech recognition process, and the system can generate character label data (e.g., which characters the user input and the timestamp relative to neuromuscular data) based on the spoken words. In act 1816, the neuromuscular signal data and temporally registered character label data can be provided as input to train an inference model (e.g., a neural network that includes an LSTM architecture). The inference model can be trained to infer which key (i.e. character) the user intends to press. The trained personalized inference model is output in act 1818.

Figure 19:
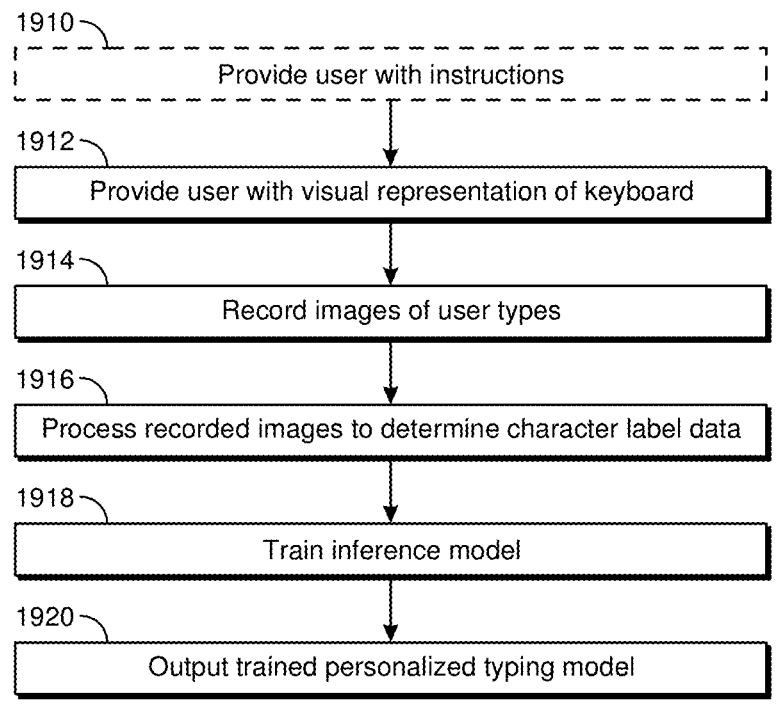
FIG. 19 is a flow diagram of another alternative method for iteratively training a personalized typing model.

In still other embodiments, the embodiments described herein may generate off-keyboard training data by using machine vision to generate character label data. In some cases, a non-functional representation of a keyboard can be placed or projected onto a typing surface or in midair, and a camera can be used to image or record the user's movements as they type to determine the identity and timing of characters to be used as label data. This embodiment may include one or more of the following acts after the user has put on the neuromuscular sensors on their forearm(s) or wrist(s) as shown in FIG. 19.

In act 1910, a user optionally can be provided with instructions to enter text on a surface (i.e. a table or desk that is not an electrical or mechanical keyboard) with their hands in a traditional keyboard 'home position' and further guided to maintain a relaxed pose in the home position unless otherwise prompted to enter text. By maintaining a relaxed position between text prompts, the user can facilitate chunking and registration of their neuromuscular data to character label data, because the neuromuscular signal level is low between text prompts and high while the user types on the surface according to the text prompt.

In act 1912, an image, printout, or other visible non-functional representation of a keyboard can be placed or projected on the surface onto which the user will 'type.' In variations of the embodiment, any of several methods for creating a visible non-functional representation of a keyboard can be used, including: (i) a projector may project an image of a keyboard onto the typing surface, (ii) a paper printout or other physical representation of a keyboard, (iii) virtual keyboard object in an augmented, virtual, or mixed reality environment, or (iv) other non-functional representation of a keyboard, or any combination of any of the foregoing.

In act 1914, a camera (or plurality of cameras) is configured to have the non-functional representation of a keyboard in its field of view and capture and/or record images (static or dynamic images as in a video recording) as the user types self-generated text (i.e., without prompting). In act 1916, the images or recordings can be input to one or more machine vision processes that can identify the user's fingers (and, optionally, hand or other portion of the user's body), and determine which character on the non-functional representation of the keyboard the user presses. The output of act 1916 can provide character label data (identity of characters and timestamp of the characters). It should be understood that a user may, if desired, confirm the accuracy of the output prior to the system creating the character label data.

In act 1918, the neuromuscular signal data and temporally registered character label data can be provided as input to train an inference model (e.g. a neural network that includes an LSTM architecture). The inference model can be trained to infer which key (i.e. character) the user intends to press. The trained personalized inference model is output in act 1920.

In some cases, the embodiments described herein may detect good home position and account for variations in a user's posture. The embodiments described herein indicate that the pattern of neuromuscular signals recorded from the forearm(s) or wrist(s) while a user enters text using systems and/or methods for surface-agnostic text entry (e.g., without a keyboard) may vary from session to session if a user's posture changes. That is, the pattern of neuromuscular signals associated with pressing a specific 'virtual' key on a surface (e.g., the letter 'c' or the sequence of letters to spell 'cardinals') may differ according to the user's posture while typing that 'virtual' key. For example, during text entry, a user may be seated upright at a desk, slouched on their chair, standing at a desk, reclining on a couch with her fingers on her legs, etc. The embodiments described herein indicate that an inference model can be trained based on neuromuscular data to predict labels representing a user's posture, typing location, surface onto which they are pressing their fingers to enter text, etc. In some exemplary embodiments, a generalized model can be trained to detect a posture or position for typing across users.

In other exemplary embodiments, a user can provide label data, or data can be collected from the user directly or indirectly, that corresponds to their posture, position, and/or typing surface location. A personalized inference model can be trained to predict their posture and/or typing position based on neuromuscular signal data recorded from the user (e.g., sEMG from their wrist or forearm). In one exemplary embodiment, neuromuscular data can be collected when a user begins to use a system or method for surface-agnostic text input, and the neuromuscular data can be combined with data from other auxiliary sensors that can be input to an inference model for predicting a user's posture and/or pose. The output of the inference model can reflect the user's position or posture (or the likelihood of the user's position or posture). The listing of auxiliary sensors suitable for the purpose described herein can comprise one or more of the following: an IMU, an infrared sensor, a pyroelectric infrared sensor, a heat sensor, a magnetic sensor, a gyroscopic sensor, an accelerometer sensor, etc. It should be understood that any spatiotemporal-related sensor can be used as an auxiliary sensor.

The user's position or posture can be used to adjust an inference model for surface-agnostic text input (or, alternatively, to select among several inference models tuned for particular postures) in order to improve the accuracy of text entry detection by the user. Feedback can also be provided to a user if their detected posture is unsuitable for accurate inference about text entry, so that the user may adjust their posture.

Systems and methods for text input without a keyboard, touchscreen, or other mechanical or electrical system (i.e. based on typing motions by a user onto a table or other surface) based on neuromuscular signals recorded from the wrist or forearm of the user and inference models trained to predict which virtual key a user intends to press based on the measured neuromuscular signal data can be generally referred to as surface-agnostic text input. Systems and methods for surface-agnostic text input would benefit from additional gesture-based functionality, as described herein.

A user may engage and interact with a system or method for surface-agnostic text input in keyboard text entry mode in order to type specific letters, characters, and/or words. The user can also initiate various inputs and/or commands by using certain gestures. In general, a control feature of a gesture can be the force associated with the gesture, and control gestures can include dynamic gestures, static gestures, and compound gestures of multiple sequential and/or concurrent gestures. A user's gesture can be detected by providing as input the same neuromuscular signal data recorded from the user's forearm or wrist to an inference model for gesture detection. The output of the inference model for gesture detection can be a likelihood of a gesture among a set of specified gestures and, for at least some gestures, an estimate of the force with which the user makes the gesture. Gestures described herein as machine control inputs take the output of the inference model for gesture detection and provide it as a control signal to a text entry functionality of a machine. The user can initiate these gestures while remaining in keyboard text entry mode, or, alternatively, the gestures can take the user out of the keyboard text entry mode and into a gesture mode. In either embodiment, the user's ability to interact with the display and virtual keyboard can be enhanced to enable more complicated and efficient text and character inputs and navigation on the display.

In one exemplary embodiment, the user can input a capital letter by exerting a relatively larger amount of force during a "finger tap," by "double finger" tapping, or by "finger tapping" and holding/pushing firmly on the surface with that same finger. By way of examples, a user can input a capital letter "D" (i) by tapping the user's left middle finger with a relatively larger amount of force than needed to input a lowercase letter "d," (ii) by tapping and pressing firmly, or just pressing firmly onto a surface, with the user's left middle finger, (iii) by double tapping the user's left middle finger, or (iv) with another suitable gesture or compound gesture. In another exemplary embodiment, the user can initiate "caps lock" by (i) tapping all of the fingers at once on both hands, (ii) by double tapping all of the fingers on both hands, (iii) by tapping and holding firmly all of the fingers on both hands, or (iv) with another suitable gesture or compound gesture. The user can exit from "caps lock" by again performing one of the foregoing gestures.

In another exemplary embodiment, the user can delete a previously typed word, phrase, or sentence by using a specified 'delete' gesture. In an exemplar embodiment, a snap gesture can be used as a delete key. In an alternative embodiment, a gesture may be used to change the functionality of a subsequent activation of the surface-agnostic text entry system. For example, activating a 'delete' virtual key on a surface-agnostic text input system can in general cause a single character to be deleted and can provide an altered function of deleting an entire word if there is a preceding fist gesture to change the delete mode.

In another exemplary embodiment, a set of gestures permits a user to accept among one or more autocorrect or autosuggest options provided by a natural language model module of the surface agnostic text entry system. While the user is typing in the keyboard text entry mode, the system can prompt the user to accept a word or phrase that can include a suggested word based on a preliminary set of characters (referred to herein as "autocomplete") and a suggested word to correct a mis-typed word (referred to herein as "autocorrect"). In general, suggestions can be automatically suggested based on a natural language model that takes as input a set of characters and/or words that a user has already entered (and may, optionally, include a personalized language model based on aa user's history of text entry such as proper nouns) and visually presented to the user on a visual interface of a system for surface-agnostic text input. Next, the user may optionally select one of the autosuggested words or phrases with a specified gesture.

In one exemplary embodiment, a user can scroll or toggle through the suggested words or phrases by, for example, tapping a finger and the user can accept one of the words or phrases by pinching one or more mitten fingers to the thumb. Alternatively, the user can select directly from the various suggested words or phrases without scrolling or toggling through the options by pinching a specific mitten finger with the thumb. In this exemplary embodiment, option 1 from the suggested words or phrases can be selected by pinching the index finger with the thumb, option 2 from the suggested words or phrases can be selected by pinching the middle finger with the thumb, and so on. The user can be presented with and can select from multiple suggested words or phrases at the same time and the visual layout of the suggested words or phrases can indicate to the user which gesture to perform. For example, four autosuggestions may be provided in a horizontal display arrangement, so that the user intuitively understands which of the four fingers of their right hand to pinch to their thumb. In another example, up to eight suggestions can be presented that can be chosen from specific mitten finger and thumb pinches from either the left or right hands.

Figure 20A:
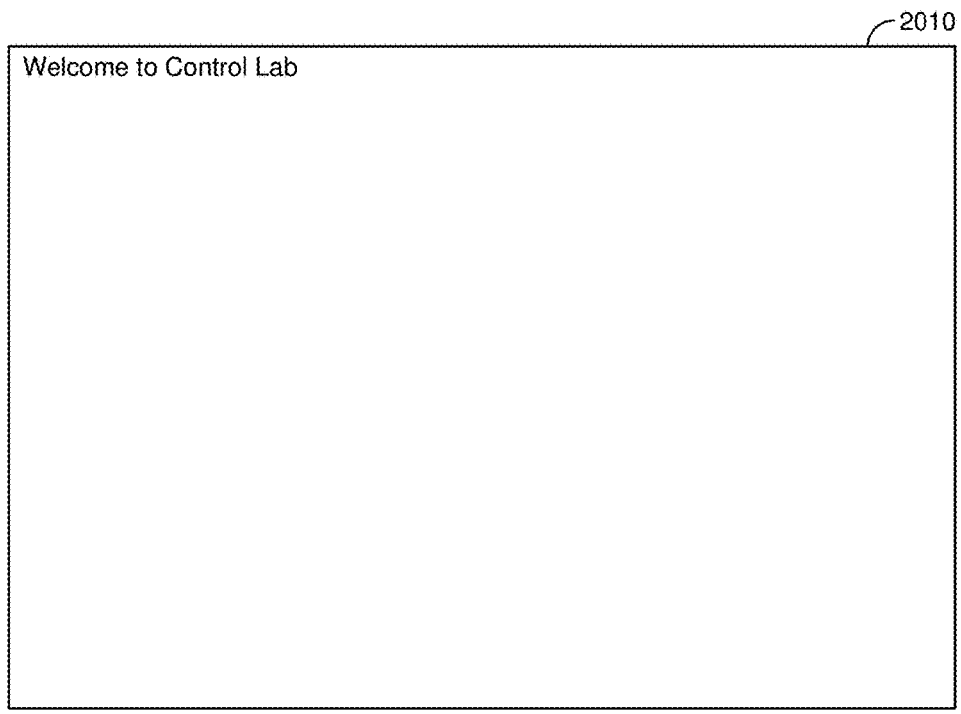
FIG. 20A illustrates an example interface in which a user may prompt the system to enter into an alternative input mode.
Figure 20B:
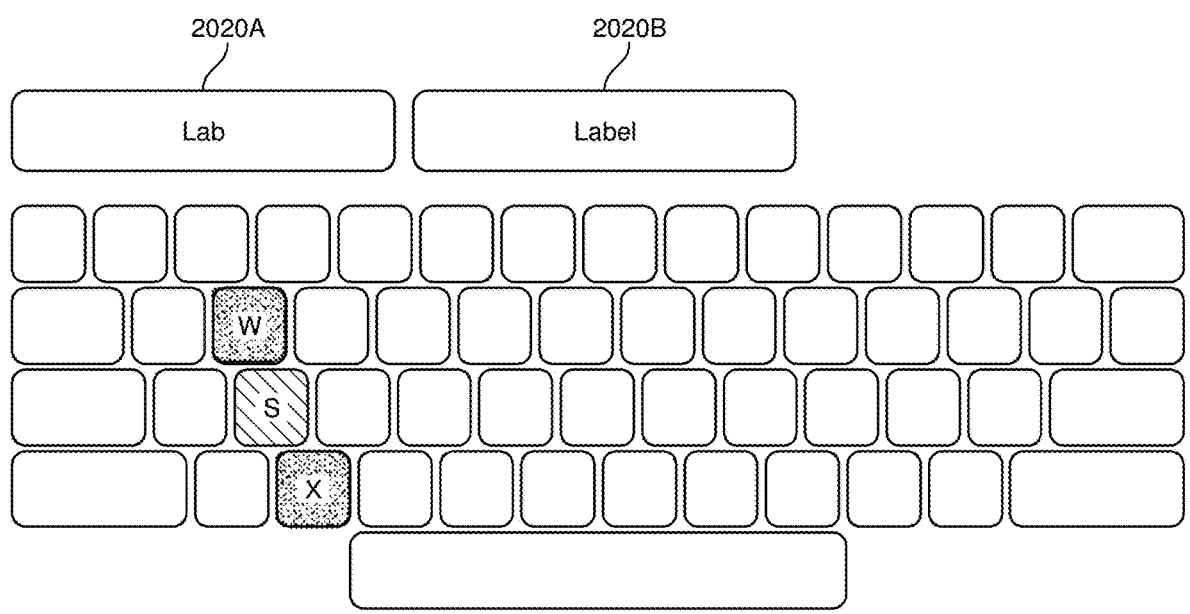
FIG. 20B illustrates a portion of a user interface that displays a representation of a keyboard when the user has engaged a "careful" typing mode through a gesture.

In general, any of the preceding gesture control frameworks based on a pinch of a finger to the thumb can be replaced with another suitable gesture (or, alternatively, a single motor unit control), including the use of a flick of any of the four mitten fingers (i.e. a dynamic gesture), wherein the finger is held by the thumb while the user activates the extensor muscle for that finger, then the user releases the finger and permits it to extend. In another exemplary embodiment, the user can toggle through one or more series of suggestions by tapping a finger and then selecting from one of those suggestions by initiating a pinch as described herein. FIGS. 20A and 20B show exemplary portions of a user interface that include a text entry box 2010 and auto-suggestion options 2020A and 2020B generated based on a current word being typed in the text entry box 2010.

In another exemplary embodiment, the embodiments described herein may suggest a word to replace a previously input word that may have one or more typographical errors (e.g., autocorrection). The user can select from one or more suggested words or phrases using a gesture or combination of gestures, as described herein.

In another exemplary embodiment, a user can disengage and/or exit from the keyboard text entry mode by performing a specified gesture. For example, an open hand gesture of both hands can be used to open and/or exit from a text entry mode of a surface-agnostic text input system. Once exited from the keyboard text entry mode, the user can stay in a gesture mode or can perform other actions outside of text or character entry. In one exemplary embodiment, the user can enter into a 2D movement/pointing/mouse mode by making a certain gesture or set of gestures. For example, a user can rotate their wrist to enter into the 2D movement/pointing/mouse mode, and then use their index finger to point to various portions of the display to move a mouse cursor. An example of using a 2D movement mode to perform typing is described in more detail below. Alternatively, the user can move a hand on their work surface, in midair, or on their lap to control the positioning of a cursor on the display. The user can use another gesture to implement a click, for example by using the other hand to click or double-click text or a character by, for example, tapping or double tapping their index finger. The user can tap and hold and draft their index finger firmly on the work surface or their lap to highlight desired text or characters.

In another exemplary embodiment, a user can initiate a "cut," "copy," or "pasting" function using a specific gesture. For example, a user can mimic a "cutting" action using their index and middle fingers to cut a word or phrase from the inputted text or characters.

In some embodiments, a user can prompt the system to enter into one or more alternative input modes, including, but not limited to, the following input modes: a "careful typing" mode, "new language" mode, "symbol" mode, "special character" mode, a "computer settings" mode (volume, brightness, etc.), "mouse" mode, etc. As discussed above, in order to initiate one or more of the alternative modes, the user can perform one or more gestures with any specific or a loosely defined degree or degrees of force (e.g., a loosely held fist versus a tightly squeezed fist). Detection of a gesture can either initiate a specific alternative input mode, or detection of the gesture may result in presentation of potential alternative input modes to a user (e.g., on a screen) from which the user can select one of the input modes. When in one of the alternative input modes, the user can be presented with visual display options (such as text and/or images) and the user can leverage this concurrent visual feedback to select from one or more input options within the mode from the visual display.

In one exemplary embodiment, a user can activate a "careful" typing mode by squeezing their left hand to make a fist (or performing some other gesture). When in "careful" typing mode, the system can present the user with a display of different input options such as different letter keys or numbers. These input options can relate to a "finger tap" previously initiated or performed by the user. For example, if a user intended to type a "j" with an index finger prior to entering into "careful" typing mode, and the user engages the mode, the system can present the user with one or more of the following letter options associated with the reach of the index finger: "j," "y," "u," "h," "n," and/or "m." The user may scroll through these various letter options by tapping the same index finger (or any other finger) with a relatively lighter amount of force and then tapping the same index finger (or any other finger) with a relatively heavier amount of force to select the desired input letter once it is highlighted on the display. In another embodiment, the user can select the desired input option once it is highlighted using a thumb to mimic pressing the "spacebar" or some other key on a surface upon which the hand is resting. Once the user selects the desired input from the various options, the system can exit from the "careful" typing mode and input the selected letter and present it on the user's typing screen.

Alternatively, if the user wants to exit the "careful" typing mode without selecting an input, the user can do so by squeezing the left hand again to make another fist.

FIG. 20B illustrates a portion of a user interface that displays a representation of a keyboard when the user has engaged the "careful" typing mode through a gesture. As shown, three characters on the keyboard—'w,' 's,' and 'x'—have been highlighted as possible character candidates that the system determines the user may have typed, with one character—'s' being emphasized to show the user that the system has determined that character as the most likely candidate. The user may then select the most likely candidate or one of the other highlighted candidates by, for example, performing a gesture, cycling through the candidates by typing with the same finger, or using some other suitable technique.

In another embodiment, the system can also enter into "careful" typing mode automatically without the user initiating it by performing a gesture. By way of example, if the system is either unable to detect the user's desired input, or if the system can only detect the desired input below a certain level of confidence, the system can automatically enter into the "careful" typing mode. The user can interact with the system in the "careful" typing mode by selecting from one of several potential inputs, as described above, or the user can exit the mode by initiating or performing a specific gesture. Further, based on what the user selects during the "careful" typing mode, the system can better detect future desired inputs, by for example, associating the neuromuscular data signal(s) obtained prior to initiating "careful" typing mode with the selected user input during the "careful" typing mode so that the system can more accurately detect future desired user input without the need to utilize the "careful" typing mode as frequently moving forward.

In another exemplary embodiment, the user can enter into a "new language" mode by squeezing their right hand or using another appropriate gesture. Once this mode is initiated, the new language mode can present various options to the user on the visual display such as "Spanish," "French," "German," etc. If the user engages the language mode after attempting to input or inputting the letter "e," by way of example, the user can select "Spanish" using a specific gesture as described above (e.g., tapping through the options using the left middle finger) and then can select "e" for a Spanish accented "e" by using a specific gesture as described above (e.g., pressing the spacebar).

For any or all of the foregoing embodiments, it should be understood that the user's hands can be positioned on top of a surface, held in mid-air, or placed on the user's legs. Further, while the foregoing embodiments described specific gestures used in specific embodiments, it should be understood that any other gesture or gestures can be used to achieve the functionality described herein. For embodiments that incorporate an autosuggest and/or autocorrect functionality, the embodiments described herein indicate that it may be beneficial to retain multiple potential inferences about the intended text entry by a user in a surface-agnostic text input system or method and to update the likelihood of a sequence of text entry based on a natural language model so that autocorrections and/or autocomplete suggestions can be generated for selection by the user.

Specifically, the embodiments described herein indicate that the output of a CTC network can be input to a natural language model to further improve the accuracy of the inference model predictions. In one embodiment, a beam search algorithm can be applied to the lattice of predicted keystrokes, and the system or method can update the likelihood of a character sequence according to the natural language model. For example, maximum likelihood decoding can show various autosuggestions and/or autocorrections in approximate real-time as a user enters text in a surface-agnostic text input system or method.

Figure 21:
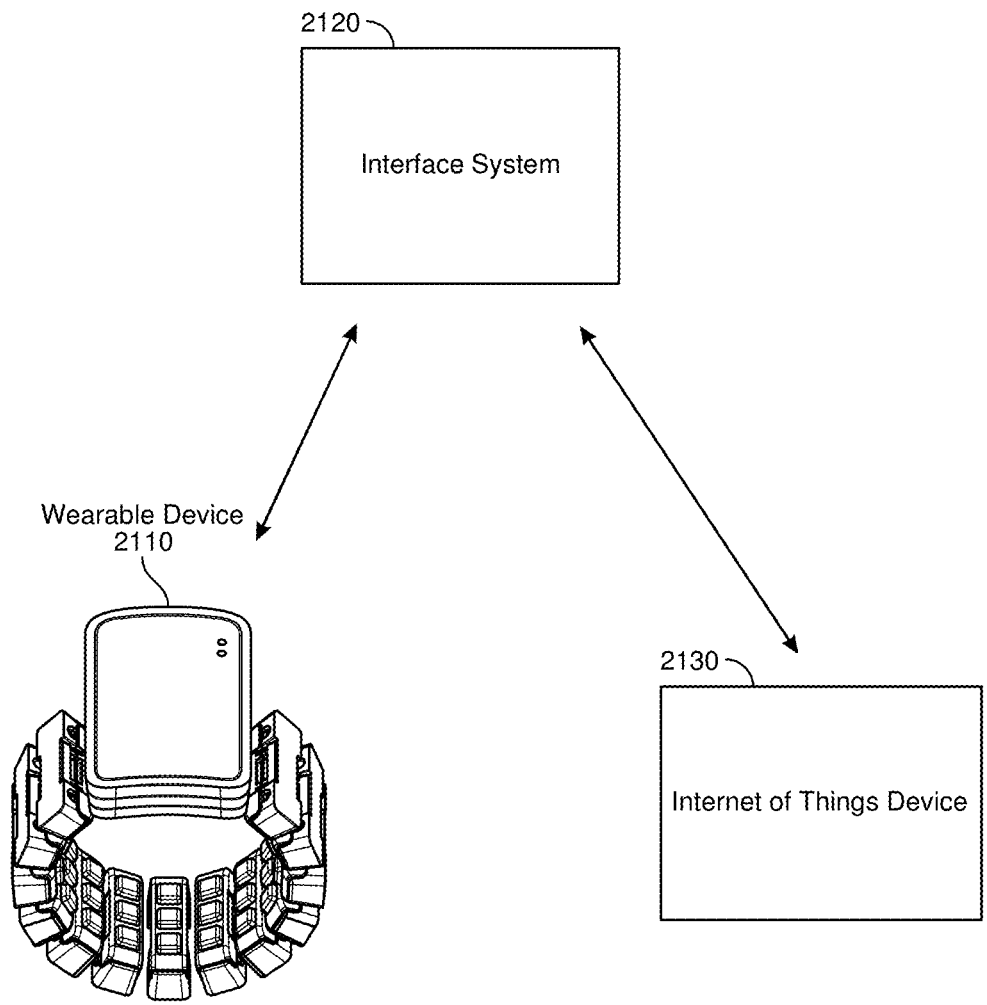
FIG. 21 illustrates a human computer interface system including a wearable device, an interface system, and an Internet of Things (IoT) device.

FIG. 21 illustrates an embodiment in which a wearable device 2110 may be implemented to control an Internet of Things (IoT) device 2130 through an interface system 2120. Voice-controlled (i.e. voice-enabled) connected devices (including IoT devices (e.g., 2130) and other connected devices such as smartphones, tablets, smartwatches, and smart glasses or other head-mounted displays) are widely implemented in the home, office, and on-the-go environments. Such devices can be connected to one another via a Wi-Fi network, Bluetooth connection, or via any other suitable wired or wireless means. Verbal commands to such connected devices permit control of these systems at a distance. However, at least in some instances, verbal commands may be cumbersome or inefficient for an intended task or series of tasks.

Consistent with at least some embodiments, the embodiments described herein may provide systems and methods that enable control of one or more connected devices based on gestures, poses, and/or other spatiotemporal patterns of muscle activation that cause movements and/or forces across joints that offer significant advantages relative to voice control alone. For example, the wearable device 2110 as described herein for human-machine control can detect neuromuscular signals, and at least in part based on those signals, enable (1) discreet two-way communications (e.g., communicating discretely through muscle activations), (2) dynamic control of one or more devices, and/or (3) identification of and smart access to devices, systems, and/or networks.

In various social contexts as on a bus or plane, people may not want to bring too much attention to themselves while interacting with one or more connected devices. Machine control of these devices based at least in part on neuromuscular signals as described herein permits a user to activate, control, or otherwise use one or more connected devices in a discreet manner appropriate for certain settings. For example, changing the volume of connected (i.e. 'smart') earbuds or a headset may be done discretely by a user tapping a finger on their leg. Further, in some instances, a method of multimodal control (i.e. where control can be exerted by a combination of different forms of control) as contemplated by an embodiment herein can leverage neuromuscular signals and offer a higher degree of access to and control of connected devices than would be possible using a modality of control in isolation.

Additionally, in some situations, voice commands alone may not be able to control a device with sufficient precision. In such situations, a user may execute a gesture alone or in combination with the voice command in order to more accurately and conveniently control a connected device via the systems and methods described herein. For example, a user may rotate their thumb to adjust the volume of a connected device to a desired setting, or a user may mimic spinning a wheel to adjust the brightness, quality, intensity, or wavelength associated with lighting devices.

In other situations, control and authentication for connected devices can be sub-optimal, particularly in environments in which a connected device is accessed by many users (i.e. a speaker or door lock in a connected home). According to certain embodiments of the invention described herein, access control and authentication of a user of a connected device may be achieved by detecting a unique neuromuscular signal associated with a user (i.e., as recorded by an armband or wristband array of neuromuscular sensors using wearable device 2110). A connected device enabled for authentication and/or access control via neuromuscular signals may automatically recognize a user in proximity to the connected device based on their unique pattern of neuromuscular signals, permitting that user to access and control the connected device and/or for a personalized user profile of the connected device to be activated. For example, a user wearing an apparatus with an array of neuromuscular sensors as described herein may enter a room with a connected light fixture configured for neuromuscular authentication and thereby cause the connected light to load a particular color palette or light level personalized for that user.

At least some of the embodiments described herein indicate that systems and methods as described herein for using neuromuscular signals to create controls based on gestures, poses, movements, or forces exerted across a user's joints may be particularly advantageous when paired with smart earbuds, smart glasses (or other smart head mounted displays), smartphones, smartwatches, connected tablets, other wearable or handheld personal computing devices, or any other external smart device including but not limited to thermostats, garage door openers, car doors, gates, locks, etc. Whereas many connected devices are configured to recognize voice commands, the systems and methods as described herein for machine control and interaction based on neuromuscular signals can enable a user to interact with auditory (e.g. via a 'hearable' or other connected headphone or speaker system) or visual (e.g. on a screen of a smartwatch or smartphone or other screen) cues using commands based on poses, gestures, or other movements and/or forces as derived from neuromuscular signals.

For example, a wearable wristband apparatus with a plurality of neuromuscular sensors may be configured to permit a user to respond to a smart assistant (e.g. via a wearable or handheld device with visual, haptic, and/or auditory alerts) with small, subtle gestures (i.e., via a finger tap on the user's leg to accept a meeting invitation or to confirm a hotel reservation, or a swipe gesture on a tabletop to ignore a notification, or a pinch gesture to play a video received from a friend, or a flick gesture to send a message to a colleague).

The embodiments described herein indicate that environments with multiple connected devices may require specific controls, so that a user can direct their intention for control to a particular connected device. Exemplary embodiments of the systems and methods for human machine control as described herein may permit a gesture or other pattern of neuromuscular activation to be used to switch from one connected device to another for subsequent control, where the subsequent control may be exerted by neuromuscular control signals, voice signals, and/or another modality of control.

For various embodiments, the systems described herein may indicate that combining voice control with neuromuscular control based on gestures, poses, and/or other patterns of movement and/or force exerted by the neuromuscular system can enable more reliable, diverse, discrete, and/or personalized forms of machine control. By way of a non-limiting example, the embodiments described herein indicate that user authentication based at least in part on neuromuscular activity may be used to activate a smart wallet for payment processing.

As noted above, gestures and/or poses may refer to a static or dynamic configuration of one or more body parts including the position of the one or more body parts and forces associated with the configuration(s). For example, gestures can include discrete orientations, such as placing or pressing the palm of a hand down on a solid surface or grasping a ball, continuous gestures, such as waving a finger back and forth, grasping and throwing a ball, or a combination of discrete and continuous gestures or poses. Gestures may also include covert gestures that are imperceptible to another person, such as slightly tensing a joint by co-contracting opposing muscles or using sub-muscular activations. Gestures may be defined by an application configured to prompt a user to perform the gestures or, alternatively, gestures may be arbitrarily defined by a user. The gestures performed by the user may include symbolic gestures (e.g., gestures mapped to other gestures, interactions, or commands, for example, based on a gesture vocabulary that specifies the mapping). In some cases, hand and arm gestures may be symbolic and used to communicate according to cultural standards. Non-limiting examples of gestures include the following: up/down/left/right movements, circular movements, single finger or multiple finger taps, specific sequences of finger taps, swipes, clicks, "thumbs up" and "thumbs down" signs, pointing, making of fists with varying amounts of pressure and tightness, wrist rolls, flat hand motions, flicks, two-finger pinches, multiple finger pinches, either alone or in any combination of or specific sequences involving one or more of the foregoing.

In the various embodiments as contemplated herein, a user may initiate a control signal for a connected computing device based on neuromuscular signals that do not cause perceptible movements or forces to be generated. In these embodiments, a neuromuscular control signal may comprise the activation of a single motor unit (comprising a spinal motor neuron and the muscle fibers onto which it forms a neuromuscular junction) and/or a plurality of motor neurons recorded through a plurality of neuromuscular sensors. In general, the activation of a motor unit is referred to as a motor unit action potential (MUAP). For example, a user may cause the volume of a connected speaker to increase with a MUAP from a first motor unit and may cause the volume to decrease with a MUAP from a second motor unit.

The embodiments described herein indicate that MUAPs elicited from a plurality of motor units may be used to increase the effective degrees of freedom (DOFs) for controlling a machine, IoT device, or other connected device by activating multiple motor units concurrently (or within a specified duration) or in a specified sequence. In some instances, an aspect of the control signal may require a user to activate some motor units and not activate other units. For example, a control scheme based on a user controlling three motor units labeled A, B, and C may cause a particular control signal to be transmitted to a connected computing device based on concurrently, consecutively, or within a specified duration, activating motor units A and B but not activating motor unit C. In some instances, a control signal based on motor unit activation may require a certain frequency (or count) of MUAPs within a threshold period of time. For example, pausing a video on a connected screen may require that motor unit A fires five MUAPs within two seconds, though one skilled in the art will recognize that the required plurality of MUAPs may be greater or less than five, and the duration for counting the MUAPs may be shorter or longer than two seconds.

The table below lists various exemplary and non-limiting methods and/or forms of control a user may exert based on neuromuscular signals, as contemplated herein.

| Feature | Interaction | Potential Control Scheme |
|---|---|---|
| TV control - replace remote | Select app<br>Browse apps/channels<br>Play/pause<br>Go back<br>Go home<br>Menu navigation - scroll<br>Typing | Up/Down/Left/Right/Select<br>Finger taps<br>Swiping<br>Any combination of the foregoing |
| Smart speaker control | Volume up/down<br>Mute/unmute<br>Previous/next<br>Play/pause | Up/Down/Left/Right/Select<br>Swiping<br>Any combination of the foregoing |
| Smart lightbulb control | Lights on/off<br>Dim up/down | Up/Down/Left/Right/Select<br>Swiping<br>Any combination of the foregoing |
| Bidirectional communication | Yes/no (to virtual assistant question)<br>Confirm (purchase, reservation, etc) | Thumb up/down |
| Smart oven control | Oven on/off<br>Temp up/down<br>Preheat/bake/broil on/off | Up/Down/Left/Right/Select<br>Any combination of the foregoing |
| Smart thermostat control | Thermostat On/off<br>Temp up/down | Up/Down/Left/Right/Select<br>Any combination of the foregoing |
| Smart alarm system control | Camera up/down/left/right<br>Zoom in/out<br>Range increase/decrease | Up/Down/Left/Right/Select<br>Any combination of the foregoing |
| Smart camera control | Camera up/down/left/right<br>Zoom in/out | Up/Down/Left/Right<br>Any combination of the foregoing |
| Smart display video control | Volume up/down<br>Mute/unmute<br>Accept/decline/end call<br>Typing | Up/Down/Left/Right/Select<br>Finger taps<br>Any combination of the foregoing |
| Virtual assistant activation without speaking | Virtual assistant wake<br>Virtual assistant stop | Fist + pressure (at varying levels)<br>Any combination of the foregoing |
| Phone controls mid-call | Pick up/hang up<br>Volume<br>Mute/unmute | Up/Down/Left/Right/Select<br>Any combination of the foregoing |
| Videochat controls mid-call | Pick up/hang up<br>Volume<br>Mute/unmute<br>Video filters | Up/Down/Left/Right/Select<br>Poses<br>Any combination of the foregoing |
| Audio controls in transit | Volume up/down<br>Fwd/back 10 seconds<br>Play/pause<br>Mute/unmute | Up/Down/Left/Right/Select<br>Any combination of the foregoing |
| Song controls on plane or subway or with company at home | Previous/next<br>Play/pause<br>Mute/unmute | Up/Down/Left/Right/Select<br>Any combination of the foregoing |
| Car dashboard controls | Play/pause song<br>Mute/unmute<br>Temp on/off<br>Accept/decline call<br>Volume up/down | Up/Down/Left/Right/Select<br>Any combination of the foregoing |
| Unique neuromuscular signal | User authorization | N/a |
| Unlock front door | Hover | N/a |
| Notification | Engage<br>Ignore | Swipe |
| List | Scroll through<br>Select | Wrist roll<br>Fist |

| Feature | Interaction | Potential Control Scheme |
| --- | --- | --- |
| Audiobook | Play/pause song | Up/down/left/right/Select |
| Radio | Mute/unmute | |
| News | Temp on/off | |
| Weather | Accept/decline call | |
| Music | Volume up/down | |
| Phone call | | |
| Menu | Navigate | Up/down/left/right/Select |
| | Select | |

In another exemplary embodiment as described herein, three interactive primitives (i.e. basic forms of human machine control) may be used for controlling a connected earbud device or connected headset or head mounted display (or other wearable connected device): "Flick" as a discrete input (where a flick gesture corresponds to flexing a finger (e.g. a middle finger)), holding the finger in place with the thumb, activating the extensor muscles for that finger, and causing the thumb to release the finger so that it rapidly extends. One or more "pinch taps" as discrete inputs (where a pinch tap gesture corresponds to a transient gesture in which a finger (e.g. an index finger) flexes so that the tip of the finger touches the tip of the thumb, then is released by extending the finger and/or thumb). A "wrist roll" primitive may also be used for one-dimensional rotary control similar to the directionality associated with a UI input wheel (where a wrist roll corresponds to a clockwise and/or counterclockwise rotation of the hand which may, optionally, be in a fist pose about the wrist joint).

Notifications are often an important part of smart or virtual assistant systems available through smart earbuds or head mounted displays (or other smart connected devices). In another exemplary embodiment, a flick gesture may be used as a dismissal mechanism for notifications, as this gesture is similar to a dismissal mechanism with which people may already be familiar.

In another exemplary embodiment relating to a calendar application, a smart or virtual assistant may notify a user that their next meeting is coming up, permitting the use of the primitives as follows: "Flick" will dismiss the notification outright. This may be analogous to dismissing a notification on the user's mobile device or desktop. With this gesture, the smart or virtual assistant will not bother the user again about the notification. Index "pinch tap" may set a "standard" snooze alarm. The smart or virtual assistant may notify the user again in a few minutes with this gesture. A middle "pinch tap" may engage a timer function of a smart or virtual assistant. Once the timer mode is engaged, the user may define the duration of a timer to be implemented by the smart or virtual assistant by rolling her wrist to select the timer duration.

As the user rolls their wrist clockwise, for example, the duration of the timer may increase, and the smart or virtual assistant may provide auditory feedback to the user (i.e. '1 minute', '2 minutes', '3 minutes', etc.). If the user accidentally selects a timer duration greater than intended, the user may roll their wrist counterclockwise while receiving further auditory feedback from the smart or virtual assistant, so that the user may select an intended timer duration. Once the correct duration has been selected, another "pinch tap" gesture may set the timer and the smart or virtual assistant will notify the user after the appropriate amount of time. At any point in this process, a "flick" gesture may enable a user to exit the timer setting module.

Figure 22:
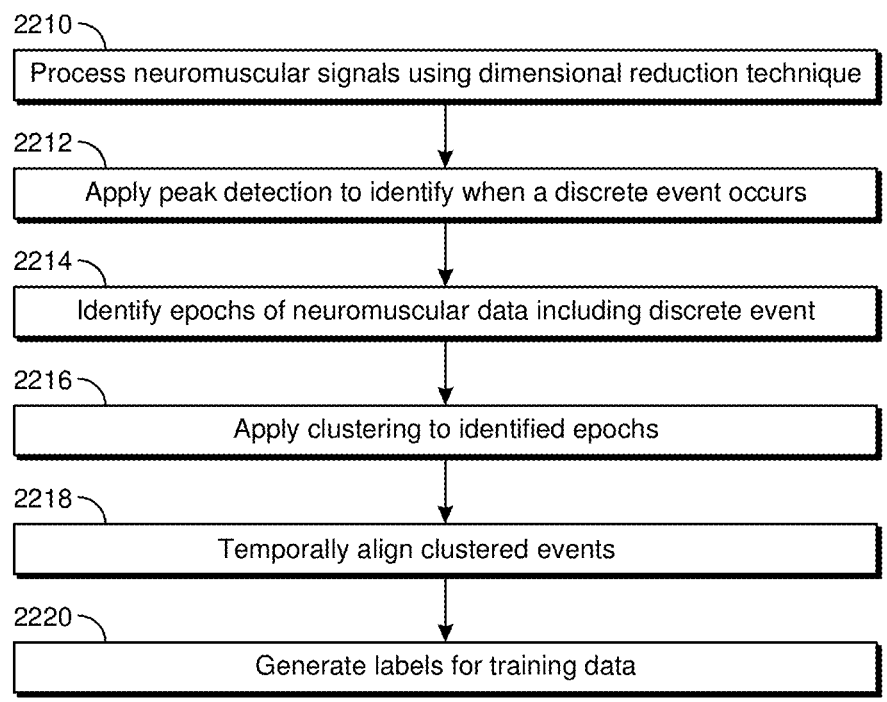
FIG. 22 is a flow diagram of a method for generating training data for training an inference model.

FIG. 22 illustrates a process for generating training data for training an inference model (e.g., a neural network) in accordance with some embodiments. In act 2210, multiple neuromuscular signals are processed using a dimensional reduction technique including, but not limited to, a principal component analysis (PCA) or another suitable dimensional reduction technique (e.g., non-negative matrix factorization, linear discriminant analysis). In some instances, the neuromuscular signals may be processed before applying a dimensional reduction technique, for example, to remove artifacts, apply filters, temporally average, and/or otherwise extract features of interest in the neuromuscular signals. As discussed above, PCA is a non-limiting example of a technique for reducing dimensionality. In one implementation using PCA, five components of the data are specified, the data is normalized by removing the median, and a peak detection algorithm is applied to detect local maxima (i.e. peaks) of the first component. In some cases, the received neuromuscular signals may include multi-dimensional neuromuscular signals. In such cases, the systems herein may calculate a dimensionally reduced signal from the multi-dimensional neuromuscular signals, where the dimensionally reduced signal includes at least one fewer dimension.

Figure 23:
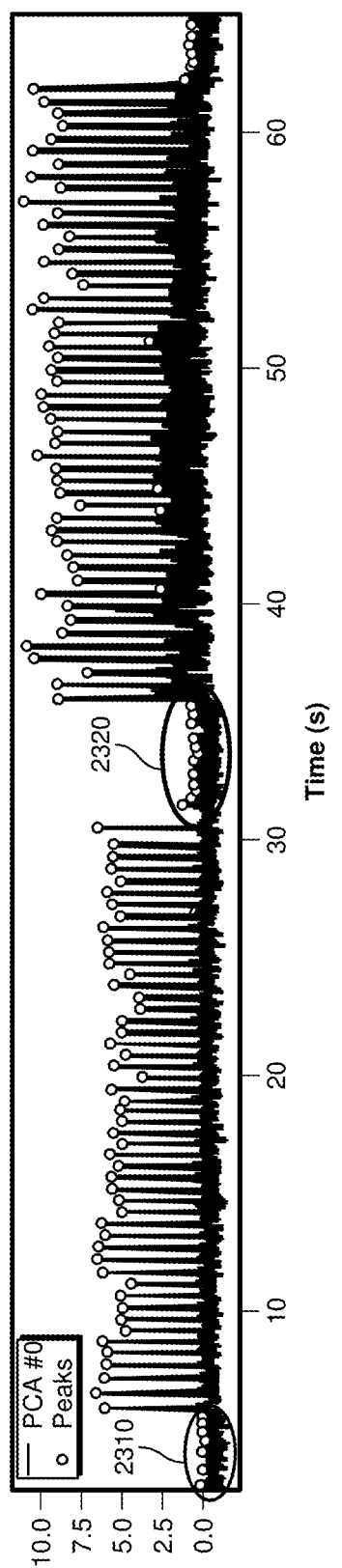
FIG. 23 illustrates a plot of a first principal component analysis (PCA) component with the output of peak detection.

FIG. 23 shows a plot of the first PCA component (in solid black line) with the output of peak detection (in hollow circles). Event occurrences can be clearly resolved in sets of about 50 events according to the specified training regime (e.g., between about 5 and 31 seconds and between about 36 and 64 seconds). In the data shown in FIG. 23, the first set of peaks corresponds to index finger taps (e.g., events), and the second set of peaks corresponds to middle finger taps (e.g., events). As shown in FIG. 23, the peak detection algorithm identified each event (no false negatives). However, the peak detection algorithm also detected spurious events (false positives) that are spurious events corresponding to local maxima occurring during the rest phase (e.g., periods 2310 and 2320) between sets of finger taps.

The process of FIG. 22 then proceeds to act 2212, where a peak detection algorithm is applied to data corresponding to one or more reduced dimensions (e.g., a principal component) over time to identify epochs when the signal present in the principal component is large. For example, a clustering algorithm can be applied to some or all detected events. In the example of the data shown in FIG. 23, three clusters corresponding to one cluster for each type of finger tap and a third cluster corresponding to all spurious events may be identified. The embodiments described herein indicate that the peak picking algorithm effectively identifies when a finger tap occurs, but that it is typically insufficient for distinguishing between finger taps of one finger (e.g., the index finger) from another finger (e.g., the thumb).

The process of FIG. 22 then proceeds to act 2214, where the epochs of neuromuscular data occurring in a time window extending for some 10s to 100s of milliseconds before, during, and after an event identified based on peak detection in the dominant principal component are collected. For example, an epoch (temporal slice) of data around each event can be generated by taking a window of, for example, 150 ms centered around each event. It should be appreciated that windows of shorter or longer duration may also be used to generate clusters.

Figure 24:
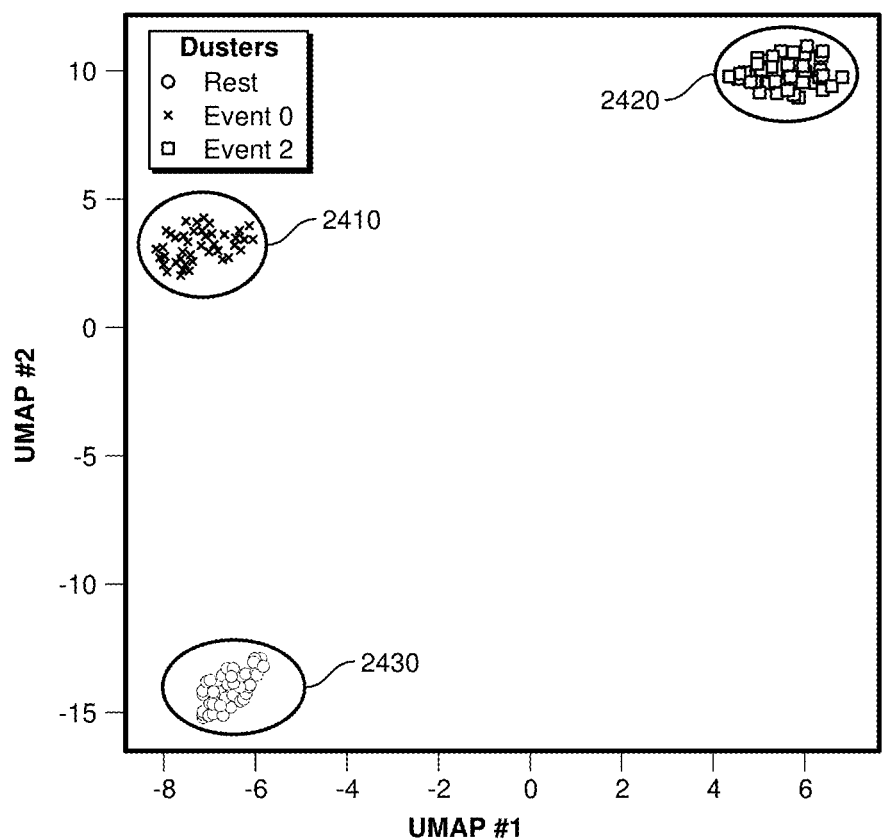
FIG. 24 illustrates an embodiment of three clusters that are separated from each other.

The process of FIG. 22 then proceeds to act 2216, where a clustering algorithm is applied to the collected epochs of neuromuscular data to distinguish which finger was responsible for the tap (i.e., to distinguish the different classes of events (e.g., index or middle finger tap)). For example, a vector can be generated corresponding to each epoch and the vectors can then be input to a k-means clustering algorithm to extract the three clusters. For visualization purposes, uniform manifold approximation and projection (UMAP) can be applied to plot the clusters. FIG. 24 shows that the expected three clusters (e.g., clusters 2410 and 2420 for the two fingers that performed taps, and cluster 2430 for the spurious event cluster) are clearly separated. The spurious event cluster (i.e., cluster 2430) can be distinguished by identifying the cluster that has the lowest energy, and these events removed from subsequent analysis.

Figure 25:
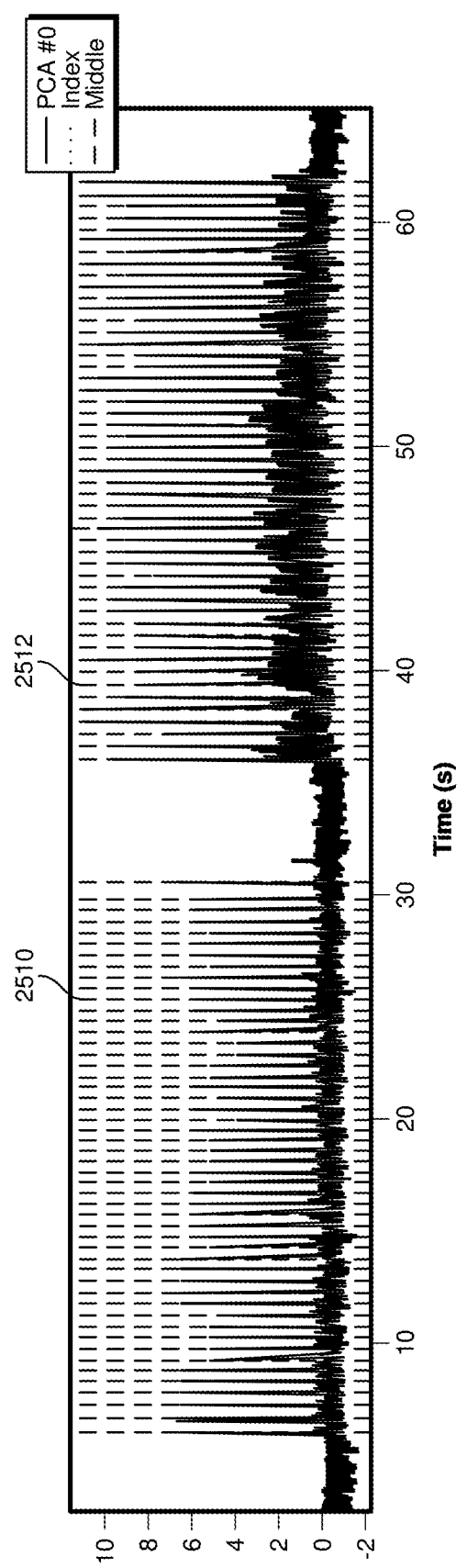
FIG. 25 illustrates an embodiment in which vertical dashed lines and solid lines indicate distinguished index taps and middle finger taps.

As shown in FIG. 24, approximately 50 events of each class are present in the clusters corresponding to event 0 (cluster 2410) and event 2 (cluster 2420), which represent finger taps from different fingers. To confirm that clustering has successfully distinguished finger taps of different fingers, class event categories can be plotted with the PCA data generated previously to confirm that all events of the same type are consecutive, per the training protocol. The vertical dashed lines 2510 and the vertical dashed lines 2512 in FIG. 25 indicate index and middle finger taps, respectively.

The process of FIG. 22 then proceeds to act 2218, where clustered events are aligned temporally (e.g., using an iterative algorithm) so that templates can be generated that distinguish taps from different fingers. For example, as discussed further herein, templates may distinguish taps by one finger from taps of another finger according to the temporal profile of a plurality of principal components after the first principal component (which was used in act 2212 to detect events generally). In one implementation, the timing of events can be adjusted so all events are well aligned. An event may be recognized at its onset rather than the peak of the first principal component. Temporal adjustment may be employed to reduce the latency of event detection and enable more responsive machine control.

The identified timing of events from act 2212 can be relatively noisy and the maxima can shift by a few samples and thus create jitter that reduces the fidelity of templates for distinguishing events in later steps. An optimal offset for each epoch can be identified by calculating the autocorrelation between the epoch and a template (averaged across all events). In one exemplary embodiment, an appropriate offset can be identified by testing various offsets (e.g., −10 to 10 samples) and selecting the offset that maximizes the correlation across events. The amount of offset can vary between events, and the process can be performed iteratively until all epochs are aligned.

Figure 26:
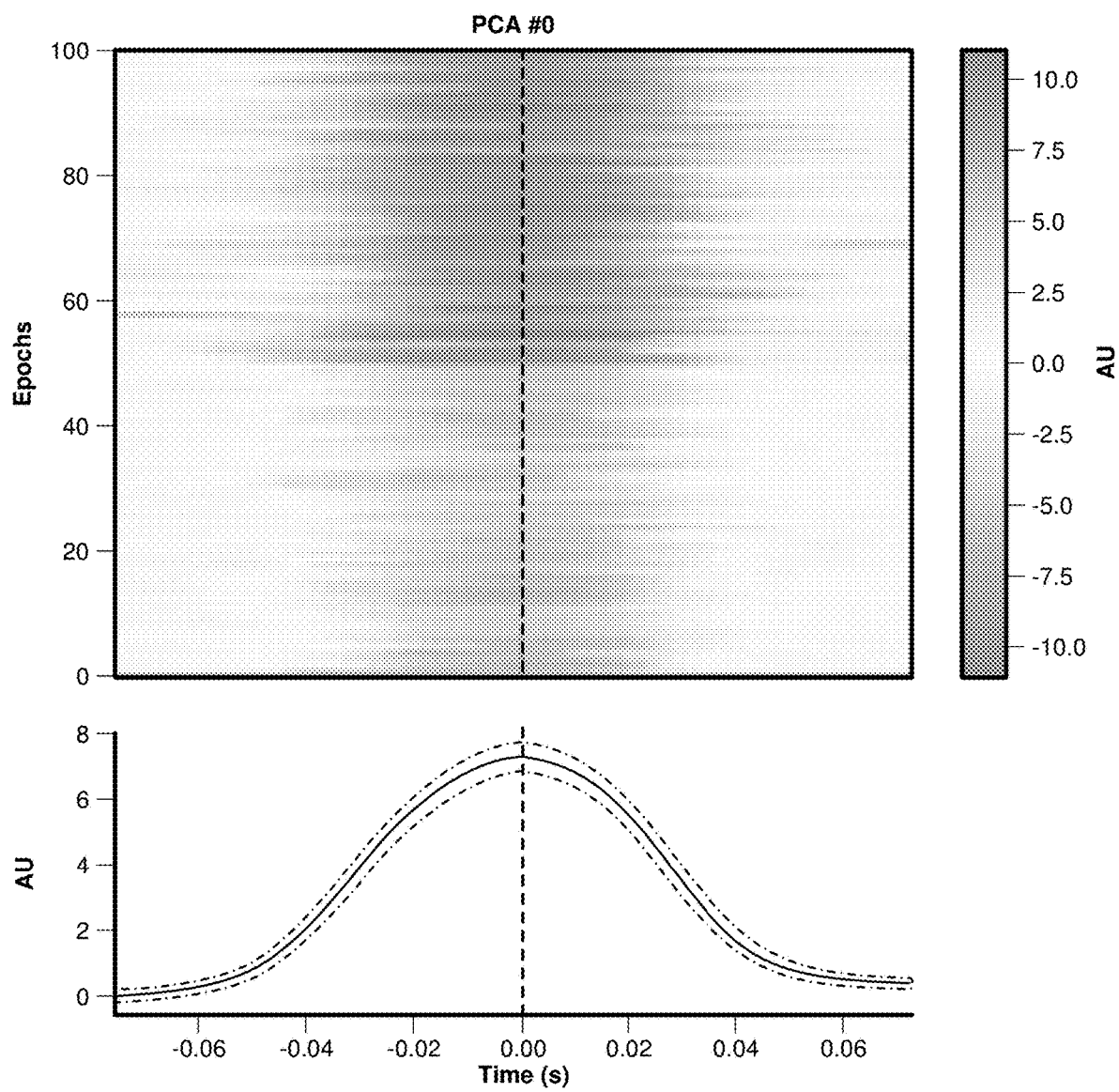
FIG. 26 illustrates each identified event as a row indicating the magnitude of the first principal component prior to temporal alignment.
Figure 27:
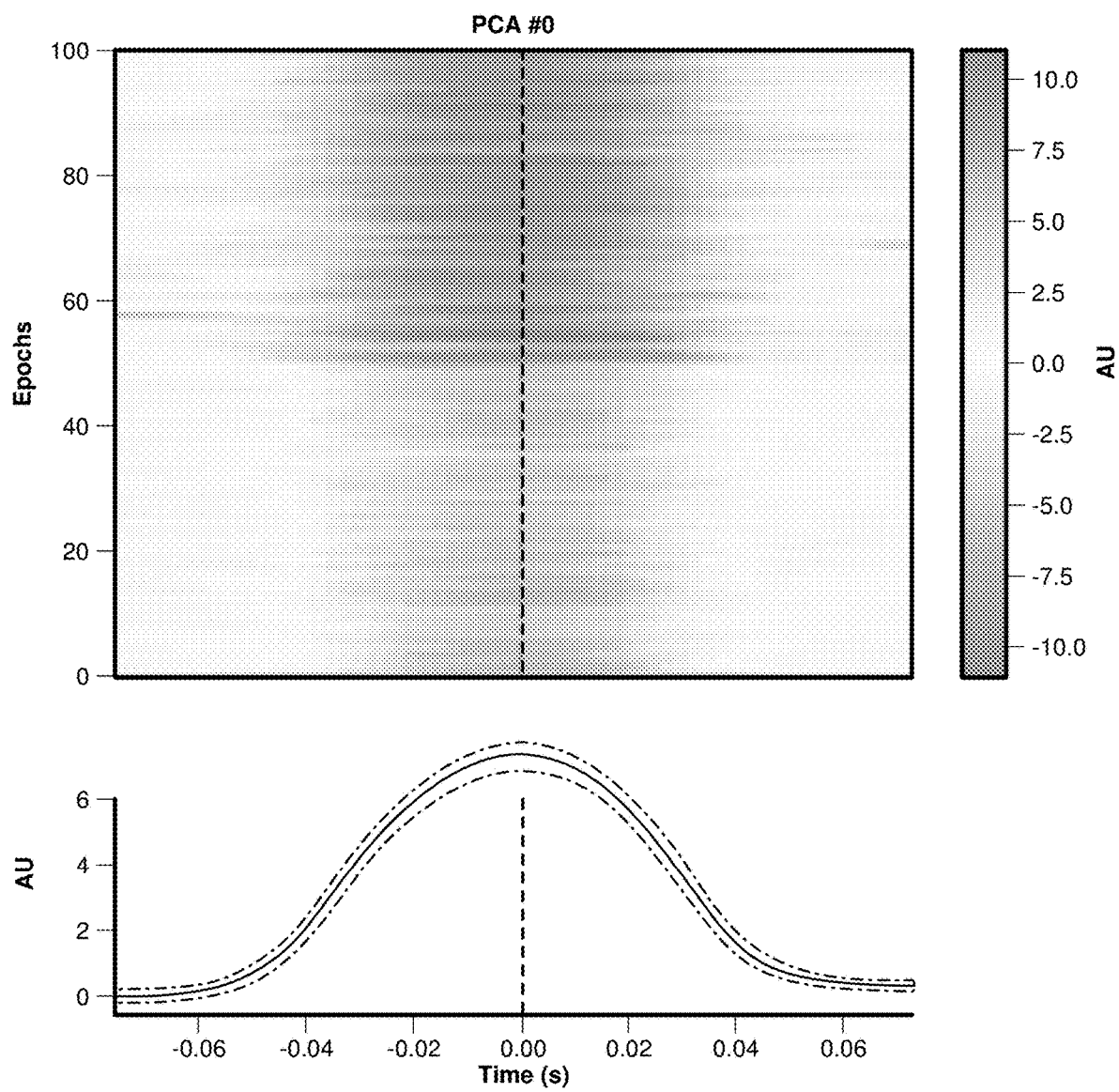
FIG. 27 illustrates the same identified events from FIG. 26 following temporal alignment.
Figure 28:
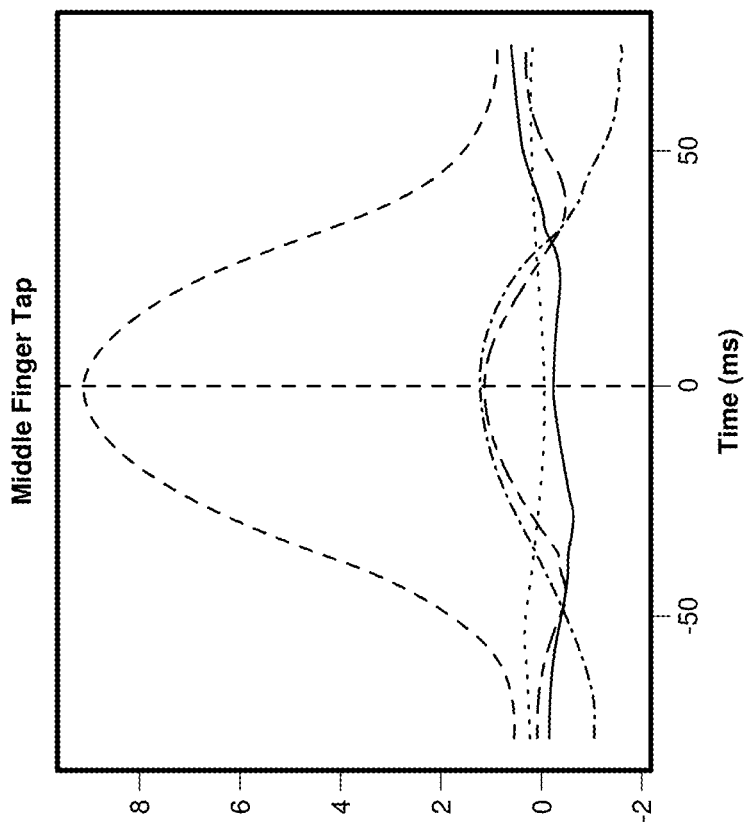
FIG. 28 illustrates an embodiment of index and middle finger tap templates.
Figure 28:
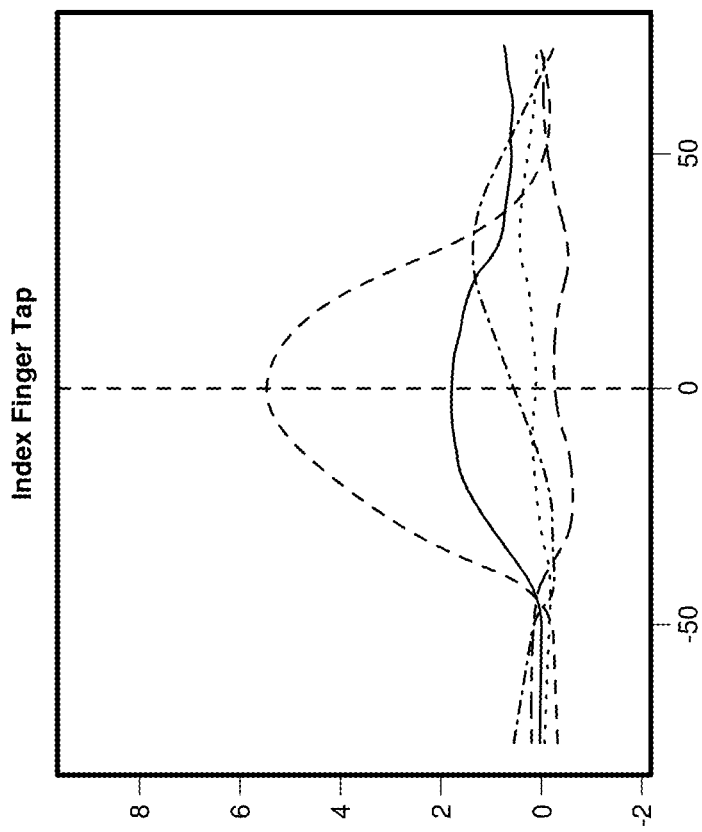

FIG. 26 shows each identified event (e.g., finger tap) as a row with shading indicating the magnitude of the first principal component prior to temporal alignment. FIG. 27 shows the same identified events (PCA #0) following temporal alignment. After temporal alignment, a template for each event can be plotted for each of the first five principal components. In the case of the index and middle finger tap templates shown in FIG. 28, the first PCA component differs primarily in amplitude between the two finger taps, and the subsequent components exhibit a distinct profile between events.

The process of FIG. 22 then proceeds to act 2220, where, based on the detected and clustered events, labels relating to which finger caused the tap are generated. The labels can be used to train a neural network (e.g., a multi-layer perception (MLP)) based on time-delayed features of the neuromuscular signals in order to build a classifier that, once trained, may accurately predict the identity and timing of each discrete event. For example, labels can be created by generating a binary time series with 1 when a specified event occurs and 0 otherwise. A model can then be trained to predict this time series. In inference time, a threshold can be used with a debounce algorithm, or other suitable technique, applied to the output of the model to achieve event detection.

After temporal alignment, the events are typically centered around the peak of the first PCA component and in some instances it may be preferred to predict the event once the user has completed it. Accordingly, the labels may need to be shifted with reference to the event timing, which may be referred to as an offset parameter. Moreover, at least in some cases, a model may not be able to predict the single time sample corresponding to an event, and some temporal flexibility may improve the quality of model output, which can be achieved by implementing the model to predict a 1 for several consecutive time samples around the event (e.g., the pulse width). For example, the offset may be set to be 75 ms after the event peak and the pulse width may be set to be 25 ms. It should be appreciated that other suitable offsets may be used to improve the quality of the model output.

In an exemplary embodiment, the model to be trained is a simple MLP that has input features corresponding to a 150 ms sliding window over the PCA features (e.g., for each time sample a vector is created comprising the last 60 time samples for the 5 PCA components (e.g., 300 dimensions)). It should be understood that other artificial neural networks can alternatively be employed. The model can be trained to predict the extracted labels, and for inference time, the model can be applied on the test data and the output of the model can be thresholded and debounced to obtain the events.

In some cases, the systems described herein may be configured to analyze the received neuromuscular signals to identify a time of occurrence for one or more peaks in the neuromuscular signals that represent discrete muscle activation events. The systems may then identify one or more time windows surrounding the identified peaks in the neuromuscular signal, group the identified time windows into clusters, where each cluster represents a different discrete muscle activation event, temporally align the clusters representing the identified discrete muscle activation events, and then identify at least one specific muscle activation for each temporally aligned cluster.

Figure 29:
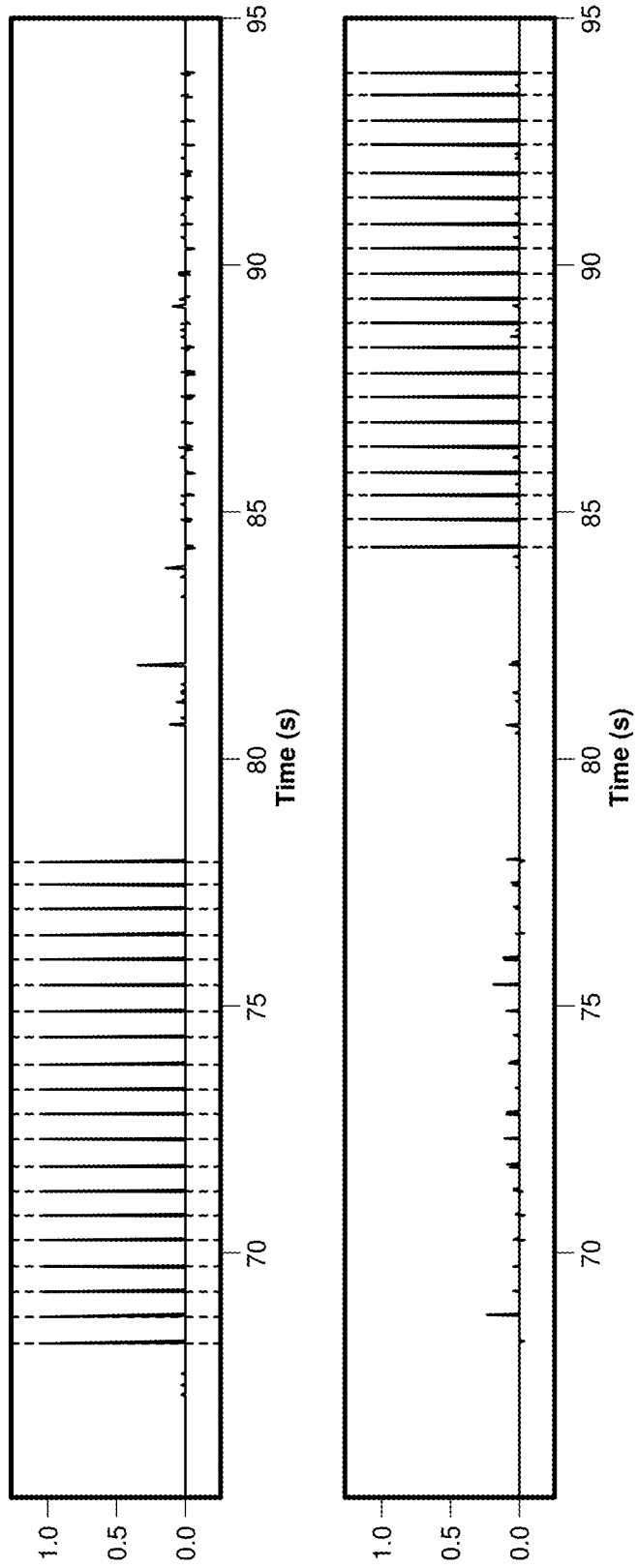
FIG. 29 illustrates a chart having example data for identifying and distinguishing two events.

FIG. 29 shows example data for identifying and distinguishing two events using the techniques described herein. For example, timing and epochs between taps may be analyzed to distinguish between two different fingers (or other body parts) performing a gesture such as a tap. Once identified, the specific body part (e.g., a user's pointer finger) may be used when selecting text or typing characters or when controlling IoT devices. For instance, certain text or characters or IoT devices may be mapped to each finger or to different body parts. Then, when the specified body part is identified and its movements and/or gestures are identified (e.g., using the wearable device 2110 of FIG. 21), a specific portion of text may be selected, or a specific character may be selected within the UI, or a specific IoT device may be controlled. Other fingers or body parts may select other text or typed characters or may control other IoT devices, even when using the same input commands or gestures. Thus, by determining which finger or other body part is performing the movement, specific commands or inputs associated with or mapped to that body part may be implemented within the UI or in relation to an IoT device or other electronic device. In some cases, due to this mapping, different fingers may cause different tasks to be performed or may perform different options within the UI, even if the fingers (or other body parts) are performing the same gesture, as each finger is mapped to a different input command. For example, if a double tap gesture turns on an IoT device, a double tap with a pointer finger may turn on a coffee maker, while a double tap with a middle finger will turn on an alarm clock, etc.

Accordingly, the embodiments described herein allow users to select input text, provide typed inputs, and/or control IoT devices using muscle movements detected by a wearable device. The neuromuscular signals detected by the wearable device may be converted into input commands and may allow the user to interact with a user interface, selecting different characters or words for input, typing different letters with or without a physical keyboard, and controlling operations on IoT devices using inputs. Because the embodiments described herein may be configured to distinguish between which fingers (or other body parts) are performing the gestures, different commands may be mapped to each finger, allowing a user to initiate certain tasks with each finger, allowing the user a great deal of control over how text is selected or typed, or how IoT devices are controlled using their input neuromuscular signals.

EXAMPLE EMBODIMENTS

Example 1

A computer-implemented method for facilitating interactions with a user interface via neuromuscular signals may include presenting, via a user interface, at least one sensory cue, receiving, from one or more neuromuscular sensors of a wearable device, one or more neuromuscular signals generated by a user wearing the wearable device, wherein the user generates the one or more neuromuscular signals in response to the at least one sensory cue being presented to the user via the user interface, interpreting the one or more neuromuscular signals as input commands with respect to the at least one sensory cue provided by the user interface, such that the input commands initiate performance of one or more specified tasks within the user interface, and performing the one or more specified tasks within the user interface according to the interpreted input commands.

Example 2

The computer-implemented method of Example 1, wherein carrying out the specified tasks within the user interface comprises: navigating to a specified display region in the user interface that corresponds to a text input that is available for selection, and selecting the text input located at the specified display region within the user interface.

Example 3

The computer-implemented method of any of Examples 1 and 2, wherein the user interface includes a plurality of display regions, and wherein multiple potential text inputs are mapped to each display region in a mapping.

Example 4

The computer-implemented method of any of Examples 1-3, wherein selection of a particular text input in the specified display region is based, at least in part, on a recognized gesture determined from the received neuromuscular signals.

Example 5

The computer-implemented method of any of Examples 1-4, wherein the mapping includes a mapping of one or more specified text inputs to one or more specified gestures.

Example 6

The computer-implemented method of any of Examples 1-5, wherein interpreting the received neuromuscular signals as input commands with respect to the at least one sensory cue provided by the user interface comprises interpreting the received neuromuscular signals from the user as a velocity control, a directional control, and/or positional control of a cursor used to select particular text inputs within the user interface.

Example 7

The computer-implemented method of any of Examples 1-6, wherein interpreting the received neuromuscular signals as input commands with respect to the at least one sensory cue provided by the user interface comprises recognizing at least one user gesture based on the received neuromuscular signals, and wherein the recognized user gesture controls a selection of a particular text input.

Example 8

The computer-implemented method of any of Examples 1-7, further comprising disambiguating text input displayed within the user interface based on the recognized user gesture.

Example 9

The computer-implemented method of any of Examples 1-8, further comprising automatically determining, based on the received neuromuscular signals, one or more series of likely text inputs provided by the user.

Example 10

The computer-implemented method of any of Examples 1-9, wherein carrying out the specified tasks within the user interface comprises: predicting, from a language model, one or more characters that are to be selected as typed inputs based on the input commands, and providing the predicted characters as typed inputs within the user interface.

Example 11

The computer-implemented method of any of Examples 1-10, wherein interpreting the received neuromuscular signals as input commands with respect to the at least one sensory cue provided by the user interface comprises recognizing at least one user gesture based on the received neuromuscular signals, and wherein the recognized user gesture controls a selection of a particular typed input.

Example 12

The computer-implemented method of any of Examples 1-11, wherein the typed input is provided via a surface-agnostic gesture performed by the user.

Example 13

The computer-implemented method of any of Examples 1-12, wherein the sensory cue comprises at least one of an auditory cue, a haptic cue, an olfactory cue, an environmental cue, or a visual cue

Example 14

A wearable device comprising a display, one or more neuromuscular sensors configured to detect neuromuscular signals, at least one physical processor, and physical memory comprising computer-executable instructions that, when executed by the physical processor, cause the physical processor to: present, via a user interface, at least one sensory cue, receive, from one or more neuromuscular sensors of a wearable device, one or more neuromuscular signals generated by a user wearing the wearable device, wherein the user generates the one or more neuromuscular signals in response to the at least one sensory cue being presented to the user via the user interface, interpret the one or more neuromuscular signals as input commands with respect to the at least one sensory cue provided by the user interface, such that the input commands initiate performance of one or more specified tasks within the user interface, and perform the one or more specified tasks within the user interface according to the interpreted input commands.

Example 15

The wearable device of Example 14, wherein carrying out the specified tasks within the user interface according to the interpreted input commands comprises using the interpreted input commands to control an internet of things (IoT) device.

Example 16

The wearable device of any of Examples 14 and 15, wherein the IOT device is controlled using one or more gestures determined from the received neuromuscular signals.

Example 17

The wearable device of any of Examples 14-16, wherein the physical processor is further configured to: analyze the received neuromuscular signals to identify a time of occurrence for one or more peaks in the neuromuscular signals that represent discrete muscle activation events, identify one or more time windows surrounding the identified peaks in the neuromuscular signal, group the identified time windows into one or more clusters, each cluster representing a different discrete muscle activation event, temporally align the one or more clusters representing the identified discrete muscle activation events, and identify at least one specific muscle activation for each temporally aligned cluster.

Example 18

The wearable device of any of Examples 14-17, wherein the received neuromuscular signals comprise multi-dimensional neuromuscular signals, and wherein the processor calculates a dimensionally reduced signal from the multi-dimensional neuromuscular signals, the dimensionally reduced signal including at least one fewer dimension.

Example 19

The wearable device of any of Examples 14-18, wherein identifying at least one specific muscle activation for each temporally aligned cluster comprises distinguishing specific muscle activations from different digits of the user's hand.

Example 20

A non-transitory computer-readable medium comprising one or more computer-executable instructions that, when executed by at least one processor of a computing device, cause the computing device to: present, via a user interface, at least one sensory cue, receive, from one or more neuromuscular sensors of a wearable device, one or more neuromuscular signals generated by a user wearing the wearable device, wherein the user generates the one or more neuromuscular signals in response to the at least one sensory cue being presented to the user via the user interface, interpret the one or more neuromuscular signals as input commands with respect to the at least one sensory cue provided by the user interface, such that the input commands initiate performance of one or more specified tasks within the user interface, and perform the one or more specified tasks within the user interface according to the interpreted input commands.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 3000 in FIG. 30) or that visually immerses a user in an artificial reality (such as, e.g., virtual-reality system 3100 in FIG. 31). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 30:
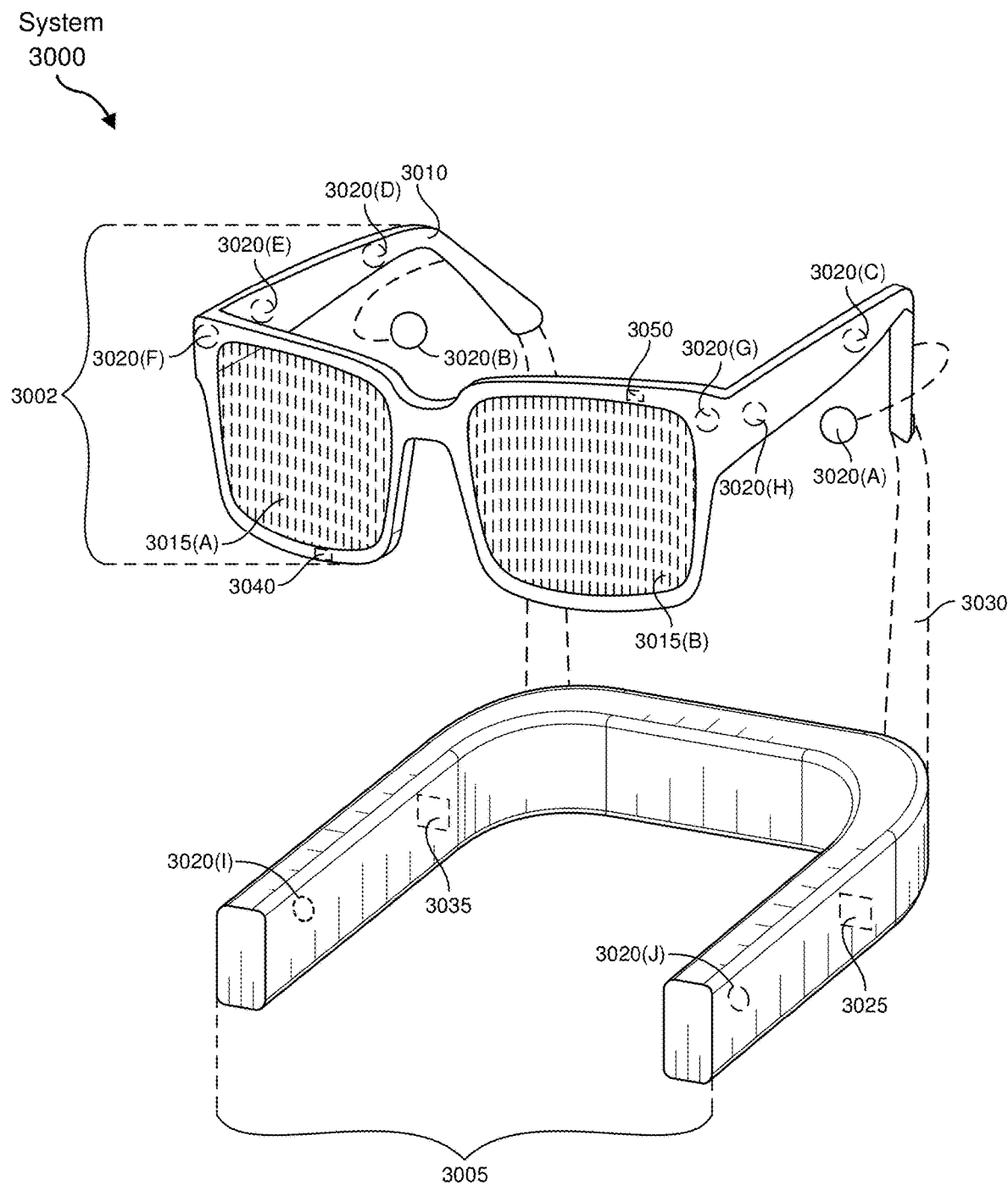
FIG. 30 is an illustration of exemplary augmented-reality glasses that may be used in connection with embodiments of this disclosure.

Turning to FIG. 30, augmented-reality system 3000 may include an eyewear device 3002 with a frame 3010 configured to hold a left display device 3015(A) and a right display device 3015(B) in front of a user's eyes. Display devices 3015(A) and 3015(B) may act together or independently to present an image or series of images to a user. While augmented-reality system 3000 includes two displays, embodiments of this disclosure may be implemented in augmented-reality systems with a single NED or more than two NEDs.

In some embodiments, augmented-reality system 3000 may include one or more sensors, such as sensor 3040. Sensor 3040 may generate measurement signals in response to motion of augmented-reality system 3000 and may be located on substantially any portion of frame 3010. Sensor 3040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 3000 may or may not include sensor 3040 or may include more than one sensor. In embodiments in which sensor 3040 includes an IMU, the IMU may generate calibration data based on measurement signals from sensor 3040. Examples of sensor 3040 may include, without limitation, accelerometers, gyroscopes, magnetometers, other suitable types of sensors that detect motion, sensors used for error correction of the IMU, or some combination thereof.

In some examples, augmented-reality system 3000 may also include a microphone array with a plurality of acoustic transducers 3020(A)-3020(J), referred to collectively as acoustic transducers 3020. Acoustic transducers 3020 may represent transducers that detect air pressure variations induced by sound waves. Each acoustic transducer 3020 may be configured to detect sound and convert the detected sound into an electronic format (e.g., an analog or digital format). The microphone array in FIG. 30 may include, for example, ten acoustic transducers: 3020(A) and 3020(B), which may be designed to be placed inside a corresponding ear of the user, acoustic transducers 3020(C), 3020(D), 3020(E), 3020(F), 3020(G), and 3020(H), which may be positioned at various locations on frame 3010, and/or acoustic transducers 3020(I) and 3020(J), which may be positioned on a corresponding neckband 3005.

In some embodiments, one or more of acoustic transducers 3020(A)-(J) may be used as output transducers (e.g., speakers). For example, acoustic transducers 3020(A) and/or 3020(B) may be earbuds or any other suitable type of headphone or speaker.

The configuration of acoustic transducers 3020 of the microphone array may vary. While augmented-reality system 3000 is shown in FIG. 30 as having ten acoustic transducers 3020, the number of acoustic transducers 3020 may be greater or less than ten. In some embodiments, using higher numbers of acoustic transducers 3020 may increase the amount of audio information collected and/or the sensitivity and accuracy of the audio information. In contrast, using a lower number of acoustic transducers 3020 may decrease the computing power required by an associated controller 3050 to process the collected audio information. In addition, the position of each acoustic transducer 3020 of the microphone array may vary. For example, the position of an acoustic transducer 3020 may include a defined position on the user, a defined coordinate on frame 3010, an orientation associated with each acoustic transducer 3020, or some combination thereof.

Acoustic transducers 3020(A) and 3020(B) may be positioned on different parts of the user's ear, such as behind the pinna, behind the tragus, and/or within the auricle or fossa. Or, there may be additional acoustic transducers 3020 on or surrounding the ear in addition to acoustic transducers 3020 inside the ear canal. Having an acoustic transducer 3020 positioned next to an ear canal of a user may enable the microphone array to collect information on how sounds arrive at the ear canal. By positioning at least two of acoustic transducers 3020 on either side of a user's head (e.g., as binaural microphones), augmented-reality device 3000 may simulate binaural hearing and capture a 3D stereo sound field around about a user's head. In some embodiments, acoustic transducers 3020(A) and 3020(B) may be connected to augmented-reality system 3000 via a wired connection 3030, and in other embodiments acoustic transducers 3020(A) and 3020(B) may be connected to augmented-reality system 3000 via a wireless connection (e.g., a Bluetooth connection). In still other embodiments, acoustic transducers 3020(A) and 3020(B) may not be used at all in conjunction with augmented-reality system 3000.

Acoustic transducers 3020 on frame 3010 may be positioned in a variety of different ways, including along the length of the temples, across the bridge, above or below display devices 3015(A) and 3015(B), or some combination thereof. Acoustic transducers 3020 may also be oriented such that the microphone array is able to detect sounds in a wide range of directions surrounding the user wearing the augmented-reality system 3000. In some embodiments, an optimization process may be performed during manufacturing of augmented-reality system 3000 to determine relative positioning of each acoustic transducer 3020 in the microphone array.

In some examples, augmented-reality system 3000 may include or be connected to an external device (e.g., a paired device), such as neckband 3005. Neckband 3005 generally represents any type or form of paired device. Thus, the following discussion of neckband 3005 may also apply to various other paired devices, such as charging cases, smart watches, smart phones, wrist bands, other wearable devices, hand-held controllers, tablet computers, laptop computers, other external compute devices, etc.

As shown, neckband 3005 may be coupled to eyewear device 3002 via one or more connectors. The connectors may be wired or wireless and may include electrical and/or non-electrical (e.g., structural) components. In some cases, eyewear device 3002 and neckband 3005 may operate independently without any wired or wireless connection between them. While FIG. 30 illustrates the components of eyewear device 3002 and neckband 3005 in example locations on eyewear device 3002 and neckband 3005, the components may be located elsewhere and/or distributed differently on eyewear device 3002 and/or neckband 3005. In some embodiments, the components of eyewear device 3002 and neckband 3005 may be located on one or more additional peripheral devices paired with eyewear device 3002, neckband 3005, or some combination thereof.

Pairing external devices, such as neckband 3005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 3000 may be provided by a paired device or shared between a paired device and an eyewear device, thus reducing the weight, heat profile, and form factor of the eyewear device overall while still retaining desired functionality. For example, neckband 3005 may allow components that would otherwise be included on an eyewear device to be included in neckband 3005 since users may tolerate a heavier weight load on their shoulders than they would tolerate on their heads. Neckband 3005 may also have a larger surface area over which to diffuse and disperse heat to the ambient environment. Thus, neckband 3005 may allow for greater battery and computation capacity than might otherwise have been possible on a stand-alone eyewear device. Since weight carried in neckband 3005 may be less invasive to a user than weight carried in eyewear device 3002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 3005 may be communicatively coupled with eyewear device 3002 and/or to other devices. These other devices may provide certain functions (e.g., tracking, localizing, depth mapping, processing, storage, etc.) to augmented-reality system 3000. In the embodiment of FIG. 30, neckband 3005 may include two acoustic transducers (e.g., 3020(I) and 3020(J)) that are part of the microphone array (or potentially form their own microphone subarray). Neckband 3005 may also include a controller 3025 and a power source 3035.

Acoustic transducers 3020(I) and 3020(J) of neckband 3005 may be configured to detect sound and convert the detected sound into an electronic format (analog or digital). In the embodiment of FIG. 30, acoustic transducers 3020(I) and 3020(J) may be positioned on neckband 3005, thereby increasing the distance between the neckband acoustic transducers 3020(I) and 3020(J) and other acoustic transducers 3020 positioned on eyewear device 3002. In some cases, increasing the distance between acoustic transducers 3020 of the microphone array may improve the accuracy of beamforming performed via the microphone array. For example, if a sound is detected by acoustic transducers 3020(C) and 3020(D) and the distance between acoustic transducers 3020(C) and 3020(D) is greater than, e.g., the distance between acoustic transducers 3020(D) and 3020(E), the determined source location of the detected sound may be more accurate than if the sound had been detected by acoustic transducers 3020(D) and 3020(E).

Controller 3025 of neckband 3005 may process information generated by the sensors on neckband 3005 and/or augmented-reality system 3000. For example, controller 3025 may process information from the microphone array that describes sounds detected by the microphone array. For each detected sound, controller 3025 may perform a direction-of-arrival (DOA) estimation to estimate a direction from which the detected sound arrived at the microphone array. As the microphone array detects sounds, controller 3025 may populate an audio data set with the information. In embodiments in which augmented-reality system 3000 includes an inertial measurement unit, controller 3025 may compute all inertial and spatial calculations from the IMU located on eyewear device 3002. A connector may convey information between augmented-reality system 3000 and neckband 3005 and between augmented-reality system 3000 and controller 3025. The information may be in the form of optical data, electrical data, wireless data, or any other transmittable data form. Moving the processing of information generated by augmented-reality system 3000 to neckband 3005 may reduce weight and heat in eyewear device 3002, making it more comfortable to the user.

Power source 3035 in neckband 3005 may provide power to eyewear device 3002 and/or to neckband 3005. Power source 3035 may include, without limitation, lithium ion batteries, lithium-polymer batteries, primary lithium batteries, alkaline batteries, or any other form of power storage. In some cases, power source 3035 may be a wired power source. Including power source 3035 on neckband 3005 instead of on eyewear device 3002 may help better distribute the weight and heat generated by power source 3035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 3100 in FIG. 31, that mostly or completely covers a user's field of view. Virtual-reality system 3100 may include a front rigid body 3102 and a band 3104 shaped to fit around a user's head. Virtual-reality system 3100 may also include output audio transducers 3106(A) and 3106(B). Furthermore, while not shown in FIG. 31, front rigid body 3102 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 3000 and/or virtual-reality system 3100 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 3000 and/or virtual-reality system 3100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 3000 and/or virtual-reality system 3100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, augmented-reality systems 3000 and 3100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 32:
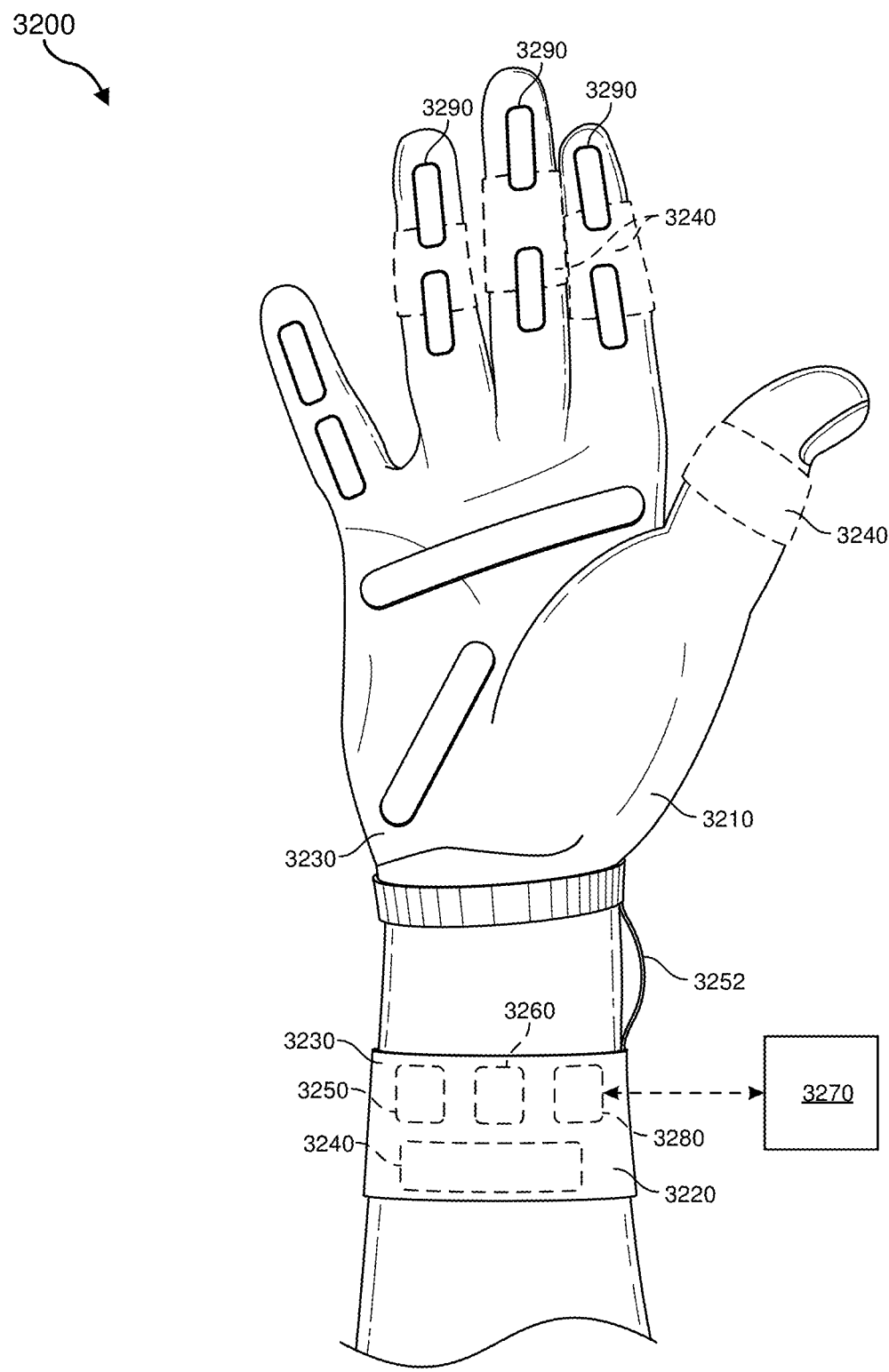
FIG. 32 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 32 illustrates a vibrotactile system 3200 in the form of a wearable glove (haptic device 3210) and wristband (haptic device 3220). Haptic device 3210 and haptic device 3220 are shown as examples of wearable devices that include a flexible, wearable textile material 3230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 3240 may be positioned at least partially within one or more corresponding pockets formed in textile material 3230 of vibrotactile system 3200. Vibrotactile devices 3240 may be positioned in locations to provide a vibrating sensation (e.g., haptic feedback) to a user of vibrotactile system 3200. For example, vibrotactile devices 3240 may be positioned against the user's finger(s), thumb, or wrist, as shown in FIG. 32. Vibrotactile devices 3240 may, in some examples, be sufficiently flexible to conform to or bend with the user's corresponding body part(s).

A power source 3250 (e.g., a battery) for applying a voltage to the vibrotactile devices 3240 for activation thereof may be electrically coupled to vibrotactile devices 3240, such as via conductive wiring 3252. In some examples, each of vibrotactile devices 3240 may be independently electrically coupled to power source 3250 for individual activation. In some embodiments, a processor 3260 may be operatively coupled to power source 3250 and configured (e.g., programmed) to control activation of vibrotactile devices 3240.

Vibrotactile system 3200 may be implemented in a variety of ways. In some examples, vibrotactile system 3200 may be a standalone system with integral subsystems and components for operation independent of other devices and systems. As another example, vibrotactile system 3200 may be configured for interaction with another device or system 3270. For example, vibrotactile system 3200 may, in some examples, include a communications interface 3280 for receiving and/or sending signals to the other device or system 3270. The other device or system 3270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 3280 may enable communications between vibrotactile system 3200 and the other device or system 3270 via a wireless (e.g., Wi-Fi, Bluetooth, cellular, radio, etc.) link or a wired link. If present, communications interface 3280 may be in communication with processor 3260, such as to provide a signal to processor 3260 to activate or deactivate one or more of the vibrotactile devices 3240.

Vibrotactile system 3200 may optionally include other subsystems and components, such as touch-sensitive pads 3290, pressure sensors, motion sensors, position sensors, lighting elements, and/or user interface elements (e.g., an on/off button, a vibration control element, etc.). During use, vibrotactile devices 3240 may be configured to be activated for a variety of different reasons, such as in response to the user's interaction with user interface elements, a signal from the motion or position sensors, a signal from the touch-sensitive pads 3290, a signal from the pressure sensors, a signal from the other device or system 3270, etc.

Although power source 3250, processor 3260, and communications interface 3280 are illustrated in FIG. 32 as being positioned in haptic device 3220, the present disclosure is not so limited. For example, one or more of power source 3250, processor 3260, or communications interface 3280 may be positioned within haptic device 3210 or within another wearable textile.

Figure 33:
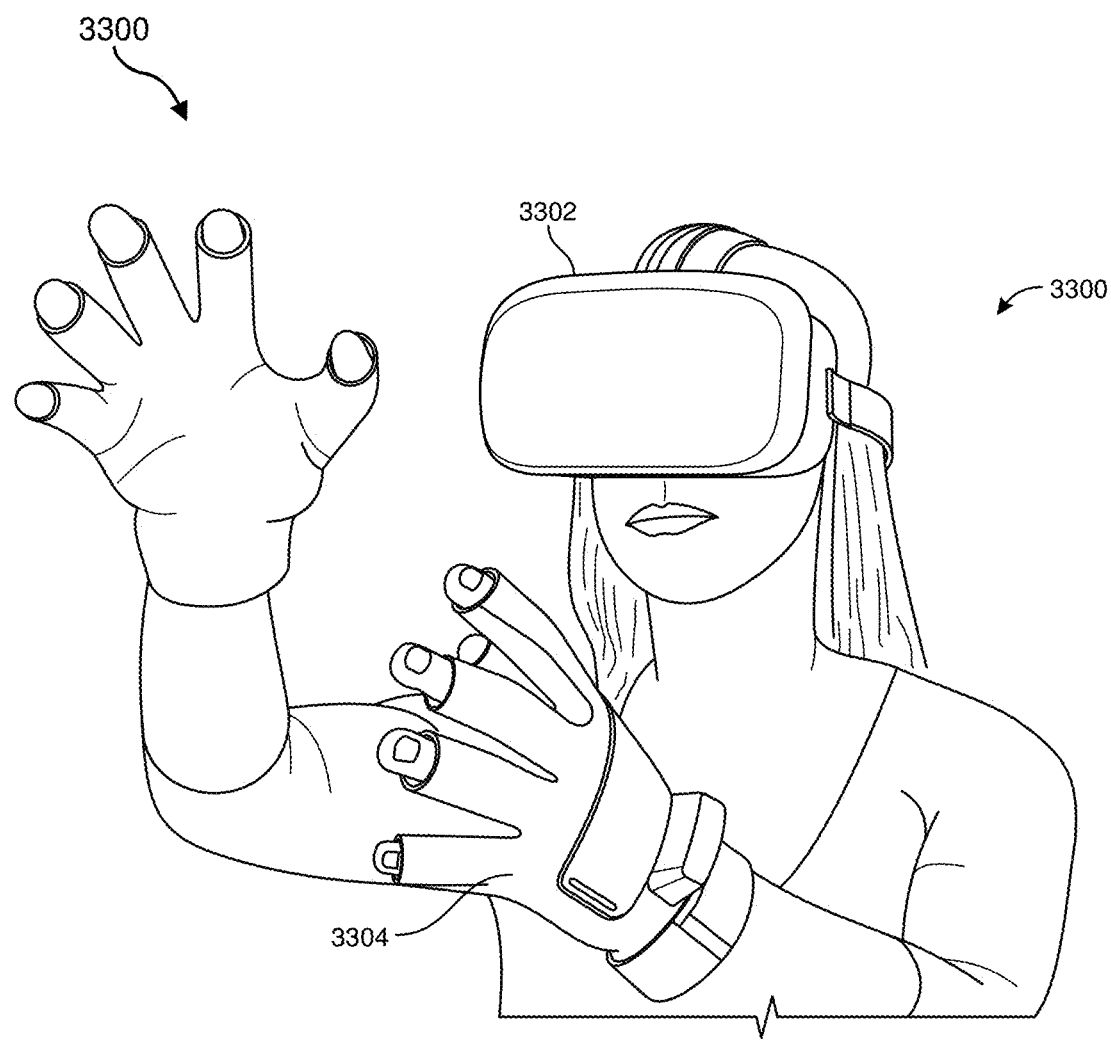
FIG. 33 is an illustration of an exemplary virtual-reality environment according to embodiments of this disclosure.

Haptic wearables, such as those shown in and described in connection with FIG. 32, may be implemented in a variety of types of artificial-reality systems and environments. FIG. 33 shows an example artificial-reality environment 3300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 31:
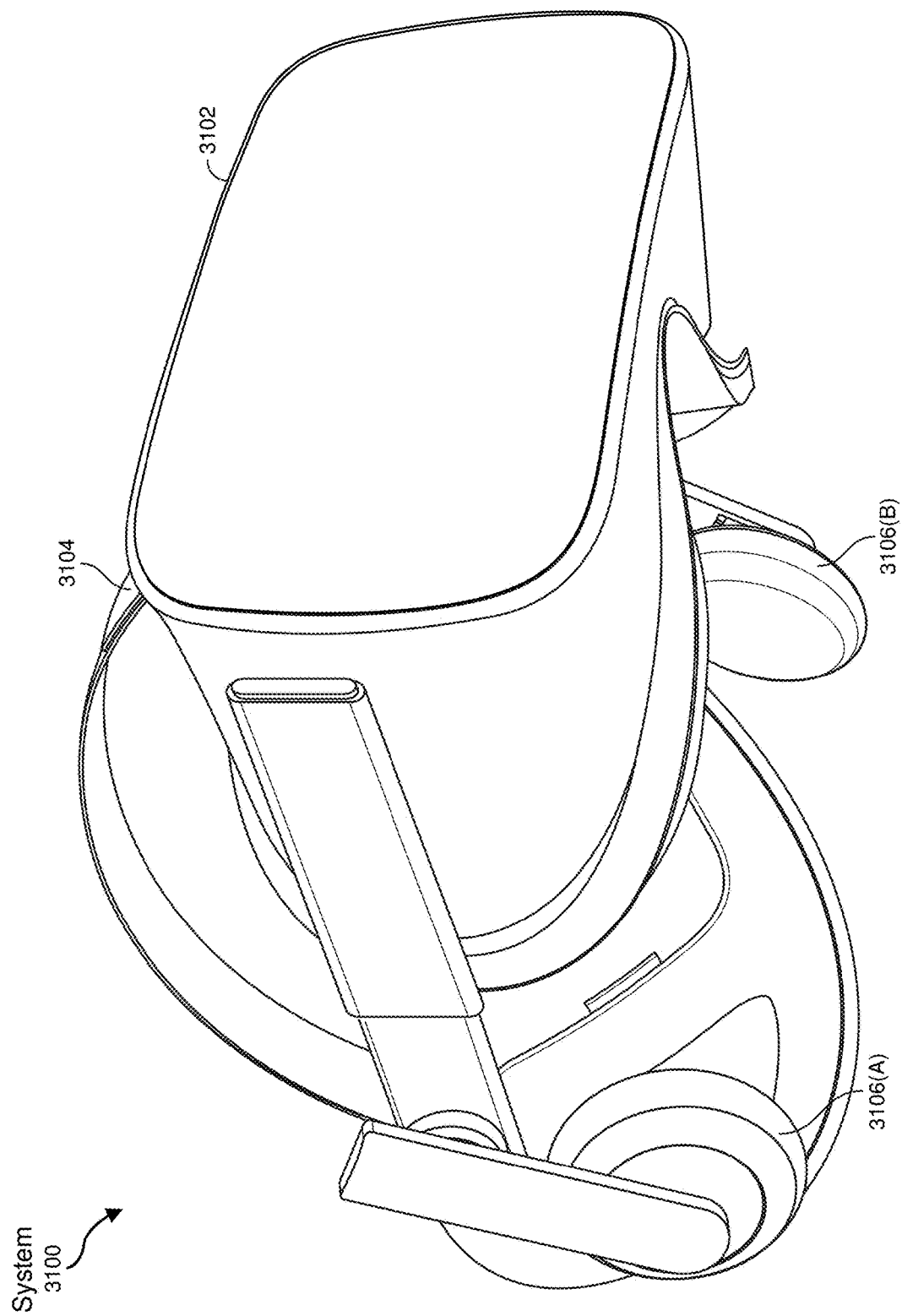
FIG. 31 is an illustration of an exemplary virtual-reality headset that may be used in connection with embodiments of this disclosure.

Head-mounted display 3302 generally represents any type or form of virtual-reality system, such as virtual-reality system 3100 in FIG. 31. Haptic device 3304 generally represents any type or form of wearable device, worn by a user of an artificial-reality system, that provides haptic feedback to the user to give the user the perception that he or she is physically engaging with a virtual object. In some embodiments, haptic device 3304 may provide haptic feedback by applying vibration, motion, and/or force to the user. For example, haptic device 3304 may limit or augment a user's movement. To give a specific example, haptic device 3304 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 3304 to send action requests to a console. Examples of action requests include, without limitation, requests to start an application and/or end the application and/or requests to perform a particular action within the application.

Figure 34:
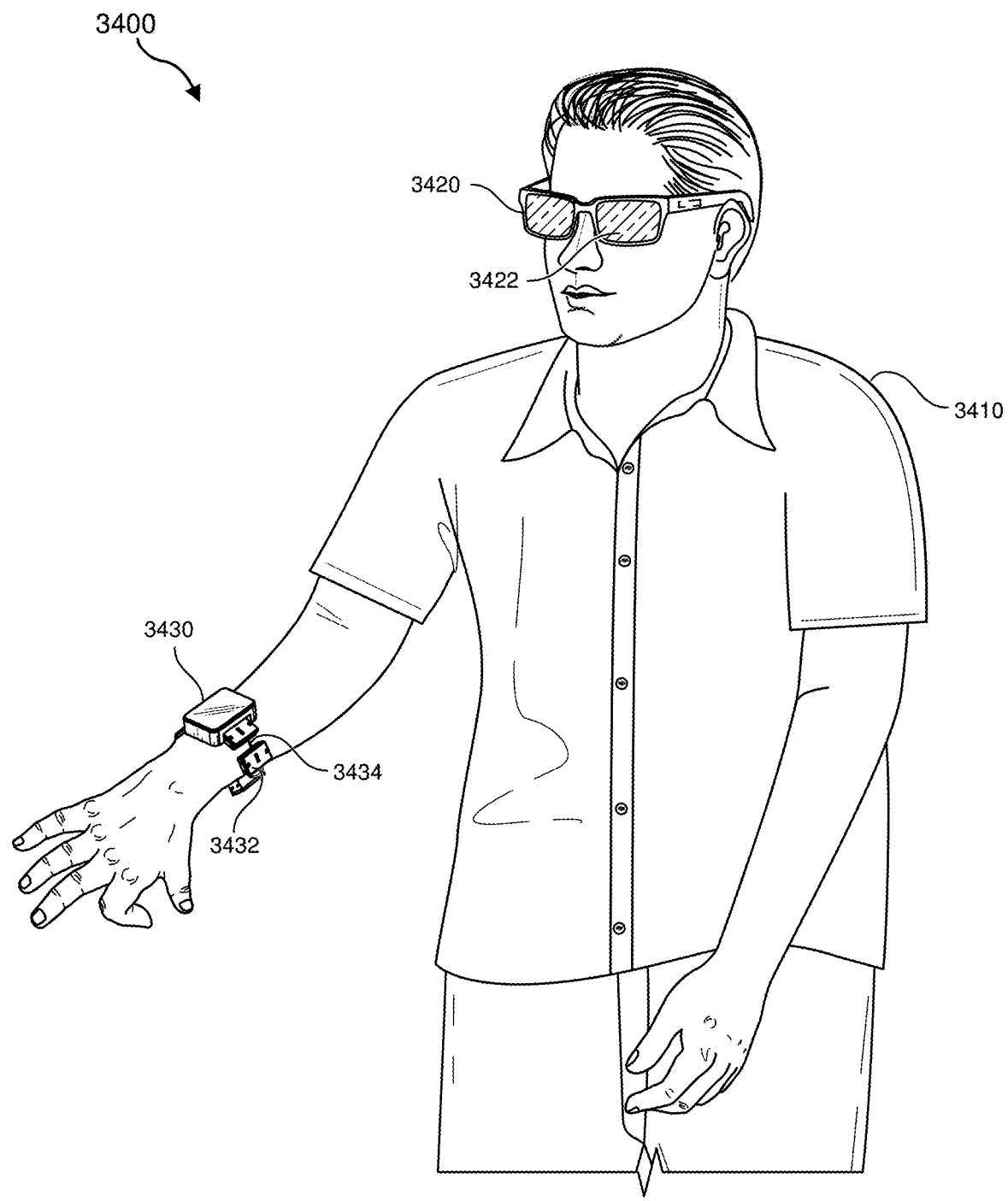
FIG. 34 is an illustration of an exemplary augmented-reality environment according to embodiments of this disclosure.

While haptic interfaces may be used with virtual-reality systems, as shown in FIG. 33, haptic interfaces may also be used with augmented-reality systems, as shown in FIG. 34. FIG. 34 is a perspective view of a user 3410 interacting with an augmented-reality system 3400. In this example, user 3410 may wear a pair of augmented-reality glasses 3420 that may have one or more displays 3422 and that are paired with a haptic device 3430. In this example, haptic device 3430 may be a wristband that includes a plurality of band elements 3432 and a tensioning mechanism 3434 that connects band elements 3432 to one another.

One or more of band elements 3432 may include any type or form of actuator suitable for providing haptic feedback. For example, one or more of band elements 3432 may be configured to provide one or more of various types of cutaneous feedback, including vibration, force, traction, texture, and/or temperature. To provide such feedback, band elements 3432 may include one or more of various types of actuators. In one example, each of band elements 3432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 3210, 3220, 3304, and 3430 may include any suitable number and/or type of haptic transducer, sensor, and/or feedback mechanism. For example, haptic devices 3210, 3220, 3304, and 3430 may include one or more mechanical transducers, piezoelectric transducers, and/or fluidic transducers. Haptic devices 3210, 3220, 3304, and 3430 may also include various combinations of different types and forms of transducers that work together or independently to enhance a user's artificial-reality experience. In one example, each of band elements 3432 of haptic device 3430 may include a vibrotactor (e.g., a vibrotactile actuator) configured to vibrate in unison or independently to provide one or more of various types of haptic sensations to a user.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to identify a gesture, use the result of the transformation to generate a command, and store the result of the transformation to retain a record of the generated command. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
presenting, via a user interface, at least one sensory cue;
receiving, from one or more neuromuscular sensors of a wearable device, one or more neuromuscular signals generated by a user wearing the wearable device, wherein the user generates the one or more neuromuscular signals in response to the at least one sensory cue being presented to the user via the user interface;
determining, based on a timing of input commands detected within a specified temporal slice of neuromuscular sensor data received within a specific time window, which of the user's fingers provided the neuromuscular signals;
interpreting the one or more neuromuscular signals as input commands with respect to the at least one sensory cue provided by the user interface, such that the input commands initiate performance of one or more specified tasks within the user interface, wherein the interpreted neuromuscular signals cause a plurality of potential candidate input commands to be highlighted within the user interface, at least one candidate input command being highlighted in an alternate manner that signifies a higher likelihood of being selected by the user, wherein the interpreted neuromuscular signals are specific to each finger of the user, such that different input commands are interpreted differently based on which finger provided the input command and such that at least two same input commands from different fingers are interpreted as different commands, and wherein the user selects a specific input command from the highlighted potential candidate input commands; and performing the one or more specified tasks within the user interface according to the interpreted and selected input commands.

2. The computer-implemented method of claim 1, wherein carrying out the one or more specified tasks within the user interface comprises:

navigating to a specified display region in the user interface that corresponds to a text input that is available for selection; and selecting the text input located at the specified display region within the user interface.

3. The computer-implemented method of claim 2, wherein the user interface includes a plurality of display regions, and wherein multiple potential text inputs are mapped to each display region in a mapping.

4. The computer-implemented method of claim 3, wherein selection of a particular text input in the specified display region is based, at least in part, on a recognized gesture determined from the received neuromuscular signals.

5. The computer-implemented method of claim 4, wherein the mapping includes a mapping of one or more specified text inputs to one or more specified gestures.

6. The computer-implemented method of claim 2, wherein interpreting the received neuromuscular signals as input commands with respect to the at least one sensory cue provided by the user interface comprises interpreting the received neuromuscular signals from the user as a velocity control, a directional control, and/or positional control of a cursor used to select particular text inputs within the user interface.

7. The computer-implemented method of claim 6, wherein interpreting the received neuromuscular signals as input commands with respect to the at least one sensory cue provided by the user interface comprises recognizing at least one user gesture based on the received neuromuscular signals, and wherein the recognized user gesture controls a selection of a particular text input.

8. The computer-implemented method of claim 7, further comprising disambiguating text input displayed within the user interface based on the recognized user gesture.

9. The computer-implemented method of claim 2, further comprising automatically determining, based on the received neuromuscular signals, one or more series of likely text inputs provided by the user.

10. The computer-implemented method of claim 1, wherein carrying out the one or more specified tasks within the user interface comprises:

predicting, from a language model, one or more characters that are to be selected as typed inputs based on the input commands; and providing the predicted characters as typed inputs within the user interface.

11. The computer-implemented method of claim 10, wherein interpreting the received neuromuscular signals as input commands with respect to the at least one sensory cue provided by the user interface comprises recognizing at least one user gesture based on the received neuromuscular signals, and wherein the recognized user gesture controls a selection of a particular typed input.

12. The computer-implemented method of claim 11, wherein the typed input is provided via a surface-agnostic gesture performed by the user.

13. The computer-implemented method of claim 1, wherein the sensory cue comprises at least one of an auditory cue, a haptic cue, an olfactory cue, an environmental cue, or a visual cue.

14. A wearable device comprising:
a display;
one or more neuromuscular sensors configured to detect neuromuscular signals;
at least one physical processor; and
physical memory comprising computer-executable instructions that, when executed by the physical processor, cause the physical processor to:
present, via a user interface, at least one sensory cue;
receive, from one or more neuromuscular sensors of a wearable device, one or more neuromuscular signals generated by a user wearing the wearable device, wherein the user generates the one or more neuromuscular signals in response to the at least one sensory cue being presented to the user via the user interface;
determine, based on a timing of input commands detected within a specified temporal slice of neuromuscular sensor data received within a specific time window, which of the user's fingers provided the neuromuscular signals;
interpret the one or more neuromuscular signals as input commands with respect to the at least one sensory cue provided by the user interface, such that the input commands initiate performance of one or more specified tasks within the user interface, wherein the interpreted neuromuscular signals cause a plurality of potential candidate input commands to be highlighted within the user interface, at least one candidate input command being highlighted in an alternate manner that signifies a higher likelihood of being selected by the user, wherein the interpreted neuromuscular signals are specific to each finger of the user, such that different input commands are interpreted differently based on which finger provided the input command and such that at least two same input commands from different fingers are interpreted as different commands, and wherein the user selects a specific input command from the highlighted potential candidate input commands; and
perform the one or more specified tasks within the user interface according to the interpreted and selected input commands.

15. The wearable device of claim 14, wherein carrying out the one or more specified tasks within the user interface according to the interpreted input commands comprises using the interpreted input commands to control an internet of things (IOT) device.

16. The wearable device of claim 15, wherein the IOT device is controlled using one or more gestures determined from the received neuromuscular signals.

17. The wearable device of claim 14, wherein the physical processor is further configured to:

analyze the received neuromuscular signals to identify a time of occurrence for one or more peaks in the neuromuscular signals that represent discrete muscle activation events;

identify one or more time windows surrounding the identified peaks in the neuromuscular signal;

group the identified time windows into one or more clusters, each cluster representing a different discrete muscle activation event;

temporally align the one or more clusters representing the identified discrete muscle activation events; and identify at least one specific muscle activation for each temporally aligned cluster.

18. The wearable device of claim 17, wherein the received neuromuscular signals comprise multi-dimensional neuromuscular signals, and wherein the processor calculates a dimensionally reduced signal from the multi-dimensional neuromuscular signals, the dimensionally reduced signal including at least one fewer dimension.

19. The wearable device of claim 14, wherein identifying at least one specific muscle activation for each temporally aligned cluster comprises distinguishing specific muscle activations from different digits of the user's hand.

20. A non-transitory computer-readable medium comprising one or more computer-executable instructions that, when executed by at least one processor of a computing device, cause the computing device to:

present, via a user interface, at least one sensory cue;

receive, from one or more neuromuscular sensors of a wearable device, one or more neuromuscular signals generated by a user wearing the wearable device, wherein the user generates the one or more neuromuscular signals in response to the at least one sensory cue being presented to the user via the user interface;

determine, based on a timing of input commands detected within a specified temporal slice of neuromuscular sensor data received within a specific time window, which of the user's fingers provided the neuromuscular signals;

interpret the one or more neuromuscular signals as input commands with respect to the at least one sensory cue provided by the user interface, such that the input commands initiate performance of one or more specified tasks within the user interface, wherein the interpreted neuromuscular signals cause a plurality of potential candidate input commands to be highlighted within the user interface, at least one candidate input command being highlighted in an alternate manner that signifies a higher likelihood of being selected by the user, wherein the interpreted neuromuscular signals are specific to each finger of the user, such that different input commands are interpreted differently based on which finger provided the input command and such that at least two same input commands from different fingers are interpreted as different commands, and wherein the user selects a specific input command from the highlighted potential candidate input commands; and perform the one or more specified tasks within the user interface according to the interpreted and selected input commands.

* * * * *